US007495633B2

(12) United States Patent
Oku et al.

(10) Patent No.: US 7,495,633 B2
(45) Date of Patent: Feb. 24, 2009

(54) IMAGE DISPLAY APPARATUS, IMAGE DISPLAY SYSTEM, IMAGE DATA WRITING METHOD, THIN DISPLAY FILE, AND DATA COMMUNICATION METHOD FOR THIN DISPLAY FILE

(75) Inventors: Seiichiro Oku, Kanagawa (JP); Setsuji Tatsumi, Kanagawa (JP); Kanji Nagashima, Kanagawa (JP); Yoshiro Yamazaki, Kanagawa (JP); Toshiya Kojima, Kanagawa (JP); Kenichi Kodama, Kanagawa (JP); Naoki Kusunoki, Kanagawa (JP); Seiichi Inoue, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 739 days.

(21) Appl. No.: 10/727,631

(22) Filed: Dec. 5, 2003

(65) Prior Publication Data
US 2004/0113865 A1 Jun. 17, 2004

(30) Foreign Application Priority Data
Dec. 6, 2002 (JP) ............................. 2002-354749
Dec. 26, 2002 (JP) ............................. 2002-376810
Dec. 26, 2002 (JP) ............................. 2002-376854

(51) Int. Cl.
*G09G 5/00* (2006.01)
(52) U.S. Cl. .......................... 345/2.3; 345/901; 345/905
(58) Field of Classification Search ................. 345/1.1, 345/2.1, 2.3, 901, 905
See application file for complete search history.

(56) References Cited

U.S. PATENT DOCUMENTS

| 5,767,818 | A | * | 6/1998 | Nishida ....................... 345/1.1 |
| 5,965,048 | A | * | 10/1999 | Powers ........................ 219/411 |
| 6,759,996 | B1 | * | 7/2004 | Someya et al. ............... 345/1.1 |
| 6,897,850 | B2 | * | 5/2005 | Sugimoto .................... 345/169 |
| 7,154,452 | B2 | * | 12/2006 | Nakamura et al. ........... 345/1.1 |
| 2005/0030255 | A1 | * | 2/2005 | Chiu et al. .................... 345/1.3 |

FOREIGN PATENT DOCUMENTS

| JP | 50-32009 B | 10/1975 |
| JP | 03-105882 | 3/1991 |
| JP | 04-355786 | 12/1992 |
| JP | 6-274129 A | 9/1994 |
| JP | 06-274458 | 9/1994 |

(Continued)

*Primary Examiner*—Amr Awad
*Assistant Examiner*—Michael Pervan
(74) *Attorney, Agent, or Firm*—Sughrue Mion, PLLC

(57) ABSTRACT

A holding stand is constituted by a carrying case for holding sheets of electronic paper and a base for uprightly supporting the carrying case that is substantially vertical. From the holding stand, two page fields, each expressing the number of pages of sheets of electronic paper to be displayed and position page field expressing a current page position of electronic paper and incremented on each of the sheets, are added to image data, and the image data is output to the sheets of electronic paper. In each sheets, when the two page fields coincide with each other in comparison between the two page fields, an image based on the image data is displayed in a display region. When the two page fields are different from each other, the position page field is incremented by one, and the position page field is transmitted to the next electronic paper.

11 Claims, 40 Drawing Sheets

FOREIGN PATENT DOCUMENTS

| | | |
|---|---|---|
| JP | 9-101864 A | 4/1997 |
| JP | 11-202804 A | 7/1999 |
| JP | 2000-352962 | 12/2000 |
| JP | 2001-013937 | 1/2001 |
| JP | 2001-312427 A | 11/2001 |
| JP | 2002-207471 | 7/2002 |
| WO | WO 01-37070 | 5/2001 |
| WO | WO 02-056284 | 7/2002 |

* cited by examiner

FIG.25A
FIG.25B
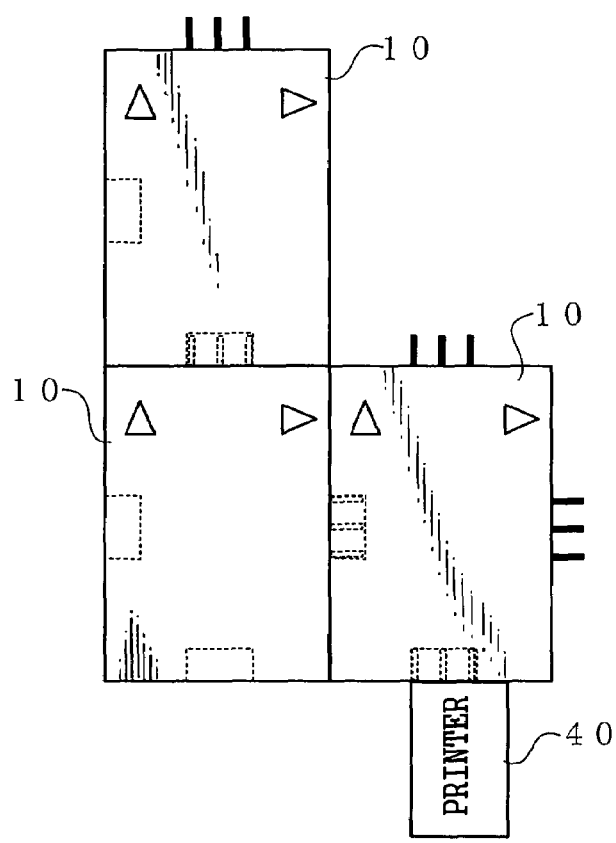
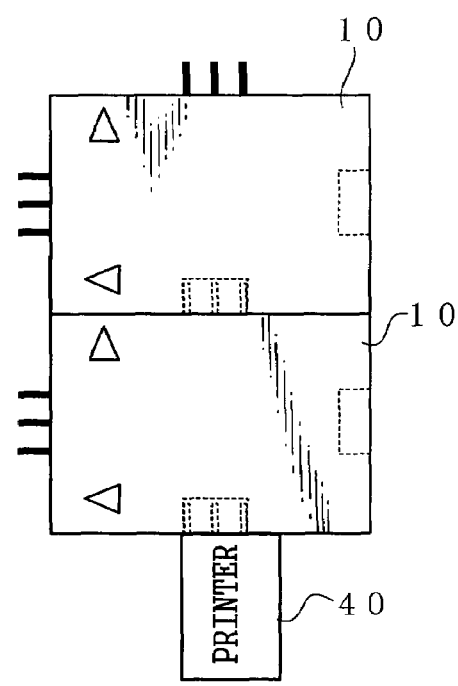

FIG.30A

PLEASE INPUT FOLLOWING ITEMS

SPECIFICATION OF DISPLAY IMAGE — A-2 HORIZONTAL

DISPLAY SIZE OF ELECTRONIC PAPER — A4

THE NUMBER OF SHEETS OF ELECTRONIC PAPER — 4

END

FIG.30B

PLEASE SELECT TRANSFER DIRECTION OF DISPLAY DATA

FIG.31A

DISPLAY DATA 60

| P1 | P2 | P3 | DT |
|----|----|----|-----|
| 1 | 1 | Y | AAA··· |
| 2 | 1 | Y | BBB··· |
| 3 | 1 | Y | CCC··· |
| 4 | 1 | Y | DDD··· |

FIG.31B

DISPLAY DATA 60

| P1 | P2 | P3 | DT |
|----|----|----|-----|
| 2 | 2 | Y | BBB··· |
| 3 | 2 | Y | CCC··· |
| 4 | 2 | Y | DDD··· |

FIG.31C

DISPLAY DATA 60

| P1 | P2 | P3 | DT |
|----|----|----|-----|
| 3 | 3 | Y | CCC··· |
| 4 | 3 | Y | DDD··· |

IMAGE DISPLAY APPARATUS, IMAGE DISPLAY SYSTEM, IMAGE DATA WRITING METHOD, THIN DISPLAY FILE, AND DATA COMMUNICATION METHOD FOR THIN DISPLAY FILE

CROSS-REFERENCE TO RELATED APPLICATION

This application claims priorities under 35 USC 119 from Japanese Patent Application Nos. 2002-354749, 2002-376810 and 2002-376854 disclosures of which are incorporated by reference herein.

BACKGROUND OF THE INVENTION

1. Field of the Invention

The present invention relates to an image display apparatus and an image data writing method and, more particularly, to an image display apparatus which detachably holds a thin display device and which can function as a printer or a display and an image data writing method therefor.

The invention relates to a thin display file and a data communication method for a thin display file and, more particularly, to a thin display file using a plurality of stacked thin display devices and a data communication method for the thin display file.

In addition, the invention relates to an image display apparatus and an image display system and, more particularly, to an image display apparatus which can realize a large screen by combining a plurality of image display apparatuses (causing a plurality of image display apparatuses to abut) and an image display system for realizing a large screen by combining a plurality of image display apparatuses.

2. Description of the Related Art

In recent years, with the development of information-oriented society, as a thin display device, so-called electronic paper that has both the advantages of electronic display and paper attracts attention. A large number of techniques related to the electronic paper are proposed (see, for example, Patent Document 1: Japanese Patent Application Laid-Open (JP-A) No. 9-101864, Patent Document 2: JP-A No. 2001-312427, Patent Document 3: JP-A No. 6-274129, and Patent Document 4: JP-A No. 11-202804).

For example, in the technique of Patent Document 1 (in particular, page 7, FIG. 1), tablet type electronic paper is proposed. In the electric paper described in Patent Document 1, a digitizer board is connected to a commercial outlet, a memory chip is mounted on a digitizer board, and digital paper is loaded as electronic paper. In this state, when letters or the like are input to the surface of an input film with handwriting, the various pieces of information input with handwriting are recognized as characters by the digitizer board, so that the pieces of information are displayed as the characters on the digital paper by heating of a heat panel of the digitizer board. In this manner, since the digital paper on which the various pieces of information are displayed maintains the display images even when unloaded from the digitizer board, the digital paper can be handled like paper. On the other hand, when the digital paper on which the various pieces of information are displayed is loaded on the digitizer board, the displayed information can be erased or corrected.

It is considered that a thin display device is used such that a plurality of thin display devices are staked on each other. Therefore, for example, Patent Document 2 (in particular, page 1, FIG. 1) proposes the following. That is, connection terminals having physical or electrical connection functions are arranged on sheets of electronic paper and main bodies, and the thin display devices are bundled in a file form. In Patent Document 1, the electronic paper can be detachably loaded on the main body, display data is recorded in a non-volatile memory arranged in a display unit of the electronic paper, so that the electronic paper unloaded from the main body holds the display contents. In Patent Document 2, the contents of a page can be held such that the page is opened.

In this manner, thin displays can be handled as a file like sheets of paper, and the reading properties of sheets of paper can be achieved.

In addition, as described in the technique described in Patent Document 3 (in particular, pages 6 to 7, FIG. 6), it is proposed that electronic paper can be used as a display device for a personal computer.

However, in the technique described in Patent Document 1, since tablet type electronic paper is used, the tablet type electronic paper disadvantageously occupies a large plane area.

In the technique described in Patent Document 2, when it is considered that electronic paper is used together with a display device such as a liquid crystal screen of a personal computer, information written in the electronic paper cannot be easily read.

Furthermore, as in Patent Document 2, when a plurality of thin display devices are connected to host apparatuses (in Patent Document 2, main bodies), conventionally, in order to identify the plurality of thin display devices, the host apparatuses must be connected to the thin display devices in one-to-one correspondence. Since connection connectors are arranged on the thin display devices, when a large number of thin display devices are stacked on each other, the positional relationships, e.g., vertical positions, of the plurality of thin display devices are cumbersomely identified.

In addition, the number of connection positions is increased by stacking a plurality of thin display devices on each other, so that the costs disadvantageously increase.

Further more, in the technique described in Patent Document 3, in consideration of use of sheets of electronic paper, writing in the sheets of electronic paper is not achieved. Since the display devices are arranged as main display devices, when it is considered that electronic paper is handled as a print printed by a printer, the display devices are low in usability.

In general, page sizes of documents expressed by document files formed as electronic files which can be handled on a computer are various sizes such as A-3 and A-4 sizes.

In contrast to this, in A-4 size display electronic paper which cannot be updated on real time, a document having a page size of A-3 size cannot be displayed without changing the page size. In A-4 size display electronic paper which can be updated on real time, when a document having a page size of A-3 size is directly displayed, a display images must be scrolled. The essential function of the electronic paper is spoiled, and the electronic paper is not different from a conventional electronic display.

Therefore, in order to realize display of documents having page sizes of A-4 size and A-3 size which are popularly handled as general documents by the same electronic paper without any problem, electronic paper for A-3 size must be prepared.

However, display schemes of electric paper include great variety of schemes. In general, as an image display size (screen size) increases, a yield in manufacture tends to decrease. In particular, in electronic-device-like electronic paper such as electronic paper using a liquid crystal, like a general liquid crystal display, this tendency is conspicuous.

Therefore, preparation of A-3 size electronic paper unnecessarily increases the costs for a user who wants to perform only display of an image having a page size of A-4 size.

On the other hand, as applications which can give the priority of electronic paper full play, applications having various screen sizes ranging from a small screen size of 10 cm or less for a mobile terminal device or the like to a large screen size, which is larger than A-3 size, for displaying newspaper, a signboard, or advertisement are considered. In this case, the yield of the electronic paper having a screen size which is larger than A-3 size is smaller than that of an electronic paper having a screen size which is equal to or smaller than A-3 size, and the costs jump.

In general, since electronic paper cannot be folded, electronic paper having a large screen size is inconveniently carried. With respect to this point, electronic paper having a large screen size has a disadvantage.

In order to solve the problems in cost and portability of electronic paper having a large screen size, the following is considered. That is, sheets of electronic paper are adjacently arranged on a plane, so that an image which is larger than the screen size of each sheet of electronic paper is displayed by combining the display surfaces of the sheets of electronic paper. As described above, as a technique related to display of an image having a large size and obtained by combining a plurality of display devices, there is a technique in which a plurality of cathode ray tubes and control devices are connected to each other in one-to-one correspondence to cause the control devices to control display of the images on the cathode ray tubes (for example, Patent Document 5: see Japanese Patent Application Publication (JP-B) No. 50-32009).

However, in this technique, the plurality of cathode ray tubes and the control devices must be connected to each other in one-to-one correspondence. Therefore, as a result, the costs disadvantageously increase.

More specifically, in this technique, the number of connections between the display devices and the control devices increases as the number of display devices is increased to enlarge the display area. Therefore, since the display devices and the control devices are connected to each other with relatively expensive wire harnesses, the increase in number of connections between the display devices and the control devices increases the number of wire harnesses. As a result, the costs of the apparatus as a whole increase.

As a technique which realizes a large screen such that sheets of electronic paper applied as display devices are adjacently arranged on a plane, the following technique may be considered. That is, images to be displayed on the sheets of electronic paper are displayed in advance, respectively, and the sheets of electronic paper are adjacently and planarly arranged by manpower in such a state that the display states of the sheets of electronic paper are held. However, in this technique, the sheets of electronic paper must be arranged at appropriate positions by manpower each time a display image is updated. This operation is very cumbersome.

The invention has been made to solve the above problems, and has as one object to provide an image display apparatus which holds a thin display device and which can be used in many different ways and an image data writing method therefor.

It is another object of the invention to provide an image data writing method for a convenient thin display device when a plurality of thin display devices are held.

It is still another object of the invention to provide a thin display file which can perform display control with a simple structure and simple communication and a data communication method for the thin display file.

It is still another object of the invention to provide an image display apparatus and an image display system which can display a large-size image without increasing costs.

SUMMARY OF THE INVENTION

In order to achieve the above objects, according to a first aspect of the present invention, there is provided an image display apparatus comprising: a plurality of thin display devices, each having a communication unit for transmitting and receiving image data expressing an image and a display unit for displaying an image based on the image data received by the communication unit; and a holding stand, having a transmission unit for transmitting the image data to the thin display devices, and for substantially vertically holding the plurality of thin display devices.

According to the first aspect of the invention, the image data transmitted from the transmission unit of the holding stand is received by the communication unit of the thin display device, and an image based on the image data is displayed on the display unit.

The holding stand holds a plurality of thin display devices. At this time, since the thin display device is vertically held, when a personal computer is connected to the image display apparatus, the image display apparatus can be used as a display or a sub-display.

When the image display apparatus is connected to a personal computer, an image based on image data obtained from the personal computer can be displayed on the thin display device, and the image display apparatus can also be used as a printer. Therefore, the image display apparatus holds the thin display device and can be used in many different ways.

The holding stand, as in the second aspect of the invention, may hold the thin display devices such that the thin display devices are stacked on each other.

The holding stand, as in the third aspect of the invention, may include a holding unit which can be attached to and detached from the holding stand while the holding stand holds the thin display device. In this manner, when the holding stand has the holding unit, a plurality of thin display devices can be carried while being held in the holding unit to make it easy to carry the thin display devices.

The holding stand, as in the fourth aspect of the invention, may include an input unit which can input a designation including an image display designation to the display unit of the thin display device. The input unit may be arranged in the holding unit according to the third aspect of the invention, or may be arranged on a main body side of the holding stand without being arranged in the holding unit.

According to a fifth aspect of the invention, in any one of the first to fourth aspects, the holding stand further includes an adding unit for adding, to the image data, page information expressing a page to be displayed in the plurality of thin display devices and page position information expressing a current page position of the image data by updating pages, and transmits the image data, to which the page information and the page position information have been added by the adding unit, to the thin display device by the transmission unit; and the thin display devices further include a decision unit for comparing the page information and the page position information of the image data received by the communication unit with each other to decide whether or not the page information and the page position information coincide with each other, an updating unit for updating the page position information after the decision made by the decision unit, and a sending unit for sending the image data, to which the page information and the page position information updated by the updating unit have been added, to the thin display device of the subsequent page or the holding stand.

According to the fifth aspect of the invention, in any one of the first to fourth aspects, the holding stand further includes an adding unit, the image data added with the page information and the page position information by the adding unit is transmitted to the thin display device by the transmission unit, so that, in the display apparatus, the image data added with the page information and the page position information is received by the communication unit.

The page information and the page position information are compared by the decision unit to decide whether or not the page information and the page position information coincide with each other, the page position information is updated by the updating unit, and the image data added with the page position information and the page information is sent to the subsequent thin display device or the subsequent holding stand by the sending unit.

More specifically, since the page position information is updated by the thin display device of each page, the thin display device of the page on which page information and page position information coincide with each other is a page on which an image should be displayed. Therefore, in the thin display device in which the page information and the page position information coincide with each other, display based on image data corresponding to the page information and the page position information is performed, so that a desired image can be displayed on the thin display device of a desired page.

In this manner, the page information and the page position information are added to the image data transmitted from the holding stand to update the page position information of each page, and only display based on image data is performed in a thin image display apparatus in which the page information and the page position information coincide with each other, so that display for the thin display devices held on the holding stand of the image display apparatus can be easily controlled.

As in the sixth aspect of the invention, when image data related to an image which has been displayed on a thin display device and page information and page position information added to the image data are stored in the storing unit, the holding stand can control a page to be displayed depending on the page information and the page position information stored in the storing unit when another image is displayed on the thin display device. For example, as in the seventh aspect of the invention, when an image has already been displayed on a thin display device held on the holding stand, the adding unit adds the page information and the page position to the image data based on the image data which is stored in the storing unit and to which the page information and the page position information have been added, such that the latest image is on a front most page, so that the latest image which is believed to be frequently used can be displayed on the front most surface.

An eighth aspect of the invention provides an image data writing method for writing image data in a plurality of thin display devices in a state in which the plurality of detachable thin display devices are stacked on each other and held, the method comprising the steps of: when write designation is performed, writing image data expressing an image which has already been written in the plurality of thin display devices in thin display devices respectively located one surface behind thin display devices in which the image data is already written; and writing the latest image data designated to be written in a thin display device located at a front most surface of the plurality of thin display devices.

According to the eighth aspect of the invention, when a plurality of thin display devices are stacked on each other, the latest image can be displayed on the front most thin display device, and image data can be conveniently written.

A ninth aspect of the invention provides a thin display file including a plurality of thin display devices each having a display unit for displaying an image based on image data expressing an image, and a host device for holding the plurality of thin display devices such that pages of the thin display devices are connected in series with each other and for sequentially transmitting the image data to the plurality of thin display devices, wherein: the host device includes an adding unit for adding, to the image data, page information expressing a page to be displayed in the plurality of thin display devices held as a plurality of pages and page position information expressing a current page position of the image data by updating pages, and a transmission unit for transmitting the image data, to which the page information and the page position information have been added by the adding unit to the thin display devices; and each of the thin display device includes a receiving unit for receiving the image data to which the page information and the page position information have been added, a decision unit for comparing the page information and the page position information of the image data received by the receiving unit with each other to decide whether or not the page information and the page position information coincide with each other, a control unit for controlling the display of the display unit based on a decision result of the decision unit, an updating unit for updating the page position information after the decision by the decision unit, and a sending unit for sending the image data, to which the page information and the page position information updated by the updating unit have been added, to the thin display device of the subsequent page or the host device.

According to the ninth aspect of the invention, thin display devices are stacked as, e.g., a plurality of pages, being connected in series with each other, and held by the host device to constitute a thin display file, and image data for displaying images on the thin display devices are sequentially transmitted by the host device.

In the host device, page information expressing a page to be displayed in thin display devices held as a plurality of pages and page position information expressing a current page position of image data by updating the respective pages are added to image data and transmitted to the thin display devices by the transmission unit.

In the thin display device, the receiving unit receives image data added with page information and page position information. The decision unit decides whether or not the page information and the page position information coincide with each other, and the control unit controls display on the display unit based on the decision result.

After the decision by the decision unit, the page position information is updated by the updating unit, and the image data added with the page position information and the page information is sent by the sending unit to the thin display device of the subsequent pages or the host device.

More specifically, each time image data is sequentially sent from the thin display devices, the page position information is updated by the thin display devices of the respective pages. Therefore, the thin display device of the page on which the page information and the page position information coincide with each other corresponds to a page on which an image should be displayed. Accordingly, a desired image can be displayed on the thin display device of a desired page.

In this manner, page information and page position information are added to image data transmitted from the host device, and page position information of each page is updated. In this state, when only display based on the image data is performed on a thin display device on which the page information and the page position information coincide with each other, display of the thin display file on each thin display device can be easily controlled. Therefore, display control can be performed with a simple structure and simple communication.

As in the tenth aspect of the invention, when the host device includes an accumulation unit and an input unit, a desired image can be displayed on the plurality of thin display devices held on the host device.

An eleventh aspect of the invention provides a thin display file wherein, in the ninth or tenth aspect, the thin display devices have the display units on front and rear surfaces thereof, the adding unit further adds, to the image data, front/rear information expressing the front and rear of a thin display device which is to display an image, and the control unit controls display on the display units on the front and rear surfaces of the thin display device based on the decision result of the decision unit and the front/rear information.

According to the eleventh aspect of the invention, even in the thin display device having the display units on its front and rear surfaces, as described above, a desired image can be displayed on the thin display device of a desired page.

In the series connection between the plurality of thin display devices and the host device, as in the twelfth aspect of the invention, connection sections through which the pages are electrically connected when the plurality of pages are stacked on each other are arranged on the front surfaces and rear surfaces of the thin display devices, and host connection sections are arranged at positions at the host device corresponding to the connection sections to make it possible to electrically connect the thin display devices and the host device to each other.

A thirteenth aspect of the invention provides a data communication method for a thin display file including a plurality of thin display devices each having a display unit for displaying an image based on image data expressing an image and a host device for holding a plurality of pages of the thin display devices such that the pages are connected in series with each other and for sequentially transmitting the image data to the plurality of thin display devices, wherein: the host device adds, to the image data, page information expressing a page to be displayed in the plurality of thin display devices held in the host device and page position information expressing a current page position of the image data by updating pages and sequentially transmits the image data to the thin display devices held in the host device; and the thin display devices of the plurality of pages held in the host device receive the image data to which the page information and the page position information have been added, display images on the display units based on the image data in which the page information and the page position information of the image data coincide with each other, update the page position information, and sequentially transmit image data in which the page position information is updated to the thin display devices of the subsequent pages or the host device.

According to the thirteenth aspect of the invention, page information expressing a page to be displayed in the plurality of thin display devices held in the host device and page information expressing a current page position of image data by updating each page are added to the image data by the host device, and the image data is sequentially transmitted to the thin display devices held in the host device.

The thin display devices held as the plurality of pages in the host device receive the image data added with the page information and the page position information and display images on the display units based on the image data in which the page information and the page position information coincide with each other.

The thin display devices update the page position information and sequentially transmit the image data added with the page information and the updated page position information to the thin display devices of the subsequent pages or the host device.

More specifically, each time image data is sequentially sent from the thin display devices, page position information is updated by the thin display device of each page, and the thin display device of a page on which page information and page position information coincide with each other corresponds to a page on which an image should be displayed. Therefore, a desired image can be displayed on the thin display device of a desired page.

In this manner, page information and page position information are added to image data transmitted by the host device, and the page position information is updated on each page. In this state, when only display based on the image data in a thin display device in which the page information and the page position information coincide with each other is performed, display of a thin display file on each thin display device can be easily controlled. Therefore, display control can be performed with a simple structure and simple communication.

According to a fourteenth aspect of the invention, in the thirteenth aspect of the invention, when the thin display devices have the display units on front and rear surfaces thereof, the host device further adds, to the image data, front/rear information expressing the front and rear of a thin display device which is to display an image, in addition to the page information and the page position information, and each thin display device displays images on the display units on the front and rear surfaces based on the image data in which the page information and the page position information coincide with each other and the front/rear information.

According to the fourteenth aspect of the invention, even in the thin display device having display units on its front and rear surfaces, as described above, a desired image can be displayed on the thin display device of a desired page.

A fifteenth aspect of the invention provides a thin display file including a plurality of thin display devices each having a display unit for displaying an image based on image data expressing an image, and a host device for holding the plurality of thin display devices such that pages of the thin display devices are connected in series with each other and for sequentially transmitting the image data to the plurality of thin display devices, wherein: the host device includes an adding unit for adding, to the image data, page information expressing a page to be displayed in the plurality of thin display devices held as a plurality of pages, and a transmission unit for transmitting the image data, to which the page information has been added by the adding unit, to the thin display devices; and each of the thin display devices includes a receiving unit for receiving the image data to which the page information has been added, a decision unit for comparing the page information of the image data received by the receiving unit and page setting information preset for each thin display device depending on the series connections between the thin display devices with each other to decide whether or not the page information and the page setting information coincide with each other, a control unit for controlling the display of the display units based on a decision result of the decision unit, and a sending unit for sending the image data, to which the page information has been added, to the thin display device of the subsequent page or the host device.

According to the fifteenth aspect of the invention, the plurality of display devices are stacked on each other, for example as a plurality of pages, by being connected in series with each other, and held by the host device to constitute a thin display file, and image data for displaying images on the thin display devices are sequentially transmitted from the host device.

In the host device, page information expressing a page to be displayed in the plurality of thin display devices held as a plurality of pages is added to image data, and the image data is transmitted to the thin display devices by the transmission units.

In the thin display device, the receiving unit receives image data added with page information. The decision unit decides whether or not the page information and the page setting information preset for each thin display device coincide with each other, and the control unit controls display on the display unit based on the decision result.

The sending unit sends image data added with page position information to the thin display devices of the subsequent pages or the host device. The page setting information, for example, when a plurality of thin display devices are held in the host device, can set the pages of the thin display devices on the thin display devices in advance, respectively.

More specifically, in the ninth aspect of the invention, page information and page position information are added to image data, the page position information is updated by each thin display device, and display is performed when the page information and the page position information coincide with each other. However, in the fifteenth aspect of the invention, only the page information is added to the image data, and the page setting information is preset in each thin display device in place of the page position information depending on a series connection between the thin display devices, so that an image is displayed when the page information and the page setting information coincide with each other. In this manner, as in the ninth aspect of the invention, display of a thin display file on each thin display device can be easily controlled. Therefore, display control can be performed with a simple structure and simple communication.

A sixteenth aspect of the invention provides a data communication method for a thin display file including a plurality of thin display devices each having a display unit for displaying an image based on image data expressing an image, and a host device for holding a plurality of pages of the thin display devices such that the pages are connected in series with each other and for sequentially transmitting the image data to the plurality of thin display devices, wherein: the host device adds, to the image data, page information expressing a page to be displayed in the plurality of thin display devices held in the host device and sequentially transmits the image data to the thin display devices held in the host device; and the thin display devices of the plurality of pages held in the host device receive the image data to which the page information has been added, display images on the display units based on image data in which the page information of the image data and page setting information preset for each thin display device depending on a series connection between the thin display devices coincide with each other, and sequentially transmit the image data, to which the page information has been added, to the thin display device of the subsequent page or the host device.

According to the sixteenth aspect of the invention, the host device adds page information expressing a page to be displayed in the plurality of thin display devices held in the host device to the image data and sequentially transmits the image data to the thin display devices held in the host device.

The thin display devices held as a plurality of pages in the host device receive the image data added with the page information and display images on the display units based on the image data in which the page information of the image data and the page setting information preset depending on a series connection between the thin display devices coincide with each other. The page setting information, for example, when a plurality of thin display devices are held in the host device, can set the pages of the thin display devices on the thin display devices in advance, respectively.

The thin display devices sequentially transmit the image data added with the page information to the thin display devices of the subsequent pages and or host device.

More specifically, in the thirteenth aspect of the invention, the page information and the page position information are added to the image data, the page position information is updated by each thin display device, and an image is displayed when the page information and the page position information coincide with each other. However, in the sixteenth aspect of the invention, only the page information is added to the image data, the page setting information is preset for each thin display device in place of the page position information depending on a series connection between the thin display devices, so that an image is displayed when the page information and the page setting information coincide with each other. In this manner, as in the thirteenth aspect of the invention, since display of the thin display file on each thin display device can be easily controlled. Therefore, display control can be performed with a simple structure and simple communication.

An image display apparatus according to a seventeenth aspect of the invention includes: a display unit having a display surface for displaying an image; a first coupling section for coupling with another first image display apparatus such that the display surface of the image display apparatus and a display surface of the first image display apparatus face the same direction and are located on a common plane or coupling with an information processing device for outputting display information including image information expressing an image to be displayed on the display surface of the display unit, and for making it possible to input the display information from the first image display apparatus or the information processing device which is coupled, by coupling with the first image display apparatus or the information processing device; a second coupling section for coupling with another second image display apparatus such that the display surface of the image display apparatus and a display surface of the second image display apparatus face the same direction and are located on a common plane, and for making it possible to output display information including image information expressing an image to be displayed by the second image display apparatus to the second image display apparatus, by coupling with the second image display apparatus; and a display control unit for performing control for displaying, on the display surface of the display unit, an image expressed by the image information included in the display information input from the first image display apparatus or the information processing device coupled with the image display apparatus via the first coupling section.

According to the image display apparatus according to the seventeenth aspect of the invention, an image is displayed on the display surfaces of the display units. The display units include various displays such as a cathode ray tube display, a liquid crystal display, a plasma display, and an organic EL display. In consideration of portability and convenience in use, an electrophoretic display or a magnetophoretic display is preferably used.

In this case, in the seventeenth aspect of the invention, the first coupling section couples another first image display apparatus such that both the display surfaces face the same direction and are located on a common plane or couples the information processing device for outputting display information including image information expressing an image to be displayed on the display surfaces of the display units, and it is made possible to input the display information from the first image display apparatus or the information processing device coupled by coupling the first image display apparatus or the information processing device. The second coupling section couples another second image display apparatus such that both display surfaces face the same direction and are located on a common plane, and couples the second image display apparatus to make it possible to output display information including image information expressing an image to be displayed by the second image display apparatus to the second image display apparatus.

As the first coupling section and the second coupling section, various coupling members which can mechanically couple another image display apparatus or an information processing device, various connectors which can mechanically and electrically couple another image display apparatus or an information processing device can be applied.

In the invention, an image expressed by the image information included in the display information input from the first image display apparatus or the information processing device coupled by the first coupling section is displayed on the display surfaces of the display units by the control of the display control unit.

More specifically, in the invention, the plurality of image display apparatuses according to the invention can be coupled to each other such that the display surfaces of the image display apparatuses face the same direction and are located on a common plane. In this manner, the display surfaces of the plurality of image display apparatuses are combined to each other to make it possible to display a large-size image.

In the invention, the image display apparatus is coupled to the first image display apparatus or the information processing device by the first coupling section, so that display information including image information expressing an image to be displayed can be input from the coupled first image display apparatus or the coupled information processing device. The image display apparatus is coupled to the second image display apparatus by the second coupling section, so that display information including image information expressing an image to be displayed on the second image display apparatus can be output. In this manner, when a plurality of image display apparatuses according to the invention are coupled to each other, display information including image information to be displayed by each image display apparatus is input from an external information processing device such as a personal computer to at least one of the plurality of image display apparatuses to make it possible to output the display information from the image display apparatus to which the display information is input to another image display apparatus through the second coupling section. As a result, the number of connections between the image display apparatuses and the information processing device can be made one at the minimum. An increase in cost caused by using a plurality of image display apparatuses can be avoided.

As described above, according to the seventeenth aspect of the invention, a large-size image can be displayed without causing an increase in cost.

In a conventional image display apparatus, a display direction (vertical direction) of an image with respect to the display surface is determined in advance. On the other hand, in an image display apparatus according to the invention, a main mode in use of the image display apparatus is a mode in which a plurality of image display apparatuses are coupled. When the plurality of image display apparatuses are arbitrarily coupled to each other, the display directions of the images with respect to the display surfaces of the image display apparatuses may not be equal to each other. In this case, the directions of the images to be displayed vary depending on the image display apparatuses.

Therefore, an image display apparatus according to an eighteenth aspect of the invention, in the seventeenth aspect of the invention, further includes a specifying unit for specifying a display direction of an image with respect to the display surface of the display unit.

According to the image display apparatus according to the eighteenth aspect of the invention, the display direction of the image with respect to the display surface of the display unit of the invention is specified by the specifying unit. The specification of the display direction by the specifying unit can be performed by printing an arrow, a sign, a character, or the like indicating the display direction, displaying on the display surface, or the like.

As described above, according to the image display apparatus of the eighteenth aspect, the same effect as in the seventeenth aspect of the invention can be achieved, and the display direction of an image with respect to the display surface of the display unit is specified. Therefore, when a plurality of image display apparatuses are coupled to each other, the image display apparatuses are coupled to each other such that the display directions are equal to each other to make it possible to prevent a situation that the directions of images displayed on the image display apparatuses are different from each other from occurring.

When the plurality of image display apparatuses according to the invention are coupled with each other, depending on a method of forming display information input to the image display apparatuses, a display image obtained by an image display apparatus may be upside down, or the directions of display images may be shifted by 90°.

Therefore, an image display apparatus according to a nineteenth aspect of the invention, in the seventeenth or eighteenth aspect, further includes a change designation input unit for inputting a change designation for changing a display direction of an image displayed on the display surface of the display unit. When a change designation is input by the change designation input unit, the display control unit changes a display direction of the image depending on the change designation.

According to the image display apparatus of the nineteenth aspect of the invention, when the change designation input unit for inputting a change designation of a display direction of an image displayed on the display surface of a display unit inputs the change designation, the display control unit of the invention changes the display direction of the image depending on the change designation. The change designation input unit includes a switch, a voice input device, or the like.

In this manner, according to the image display apparatus of the nineteenth aspect, the same effect as in the seventeenth or eighteenth aspect of the invention can be achieved, and, when the change designation of the display direction of the image displayed on the display surface of the display unit is input, the display direction of the image is changed depending on the change designation. Therefore, the display direction of the image can be easily corrected.

On the other hand, when the plurality of image display apparatuses according to the invention are coupled to each other, depending on a method of forming display information input to the image display apparatuses, the position of a display image obtained by an image display apparatus and the position of a display image obtained by an adjacent image display apparatus may be inverted.

An image display apparatus according to a twentieth aspect of the invention, in any one of the seventeenth to nineteenth aspects of the invention, further includes an exchange designation input unit for inputting an exchange designation for changing an image displayed by another image display apparatus coupled with the image display apparatus via at least one of the first coupling section and the second coupling section and an image displayed on the display surface of the display unit. When an exchange designation is input by the exchange designation input unit, the display control unit performs control for exchanging an image displayed by the other image display apparatus for the image displayed on the display surface of the display unit depending on the exchange designation.

According to the image display apparatus of the twentieth aspect of the invention, when the exchange designation input unit for inputting an exchange designation between an image displayed by another image display apparatus coupled by at least one of the first coupling section and the second coupling section and an image displayed on the display surface of the display unit of the image display apparatus inputs the exchange designation, control for exchanging the image displayed by the other image display apparatus for the image displayed on the display surface of the display unit of the image display apparatus is performed by the display control unit of the invention depending on the exchange designation. The exchange designation input unit includes a switch, a voice input device, or the like.

In this manner, according to the image display apparatus of the twentieth aspect of the invention, the same effect as in any one of the seventeenth to nineteenth aspects of the invention can be achieved, and when the position of the image display apparatus and the position of the image displayed by the other image display apparatus are inverted, the positional relationship can be easily corrected.

On the other hand, in order to achieve the above object, an image display system according to a twenty-first aspect of the invention includes: a plurality of image display apparatuses according to any one of the seventeenth to twentieth aspects coupled to each other via the first coupling sections and the second coupling sections; and an information processing device including a coupling section which is coupled to the first coupling section of any one of the plurality of image display apparatuses and which makes it possible to output the display information to the image display apparatus by being coupled thereto, an information forming unit for forming the display information to be output to the image display apparatus coupled to the information processing device via the coupling section, and an information output unit for outputting the display information formed by the information forming unit to the image display apparatus coupled to the information processing device via the coupling section.

According to the image display system of the twenty-first aspect of the invention, the plurality of image display apparatuses of the invention are coupled to each other by the first coupling section and the second coupling section.

In the invention, the information processing device is coupled to the first coupling section of any one of the plurality of image display apparatuses by the coupling section and makes it possible to output the display information to the image display apparatus, and the information forming unit forms the display information to be output to the image display apparatus, and the formed display information is output to the image display apparatus by the information output unit. As the coupling section, various coupling members which can be mechanically coupled to any one of the plurality of image display apparatuses, various connectors which can be mechanically and electrically coupled to the image display apparatus, or the like can be applied.

More specifically, in the invention, the plurality of image display apparatuses of the invention are coupled to each other, so that a large-size image can be displayed by combining the display surfaces of the plurality of image display apparatuses.

In the invention, the information processing device is coupled to any one of these image display apparatuses, so that display information is output from the information processing device to the image display apparatus. The image display apparatus of the invention can output the display information to another image display apparatus through the second coupling section. As a result, the number of connections between the image display apparatuses and the information processing device can be made one at the minimum, and an increase in cost caused by using the plurality of image display apparatuses can be avoided.

In this manner, according to the image display system of the twenty-first aspect of the invention, a large-size image can be displayed without increasing the cost.

A twenty-second aspect of the invention provides an image display system comprising, in the twenty-first aspect of the invention, a size information input unit for inputting image size information expressing the sizes of images displayed on the plurality of image display apparatuses and display size information expressing display sizes of the display units of the plurality of image display apparatuses to the information processing device, wherein the information forming unit of the information processing device forms the display information so as to include image information expressing the images based on the image size information and the display size information input by the size information input unit such that the image information is divided into units of regions to be displayed on the display surfaces in the plurality of image display apparatuses.

According to the image display system of the twenty-second aspect of the invention, in the information processing device, the size information input unit inputs image size information expressing the sizes of images displayed on the plurality of image display apparatuses of the invention and display size information expressing the display sizes of the display units on the plurality of image display apparatuses. The size information input unit includes a keyboard, a touch panel, a voice input device, or the like.

The information forming unit includes the image information expressing the images in the display information based on the image size information and the display size information input by the size information input unit such that the image information is divided in units of regions to be displayed on the display surfaces of the plurality of image display apparatuses.

For example, when the size of an image expressed by the image size information is A-2 size, and when a display size expressed by the display size information is A-4 size, image information expressing the image is included in the display information such that the image is divided in units of four regions obtained by equally dividing the image by two in both the longitudinal direction and the latitudinal direction. When the size of the image expressed by the image size information is A-3 size, and when the display size expressed by the display size information is A-4 size, the image information expressing the image is included in the display information such that the image information is divided in units of two regions obtained by equally dividing the image by two in only the longitudinal direction.

In this manner, display information is formed in the information processing device and then output to one of the image display apparatuses, so that each image display apparatus can easily extract image information expressing image displayed on the display surface of the corresponding image display apparatus from the display information and can easily display the image.

As described above, according to the image display system of the twenty-second aspect of the invention, the same effect as that of the twenty-first aspect of the invention can be achieved, and the image information expressing the images displayed on the plurality of image display apparatuses of the invention is included in the display information based on the sizes of the images and the display sizes of the display units in the plurality of image display apparatuses such that the image information is divided in units of regions to be displayed on the display surfaces of the plurality of image display apparatuses.

A twenty-third aspect of the invention provides an image display system, wherein: in the twenty-first aspect of the invention, the information forming unit of the information processing device forms the display information so as to include therein pieces of image information expressing images displayed by the plurality of image display apparatuses such that the pieces of image information are related to display destination information expressing the image display apparatus on which the images are displayed, and so as to include therein display destination update information serving as information which coincides with the display destination information expressing an image display apparatus serving as an output destination of the display information due to updating of the display information in the image display apparatus to which the display information is input; and the display control units of the plurality of image display apparatuses perform control such that the image expressed by the image information related to the display destination information which coincides with the display destination update information included in the input display information is displayed on the display surface of the display unit, and update the display destination update information such that the display destination update information coincides with the display destination information expressing an image display apparatus serving as an output destination of the display information.

According to the image display system of the twenty-third aspect of the invention, the information forming unit of the information processing device includes pieces of image information expressing images displayed by the plurality of image display apparatuses of the invention in the display information of the invention such that the pieces of image information are related to display destination information expressing the image display apparatus on which the images are displayed, and includes display destination update information serving as information which coincides with the display destination information expressing an image display apparatus serving as an output destination of the display information by updating the display information in the image display apparatus to which the display information is input.

The display control units of the plurality of image display apparatuses perform control such that the image expressed by the image information related to the display destination information which coincides with the display destination update information included in the input display information is displayed on the display surface of the display unit, and updates the display destination update information such that the display destination update information coincides with the display destination information expressing an image display apparatus serving as an output destination of the display information.

In this manner, according to the image display system of the twenty-third aspect of the invention, the same effect as in the twenty-first aspect of the invention can be achieved, and the information processing device can easily form the display information, the image display apparatus can easily specify the image information expressing an image to be displayed. As a result, images can be easily displayed by the plurality of image display apparatuses.

A twenty-fourth aspect of the invention provides an image display system wherein, in the twenty-first aspect of the invention, the plurality of image display apparatuses further include storage units in which identification information different from the identification information of other image display apparatuses is stored; the information forming unit of the information processing device forms the display information so as to include therein image information expressing an image displayed on at least one display surface of the plurality of image display apparatuses and the identification information of the image display apparatus for displaying the image, such that the image information and the identification information are related to each other; and the display control units of the plurality of image display apparatuses perform control such that only an image expressed by image information related to identification information which coincides with the identification information stored in the storage unit is displayed on the display surfaces of the display units.

According to the image display system of the twenty-fourth aspect of the invention, identification information which is different from the identification information of another image display apparatus is stored by the storage unit arranged in the plurality of image display apparatuses of the invention. As the identification information, any information such as character information, numerical information, and symbolic information which is different from that of another image display apparatus can be applied. The storage unit includes a storage device such as a ROM (Read Only Memory), an EEPROM (Electrically Erasable and Programmable ROM), and a flash EEPROM (Flash EEPROM), a portable recording medium such as a floppy disk, a CD-R (Compact Disc-Recordable), a CD-RW (Compact Disk-Re-Writable), a magnetic optical disk, or a magnetic tape, or a fixed recording medium such as a hard disk.

In the invention, the information forming unit of the information processing device includes image information expressing an image displayed on at least one display surface of the plurality of image display apparatuses and identification information of the image display apparatus on which the image is displayed in display information such that the image information and the identification information are related to each other, and the display control units of the plurality of image display apparatuses perform control such that only the image expressed by the image information related to the identification information which coincides with the identification information stored in the storage unit is displayed on the display surfaces of the display units.

In this manner, according to the image display system of the twenty-fourth aspect of the invention, the same effect as in the twenty-first aspect of the invention can be achieved, and the information processing device can easily form display information, and the image display apparatus can easily specify image information expressing an image to be displayed. As a result, images can be easily displayed by the plurality of image display apparatuses.

A twenty-fifth aspect of the invention provides an image display system wherein, in the twenty-third or twenty-fourth aspect of the invention, the plurality of image display apparatuses further include information deleting units for deleting image information expressing images displayed by the display units and information related to the image information from the display information.

According to the image display system of the twenty-fifth aspect of the invention, the information deleting units in the plurality of image display apparatuses of the invention delete the image information expressing images displayed by the display units and information related to the image information from the display information.

In this manner, according to the image display system of the twenty-fifth aspect of the invention, the same effect as in the twenty-third or twenty-fourth aspect can be achieved, and the plurality of image display apparatuses of the invention delete the image information expressing the images displayed by the display units and the information related to the image information from the display information. Therefore, infinite transfer of the display information between the image display apparatuses caused by remanence of the image information expressing the images displayed by the image display apparatuses and the information related to the image information in the display information can be prevented.

Furthermore, a twenty-sixth aspect of the invention provides an image display system wherein, in any one of the twenty-first to twenty-fifth aspects of the invention, the shapes of the display surfaces of the image display apparatuses are rectangular; when an image expressed by image information included in the display information is rectangular, the information forming unit of the information processing device forms the display information so as to include direction information indicating a longitudinal direction of the image; and when the direction information is included in the display information, the display control units of the plurality of image display apparatuses perform control such that the image expressed by the image information included in the display information is displayed on the display surfaces so as to make the longitudinal direction indicated by the direction information coincide with longitudinal directions of the display surfaces.

According to the image display system of the twenty-sixth aspect of the invention, the same effect as in any one of the twenty-first to twenty-fifth aspects of the invention can be achieved, and a non-display region of a display image on the display surface is prevented from being formed by a reason that the longitudinal direction indicated by the direction information is different from the longitudinal direction of the display surface.

BRIEF DESCRIPTION OF THE DRAWINGS

FIG. 25A is a plan view showing the configuration of another image display system 550.

FIG. 25B is a plan view showing the configuration of another image display system 550.

FIG. 30A is a schematic view showing an example of an information input screen 1 according to the fourth embodiment.

FIG. 30B is a schematic view showing an example of an information input screen 2 according to the fourth embodiment.

FIG. 31A is a pattern diagram showing the configuration of display data 560 according to the fourth embodiment.

FIG. 31B is a pattern diagram showing the configuration of the display data 560 according to the fourth embodiment.

FIG. 31C is a pattern diagram showing the configuration of the display data 560 according to the fourth embodiment.

DETAILED DESCRIPTION OF THE INVENTION

First Embodiment

An embodiment of the present invention will be described below with reference to the accompanying drawings. In the embodiment, the invention is applied to an image display apparatus constituted by electronic paper serving as a thin display device and a holding stand for holding the electronic paper.

Figure 1:
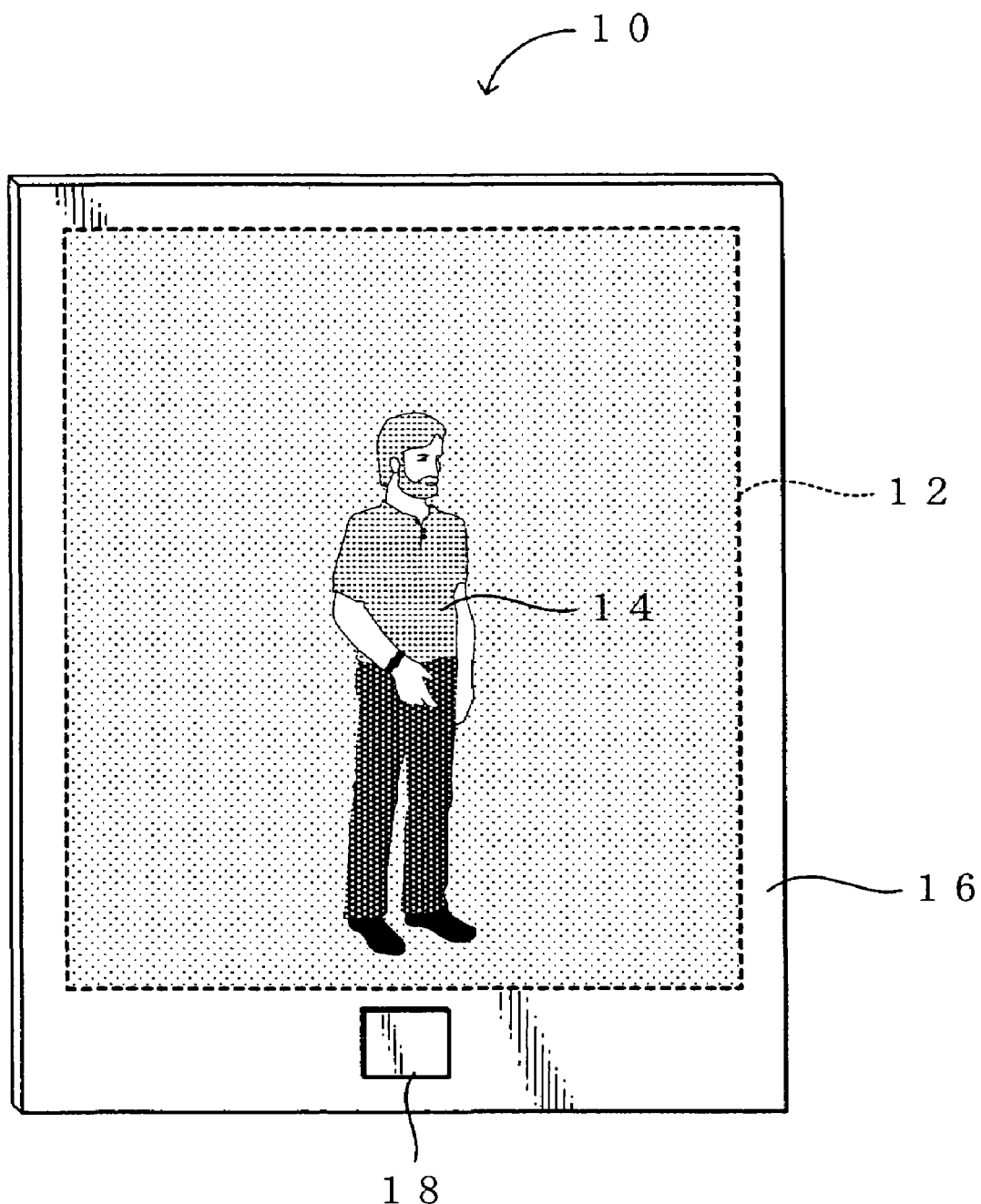
FIG. 1 is a perspective view showing the appearance of electronic paper according to an embodiment of the present invention.

FIG. 1 shows the appearance of electronic paper 10 according to the embodiment of the invention. As the electronic paper 10 according to the embodiment, electronic paper, to which a technique such as rotation of toner, electrophoretic migration, thermal rewritable, liquid crystal, and electrochromy is applied, can be used.

As shown in FIG. 1, the electronic paper 10 according to the first embodiment of the invention has a display region 12, so that an image 14 including a text image is displayed in the display region 12.

The display region 12 is held by an outer frame 16. The display region 12 and the outer frame 16 consist of a flexible material, and can be handled like paper.

The outer frame 16 has connection section 18 for electrically connecting sheets of electronic paper 10 when the sheets of electronic paper 10 are stacked on each other to make it possible to transmit and receive image data or the like to be displayed in the display region 12 through the connection section 18.

Connection sections 18 are arranged on the front and rear surfaces of the electronic paper 10. When the sheets of electronic paper 10 are stacked on each other, the connection sections 18 are electrically connected to each other. As the connection section 18, in the embodiment, a contact type one such as a contact point or the like is applied. However, a connector that is also contact type and is mechanically connected to another connector may be applied, or a non-contact type connection section using weak electromagnetic induction or the like may be applied.

Figure 2:
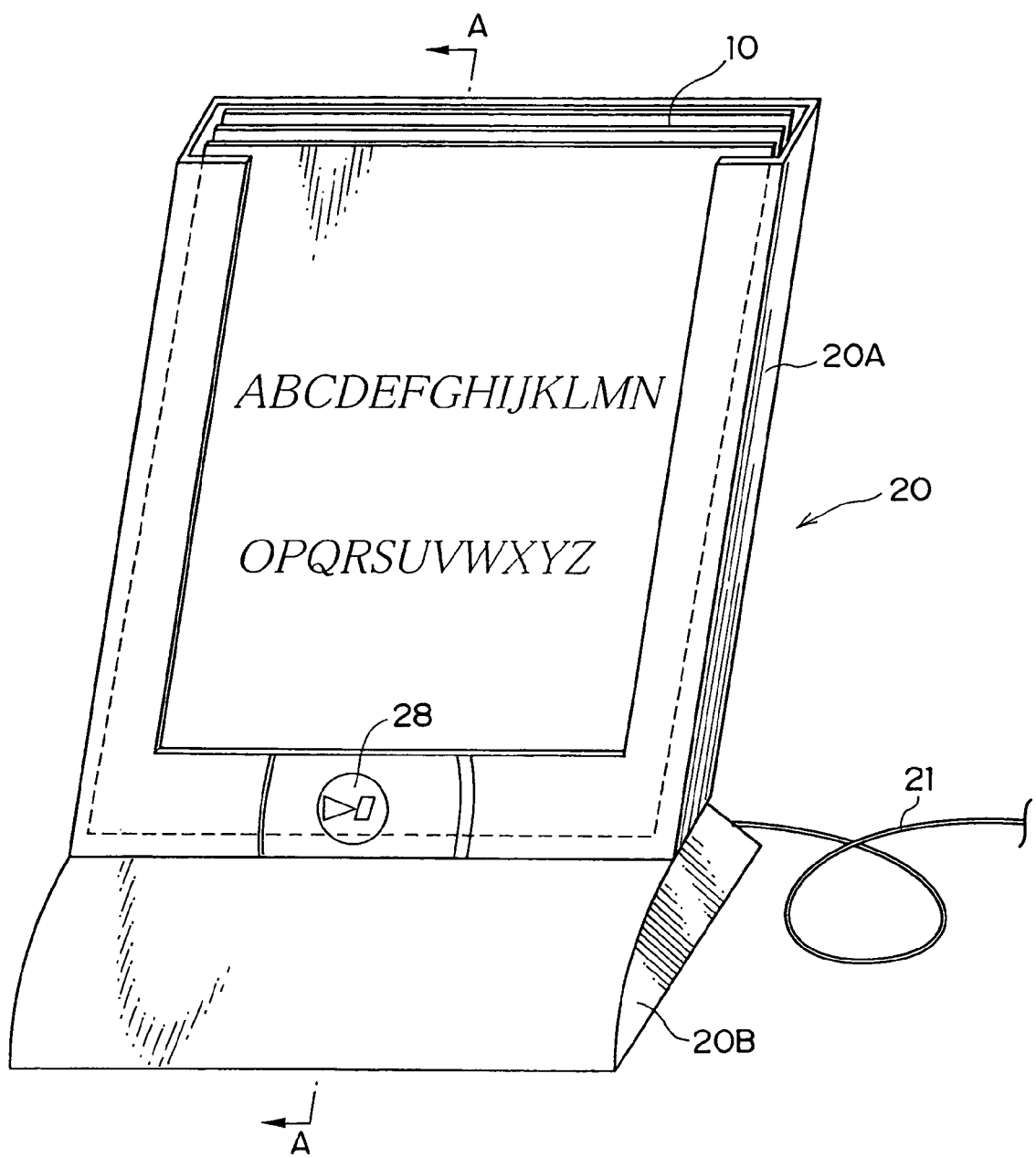
FIG. 2 is a perspective view showing a holding stand for holding electronic paper according to the embodiment of the invention.

FIG. 2 shows a holding stand 20 on which the electronic paper 10 is substantially vertically placed. The holding stand 20 is constituted by a carrying case 20A for holding sheets of electronic paper 10 and a base 20B for uprightly supporting the carrying case 20A such that the carrying case 20A is substantially vertical.

The carrying case 20A is formed so as to have a box-like shape such that the sheets of electronic paper 10 can be stored. The upper surface of the box-like case is cut out such that the electronic paper can be inserted or picked up from above. The carrying case 20A has a box-like shape of which a portion corresponding to the display region 12 of the front most electronic paper 10 is cut out such that an image displayed on the electronic paper 10 can be visually checked from the front of the carrying case 20A. More specifically, the front most surface of the carrying case 20A has a U-shaped section at both of the side ends and the lower end. The electronic paper 10 is guided by the U-shaped portion so as to be inserted into and removed from the carrying case 20A. Although the electronic paper 10 is inserted into or removed from the upper surface of the carrying case 20A in the above configuration, another configuration in which the electronic paper 10 is inserted into or removed from the left or right of the electronic paper 10 can be selected.

Figure 3:
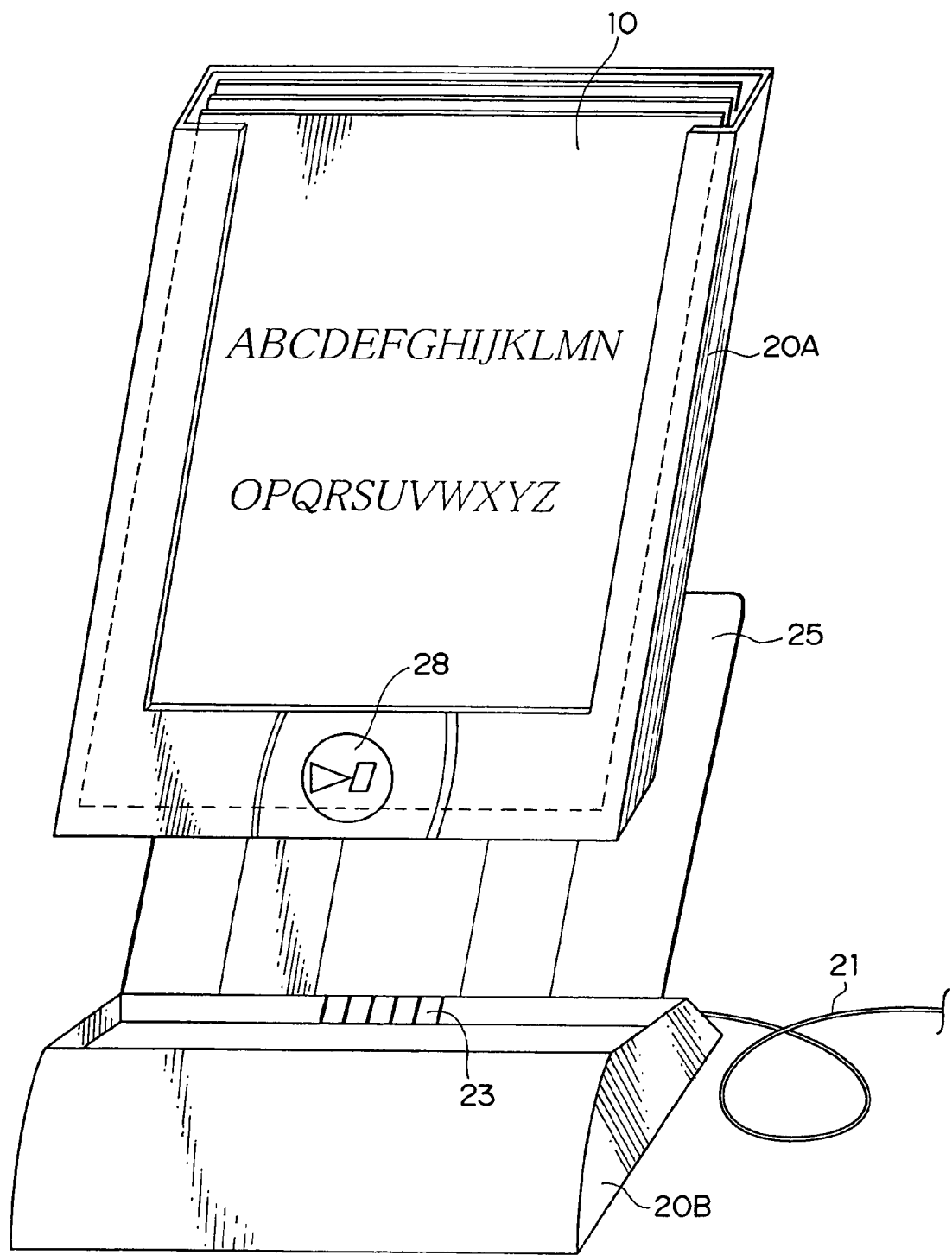
FIG. 3 is a perspective view showing the holding stand and a carrying case.

The carrying case 20A, as shown in FIG. 3, is designed such that the carrying case 20A can be attached to and detached from the base 20B. The carrying case 20A brings together the sheets of electronic paper 10 to make it possible to carry the sheets of electronic paper 10.

An operation unit 28 which can perform display designation or the like of an image on the electronic paper 10 is arranged in the carrying case 20A. Input designation to the operation unit 28 makes it possible to display an image in the display region 12 of the electronic paper 10. The operation unit 28 is lighted or caused to flicker depending on an image display state or the like of the electronic paper 10.

Figure 4:
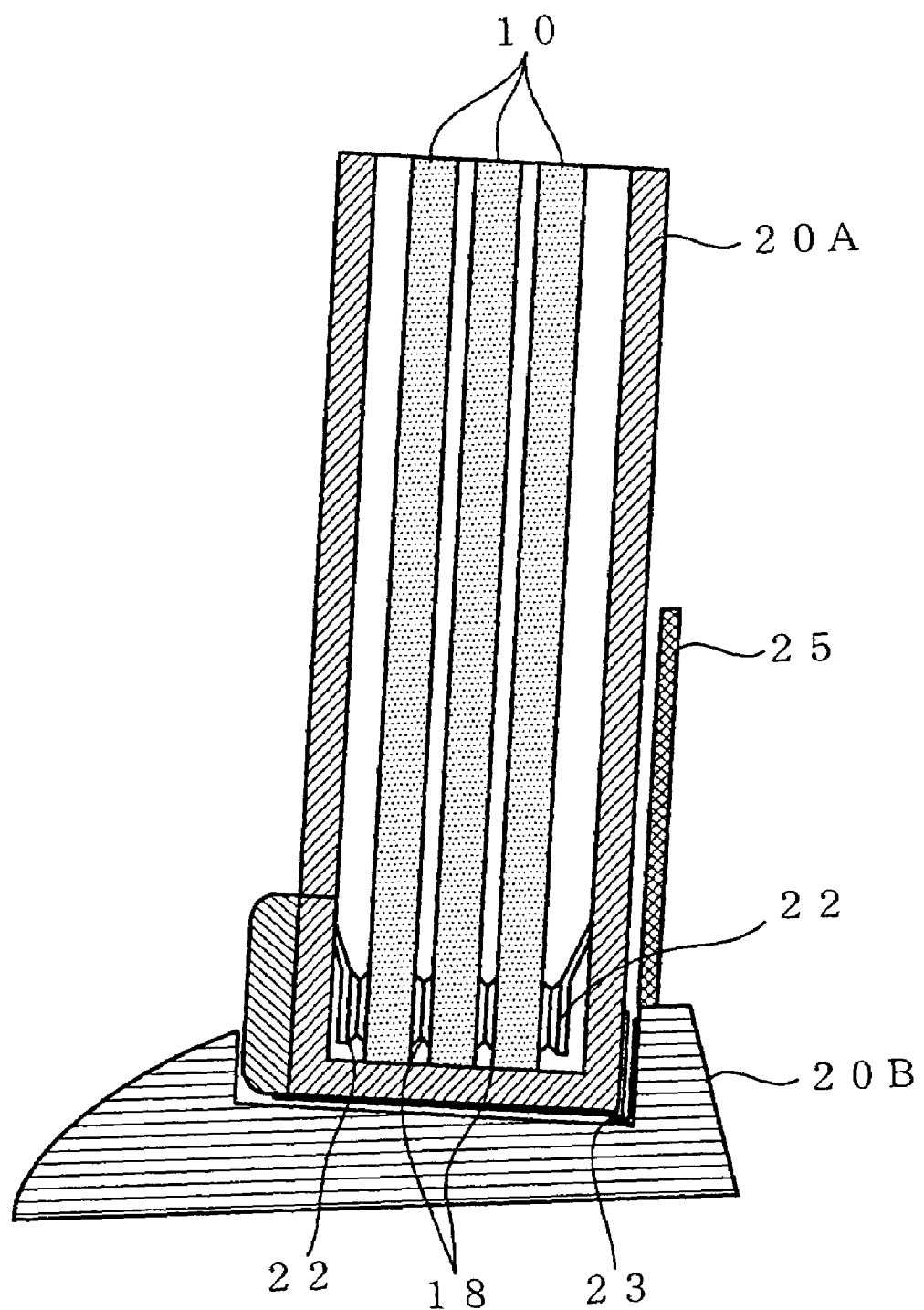
FIG. 4 is a sectional view showing the holding stand cut along an A-A line in FIG. 2.

Furthermore, at a position where the electronic paper 10 in the carrying case 20A is placed, as shown in FIG. 4, a connection section 22 is arranged at a position corresponding to the connection section 18 of the electronic paper 10. The electric connection to the electronic paper 10 is established by connection between the connection section 18 of the electronic paper 10 and the connection section 22 of the carrying case 20A.

Since the connection section 22 of the carrying case 20A appropriately connects the sheets of electronic paper 10 regardless of the number of sheets of electronic paper 10 stored in the carrying case 20A, the connection section 22 is biased toward the electronic paper 10. For example, the connection section 22 has a leaf-spring shape. Therefore, regardless of the number of sheets of electronic paper 10, the connection section 18 of the electronic paper 10 and the connection section 22 of the carrying case 20A can be reliably connected to each other.

On the other hand, on the base 20B, as shown in FIG. 3, a power supply cable 21 for obtaining a power such as commercial power is arranged such that the power can be obtained from the commercial power.

On the base 20B and the carrying case 20A, connection sections 23 for establishing electric connection between the base 20B and the carrying case 20A are arranged. As shown in FIG. 4, the carrying case 20A is placed on the base 20B, so that the carrying case 20A and the base 20B are electrically connected to each other by the connection sections 23.

Furthermore, on the base 20B, a support member 25 for supporting the carrying case 20A to prevent the carrying case 20A from being tilted is provided. More specifically, the carrying case 20A, as shown in FIGS. 2 to 4, is substantially vertically arranged on the base 20B and supported by the support member 25 to prevent the carrying case 20A from being tilted.

Subsequently, the electric configuration of the electronic paper 10 and the holding stand 20 will be described below with reference to the block diagram in FIG. 5.

Figure 5:
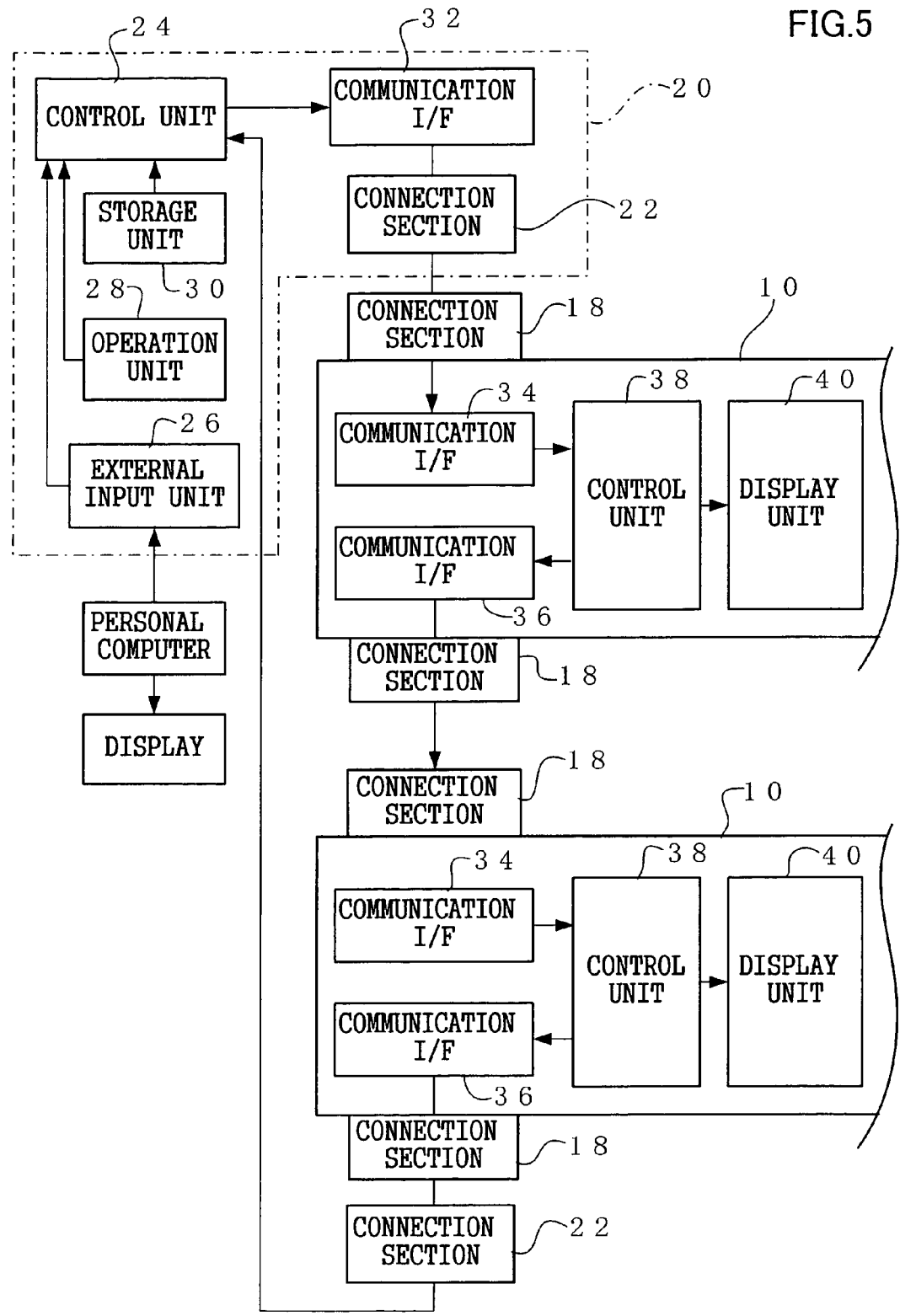
FIG. 5 is a block diagram showing the electric configuration of the holding stand and the electronic paper according to the embodiment of the invention.

As shown in FIG. 5, the holding stand 20 comprises a control unit 24, an external input unit 26, an operation unit 28, a storage unit 30, and a communication interface (I/F) 32. The holding stand 20 is designed to be totally controlled by the control unit 24.

The external input unit 26 is designed to input image data displayed on the electronic paper 10 from a personal computer 50 or another external device. The image data input by the external input unit 26 is stored in the storage unit 30.

The image data accumulated in the storage unit 30 is converted into data of a predetermined format by the control unit 24 and output to the electronic paper 10 through the communication I/F 32 and the connection section 22.

More specifically, the electronic paper 10 can be used as a sub-display or a printer for the personal computer 50 to which a display 52 is connected.

The holding stand 20 can perform various operations through the operation unit 28. For example, in this embodiment, transmission or the like of the image data stored in the storage unit 30 to the electronic paper 10 can be operated and designated by operation of the operation unit 28. In addition, the operation unit 28 can operate and designate re-display or the like of image data which has not been completely operated.

On the other hand, each of the sheets of electronic paper 10 stored in the carrying case 20A includes communication I/Fs 34 and 36, a control unit 38, and a display unit 40 to input image data transmitted from the communication I/F 32 of the holding stand 20 through the connection section 18 and the communication I/F 34.

The image data input through the communication I/F 34 is input to the control unit 38, and image data to be displayed is extracted by the control unit 38 and input to the display unit 40, so that an image is displayed in the display region 12 by the display unit 40.

The remaining image data, from which the image data to be displayed in the display region 12 by the control unit 38 is extracted, is designed to be transmitted to another sheet of electronic paper 10 or the holding stand 20 through the communication I/F 36 and the connection section 18.

The control unit 38 includes a nonvolatile memory to store image data to be displayed on the display unit 40. The image displayed on the display unit 40 can be maintained even if a power (not shown) supplied from the holding stand 20 is blocked.

The configuration of image data transmitted from the holding stand 20 to the electronic paper 10 and communication of the image data will be described below.

Figure 6:
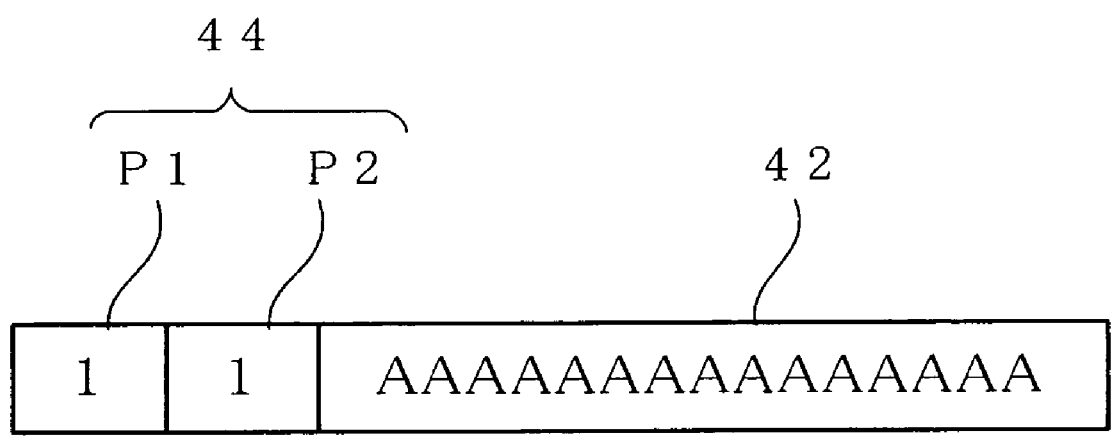
FIG. 6 is a pattern diagram showing the configuration of image data transmitted from the holding stand to the electronic paper.

In the control unit 24 of the holding stand 20, image data input from an external device such as an external personal computer 50 through the external input unit 26 and accumulated in the storage unit 30 is added with additional information and output. As the additional information in this embodiment, as shown in FIG. 6, two page fields (display page field P1 and position page field P2) 44 are added to page data 42 serving as image data to output to the electronic paper 10.

The display page field P1 expresses the number of pages of electronic paper 10 to be displayed, and the position page field P2 expresses a current page position of the electronic paper 10 and is designed to be incremented on each sheet of electronic paper 10.

The control unit 38 of the electronic paper 10 reads the two page fields 44 of the image data added with the page fields 44 as described above and compares the page fields 44 with each other. When the two page fields 44 (P1 and P2) coincide with each other, the image data is designed to be displayed in the display region 12 by the display unit 40. When the two page fields 44 do not coincide with each other, the position page field P2 is incremented by one to transmit the image data to the next electronic paper 10.

Each of the sheets of electronic paper 10, as described above, repeats the comparison of the two page fields 44 and increment of the position page field P2, so that a desired image can be displayed on the electronic paper 10 located at a corresponding page position.

Figure 7:
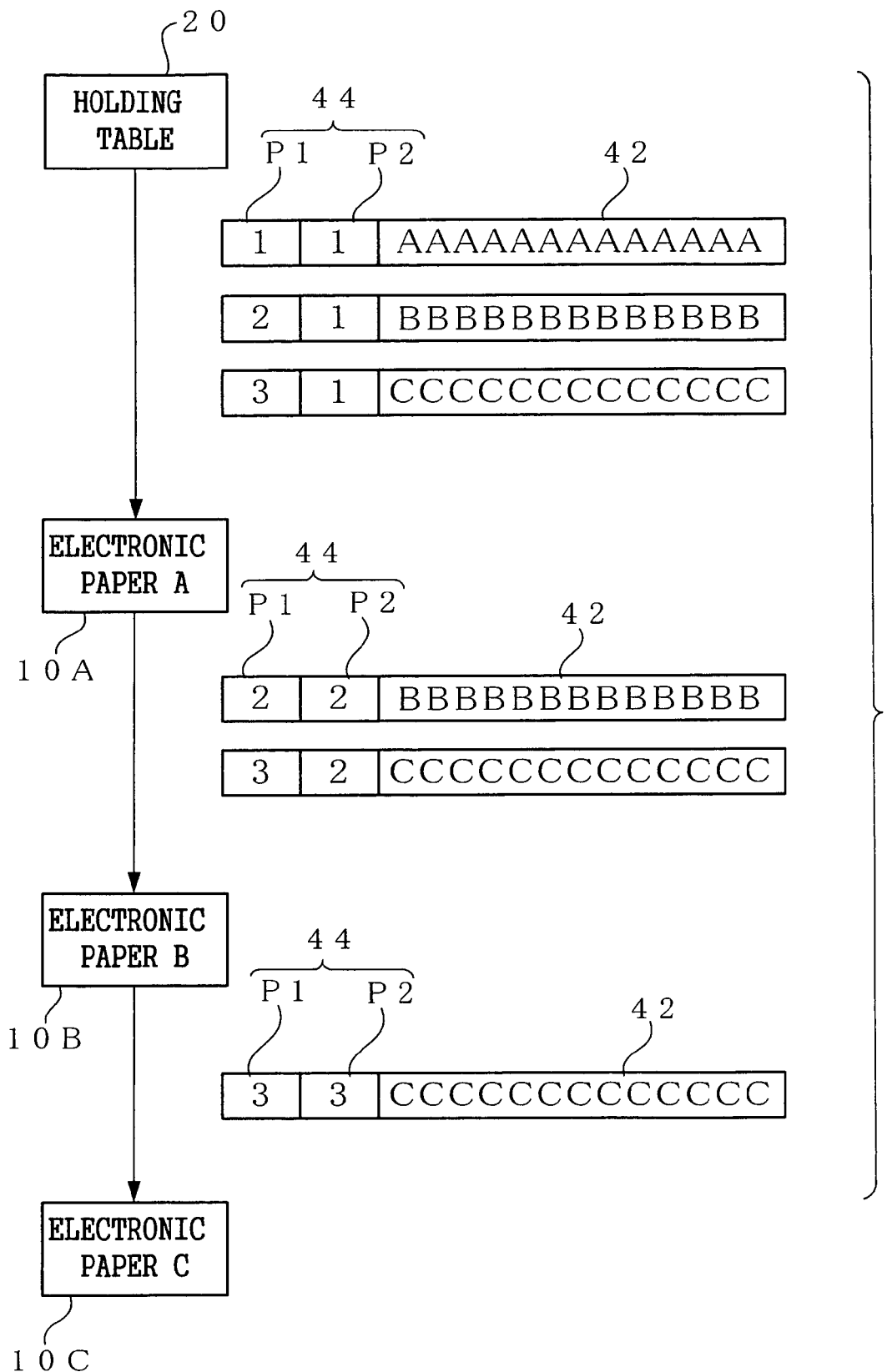
FIG. 7 is a diagram for explaining communication of image data transmitted from the holding stand to the electronic paper.

For example, as shown in FIG. 7, it is assumed that image data of three pages is output from the holding stand 20. In this case, when image data is output from the holding stand 20, (1, 1) is recorded in the page fields 44 of image data to be displayed on electronic paper 10A of the first page, (2, 1) is recorded on the second page, and (3, 1) is recorded on the third page. Note that (display page field P1, position page field P2) is defined image data.

In the electronic paper 10A of the first page, image data of the first page in which the two page fields 44 coincide with each other is displayed on the display unit 40, and, as the remaining image data, the position page field P2 is incremented by one. Image data having the page fields 44 expressed by (2, 2) and image data having the page fields 44 expressed by (3, 2) are output to electronic paper 10B of the second page.

In the electronic paper 10B of the second page, similarly, image data of the second page in which the two page fields 44 coincide with each other is displayed on the display unit 40, and the position page field P2 of the remaining image data is incremented by one. Image data having the page fields 44 expressed by (3, 3) is output to electronic paper 10C of the third page.

In the electronic paper 10C of the third page, similarly, image data of the third page in which the two page fields 44 coincide with each other is displayed on the display unit 40.

When the communication between the sheets of electronic paper is performed as described above, a desired image can be displayed on the electronic paper 10 at a desired page position.

Figure 8A:
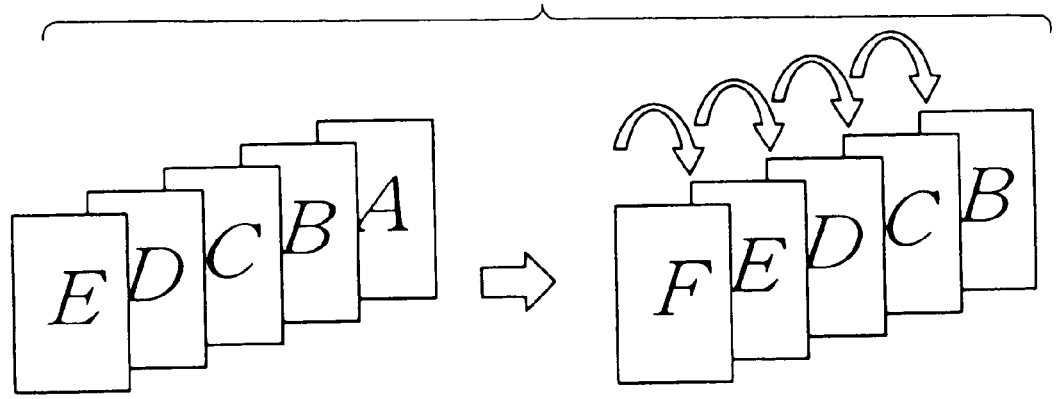
FIG. 8A is a diagram showing an example of a write order in sheets of electronic paper.
Figure 8B:
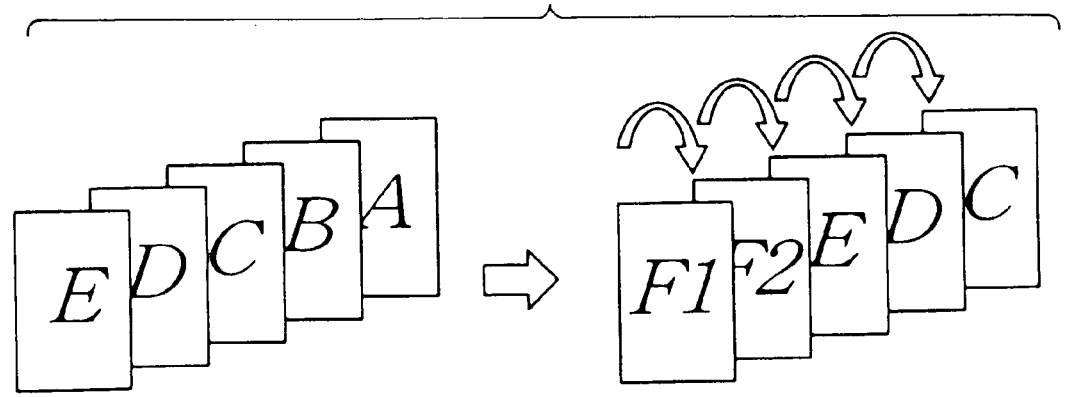
FIG. 8B is a diagram showing an example of the write order in the sheets of electronic paper.

When a new image is designated to be written from the holding stand 20, as shown in FIGS. 8A and 8B, control is performed such that the latest image is displayed on the front most surface of the sheets of electronic paper 10 held on the holding stand 20. More specifically, when a new image is designated to be written, on the holding stand 20, the page fields 44 are added to image data to be newly written and image data which can be displayed in addition to the newly displayed image data in the currently displayed image data, respectively, so that the image data are transmitted to the sheets of electronic paper 10. In this manner, communication between the sheets of electronic paper 10 is performed, and the image is displayed such that the latest image is displayed on the front most surface.

Figure 9:
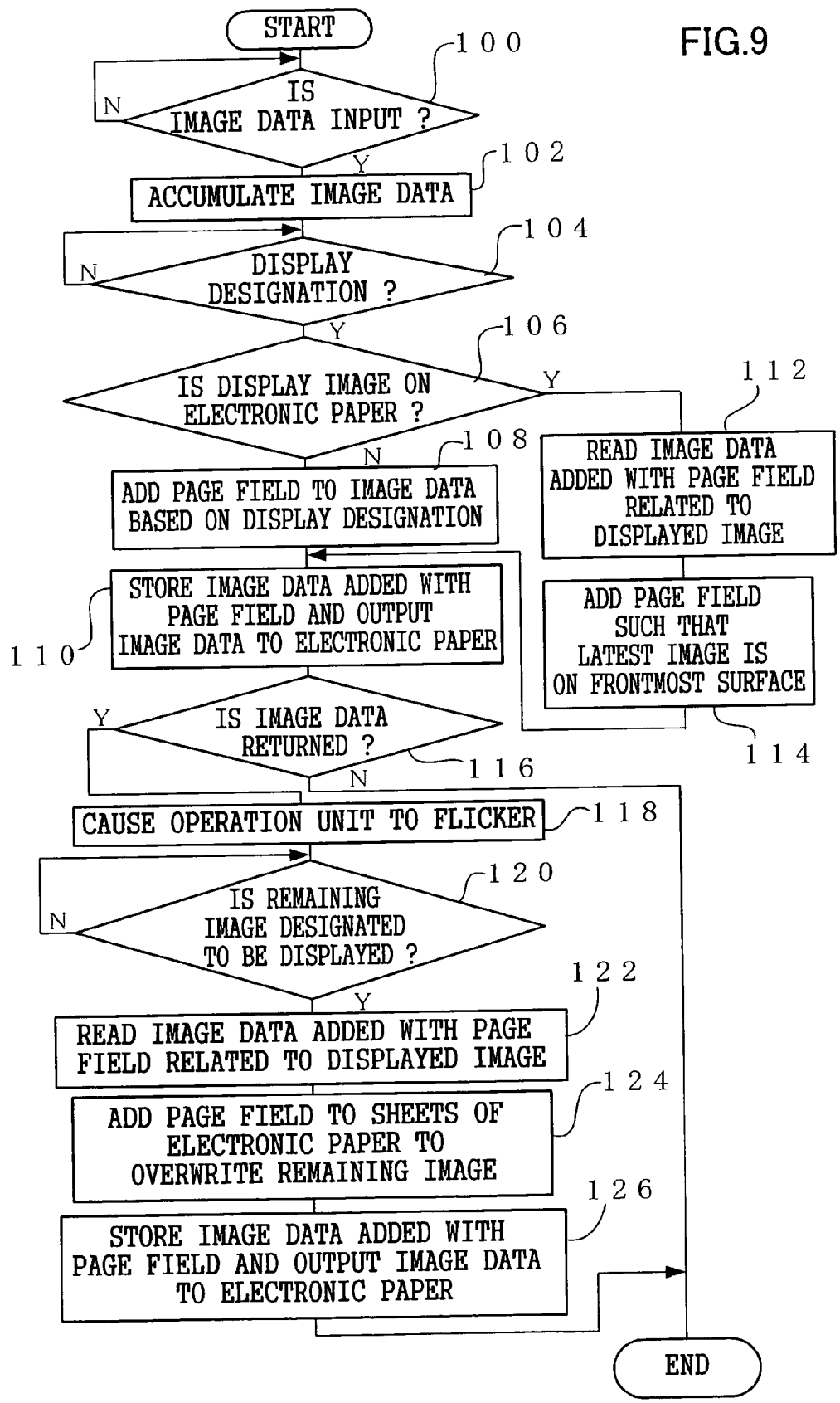
FIG. 9 is a flow chart showing processes performed in communication performed on the holding stand according to the embodiment of the invention.

Subsequently, an example of processes in the communication performed on the holding stand 20 constituted as described above will be described below with reference to the flow chart in FIG. 9.

In step 100, the holding stand 20 decides whether or not image data to be displayed on the electronic paper 10 is input. When NO is determined in step 100, the holding stand 20 waits until YES is determined in step 100 to shift to step 102, the image data is accumulated in the storage unit 30, and the holding stand 20 shifts to step 104.

For example, as image data input to the holding stand 20, image data transmitted from the personal computer 50 is input, and display information such as a display order of image data is also input together with the image data. More specifically, the electronic paper 10 held on the holding stand 20 can function like a printer or a display connected to the personal computer 50.

The processes in step 100 and step 102 are omitted when the image data which has been accumulated in the storage unit 30 is displayed on the electronic paper 10.

In step 104, it is decided whether or not display designation is performed. This decision is made by deciding whether or not designation of display of the image data accumulated in the storage unit 30 on the electronic paper 10 is performed through the operation unit 28.

When NO is determined in step 104, the holding stand 20 waits until YES is determined in step 104 to shift to step 106.

In step 106, it is decided whether or not an image has been displayed on the electronic paper 10. This decision is made by deciding whether or not the image data is output to the electronic paper 10 after the display designation has been performed. When NO is determined in step 106, the holding stand 20 shifts to step 108 to add the page fields 44 to the image data based on the display designation. More specifically, the display page field P1 and the position page field P2 depending on the display information are added to the image data to be displayed.

In step 110, the image data added with the page fields 44 is stored in the storage unit 30, and the image data is output to the electronic paper 10. Processes on the electronic paper 10 side are performed.

On the other hand, when YES is determined in step 106, the holding stand 20 shifts to step 112, and image data stored in the storage unit 30 and added with the page fields 44 related to the image displayed on the electronic paper 10 is read. The holding stand 20 shifts to step 114 to add the page fields 44 such that the latest image is displayed on the front most electronic paper 10. More specifically, of the currently displayed images, the image corresponding to the latest image is erased from the rearmost surface side, and the page fields 44 are added to image data. The holding stand 20 shifts to step 110 to store the image data added with the page fields 44 in the storage unit 30 and to output the image data to the electronic paper 10. More specifically, as shown in FIGS. 8A and 8B, of the sheets of electronic paper 10 held on the holding stand 20, the latest image can be displayed on the front most electronic paper 10.

In step 116, it is decided whether or not the image data is returned from the electronic paper 10. More specifically, when image data corresponding to the sheets of electronic paper 10 the number of which is larger than the number of sheets of electronic paper 10 held on the holding stand 20 is output from the holding stand 20, the image data cannot be completely displayed on the electronic paper 10, and the remaining image data is returned.

When NO is determined in step 116, a series of processes are ended. When YES is determined, the holding stand 20 shifts to step 118.

In step 118, the operation unit 28 is caused to flicker. More specifically, it is notified by the flicker of the operation unit 28 that an image remains.

Subsequently, in step 120, it is decided whether or not display designation of the remaining image is performed through the operation unit 28. When NO is determined, the holding stand 20 waits until YES is determined to shift to step 122.

Figure 11:
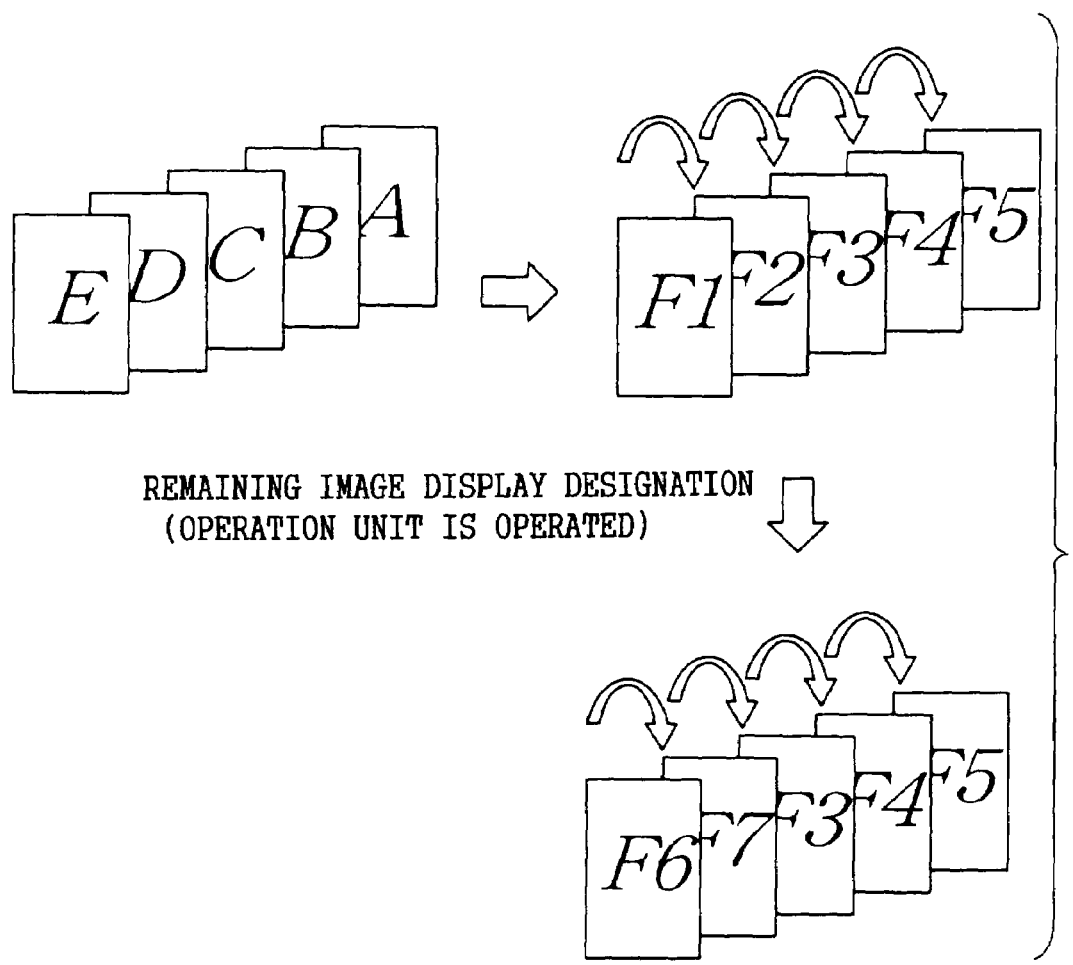
FIG. 11 is a pattern diagram showing a write order when images the number of which is larger than the number of sheets of electronic paper are written.

In step 122, image data stored in the storage unit 30 and added with the page fields 44 related to the image displayed on the electronic paper 10 is read. The holding stand 20 shifts to step 124 to add the page fields 44 such that the remaining image is overwritten on the sheets of electronic paper 10. More specifically, of the currently displayed images, the page fields 44 are added from the front most surface side to image data such that the image corresponding to the latest image is overwritten. The holding stand 20 shifts to step 126 to store the image data added with the page fields 44 in the storage unit 30 and to output the image data to the electronic paper 10. Therefore, as shown in FIG. 11, of the sheets of electronic paper 10 held on the holding stand 20, remaining images can be sequentially displayed from the front most electronic paper 10.

Figure 10:
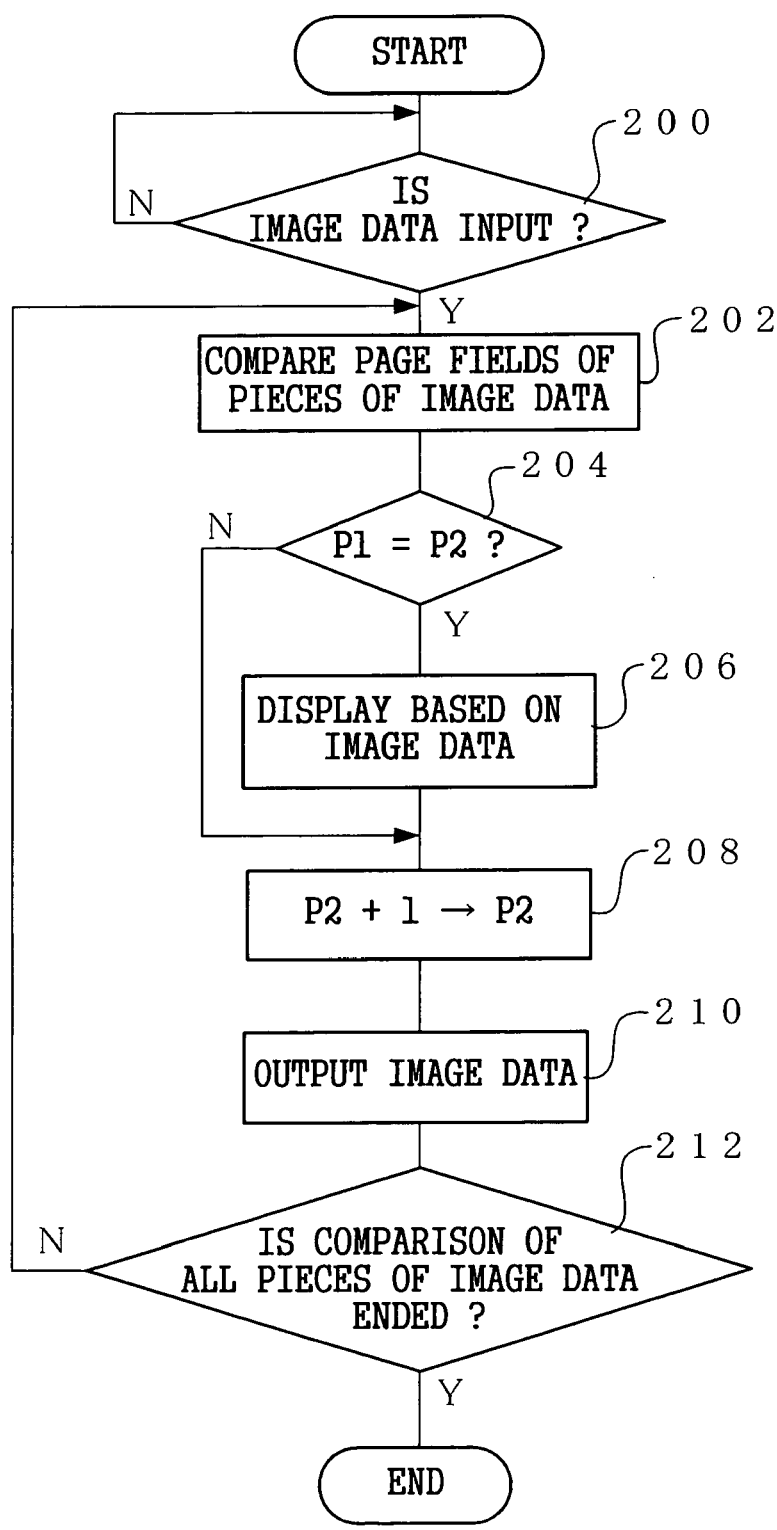
FIG. 10 is a flow chart showing processes in communication performed with the electronic paper according to the embodiment of the invention.

Subsequently, an example of processes in the communication performed in the electronic paper 10 will be described below with reference to the flow chart in FIG. 10.

In the electronic paper 10, in step 200, it is decided whether or not image data is input. More specifically, it is decided whether or not image data to be displayed on the electronic paper 10 is input from the holding stand 20. When NO is determined, the electronic paper 10 waits until YES is determined in step 200 to shift to step 202.

In step 202, the two page fields 44 of each image data are compared with each other. More specifically, the values of the display page field P1 and the position page field P2 are compared with each other.

In step 204, it is decided whether or not a comparison result between the two page fields of the compared image data satisfies a condition: display page field P1=position page field P2. When YES is determined, the electronic paper 10 shifts to step 206 to perform display based on the image data, i.e., display in the display region 12 by the display unit 40, on the corresponding electronic paper 10, and the electronic paper 10 shifts to step 208.

On the other hand, when NO is determined in step 204, there is no image data to be displayed on the electronic paper 10. Therefore, the electronic paper 10 directly shifts to step 208.

The position page field P2 is incremented by one in step 208. The electronic paper 10 shifts to step 210 to output the image data to the next electronic paper 10 (to the holding stand 20 if there is no electronic paper 10).

In step 212, it is decided whether or not comparison between the page fields 44 of all the image data input from the holding stand 20 is completed. When NO is determined, the electronic paper 10 returns to step 202 to repeat the above processes. When YES is determined in step 212, a series of processes of the electronic paper 10 are ended.

As described above, on the holding stand 20 side, the two page fields 44 are added to image data. On the electronic paper 10 side, only simple communication control is performed by comparing the two page fields with each other and by incrementing the position page field P2 making it possible to easily display a desired image on the electronic paper 10 corresponding to each page.

When the communication between the holding stand 20 and the electronic paper 10 is performed as described above, display control can be easily performed without detecting the number of sheets of electronic paper 10 held on the holding stand 20 in advance.

For example, as shown in FIG. 8A, as images which have already been displayed on the sheets of electronic paper 10, the images are sequentially sent to the sheets of electronic paper 10 on the rear side without removing the electronic paper 10 from the holding stand 20, and display control is performed to display the latest image on the front most electronic paper 10. Accordingly, a recently written image which is frequently used can be displayed on the front most electronic paper 10, and image data can be conveniently written.

Also in a case in which images of pages the number of which is smaller than the number of sheets of electronic paper 10 held in the holding stand 20 are displayed, as shown in FIG. 8B, as in the above description, display control is performed to display the latest image on the front most electronic paper 10. Therefore, a recently written image which is frequently used can be displayed on the front most electronic paper 10.

When images of pages the number of which is larger than the number of sheets of electronic paper 10 held on the holding stand 20 are displayed, as shown in FIG. 11, after the images the number of which is equal to the number of sheet of electronic paper 10 are displayed, overwrite display is performed based on the display designation of the remaining images. Therefore, a recently written image which is supposed to be frequently used can be left.

More specifically, in the embodiment, the sheets of electronic paper 10 are substantially vertically held on the holding stand 20, and the communication is performed as described above to display images. Therefore, the electronic paper 10 can function as a sub-display for the personal computer 50. Since the electronic paper 10 can also be removed from the holding stand 20, the electronic paper 10 can function as a printer for the personal computer 50, and great variety of uses can be achieved. When the electronic paper 10 and the display 52 of the personal computer 50 are different from each other in resolution, an image is developed into a raster image again in accordance with the resolution of the electronic paper 10. Therefore, the electronic paper 10 can function as a sub-display.

The sheets of electronic paper 10 can be removed from the holding stand 20 every carrying case 20A, and the sheets of electronic paper 10 can be easily carried.

In the embodiment, images whose number is larger than the number of sheets of electronic paper 10 held on the holding stand 20 are written, and all the images cannot be written in the sheets of electronic paper 10 and there are remaining images. In this case, it is decided in step 120 in FIG. 9 whether or not the operation unit 28 is operated, and the remaining images are overwritten and displayed. However, a detection unit for detecting picking of the electronic paper 10 from the holding stand 20 and for detecting setting of the electronic paper 10 on the holding stand 20 again is arranged. When it is detected by the detection unit that the electronic paper 10 is set on the holding stand 20 again, YES may be determined in step 120. More specifically, a user checks an image displayed on the electronic paper 10, and the electronic paper 10 on which an image may be overwritten is set on the holding stand 20, so that the remaining image can be written in the electronic paper 10.

Figure 12:
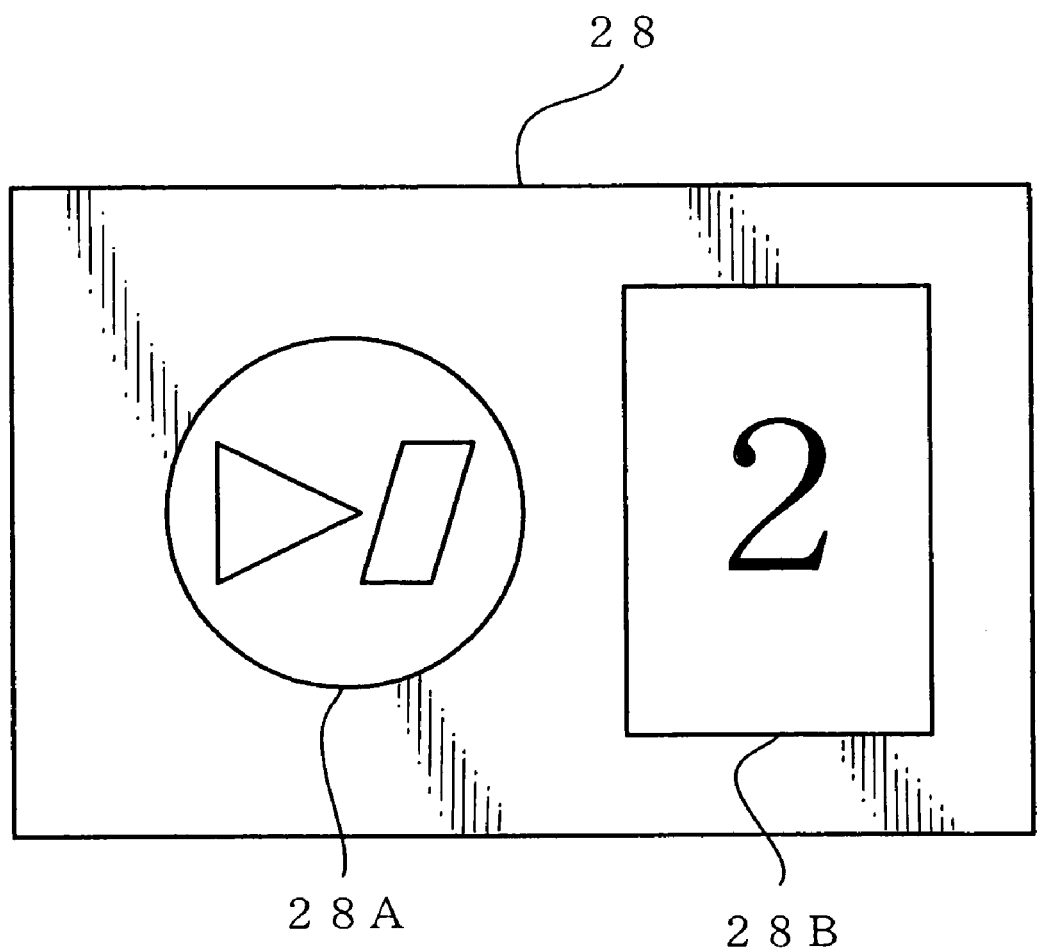
FIG. 12 is a diagram showing an example of a display unit arranged near an operation unit.

In the embodiment described above, the images whose number is larger than the number of sheets of electronic paper 10 held on the holding stand 20 are written, and all the images are not written in the sheets of electronic paper 10 and there are remaining images. In this case, in step 118 in FIG. 9, the operation unit 28 is caused to flicker to indicate that there is a remaining image. However, in addition, as shown in FIG. 12, a display unit 28B is arranged near an operation button 28A of the operation unit 28 or the like to display the number of remaining images. In this manner, the sheets of electronic paper 10 which may be overwritten and whose number is equal to the number of images displayed on the display unit 28B are set on the holding stand again by a user, so that the remaining images can be written in the sheets of electronic paper 10 and checked.

In the above described embodiment, writing an image in the electronic paper 10 has been described above. However, in an erasing method, for example, depending on a depressing operation or the like for a predetermined period of time or longer for the operation buttons of the operation unit 28, erasing of images held on the sheets of electronic paper 10, erasing of image data stored in the storage unit 30 of the holding stand 20, or the like may be performed.

Second Embodiment

The second embodiment of the invention will be described below.

Figure 13:
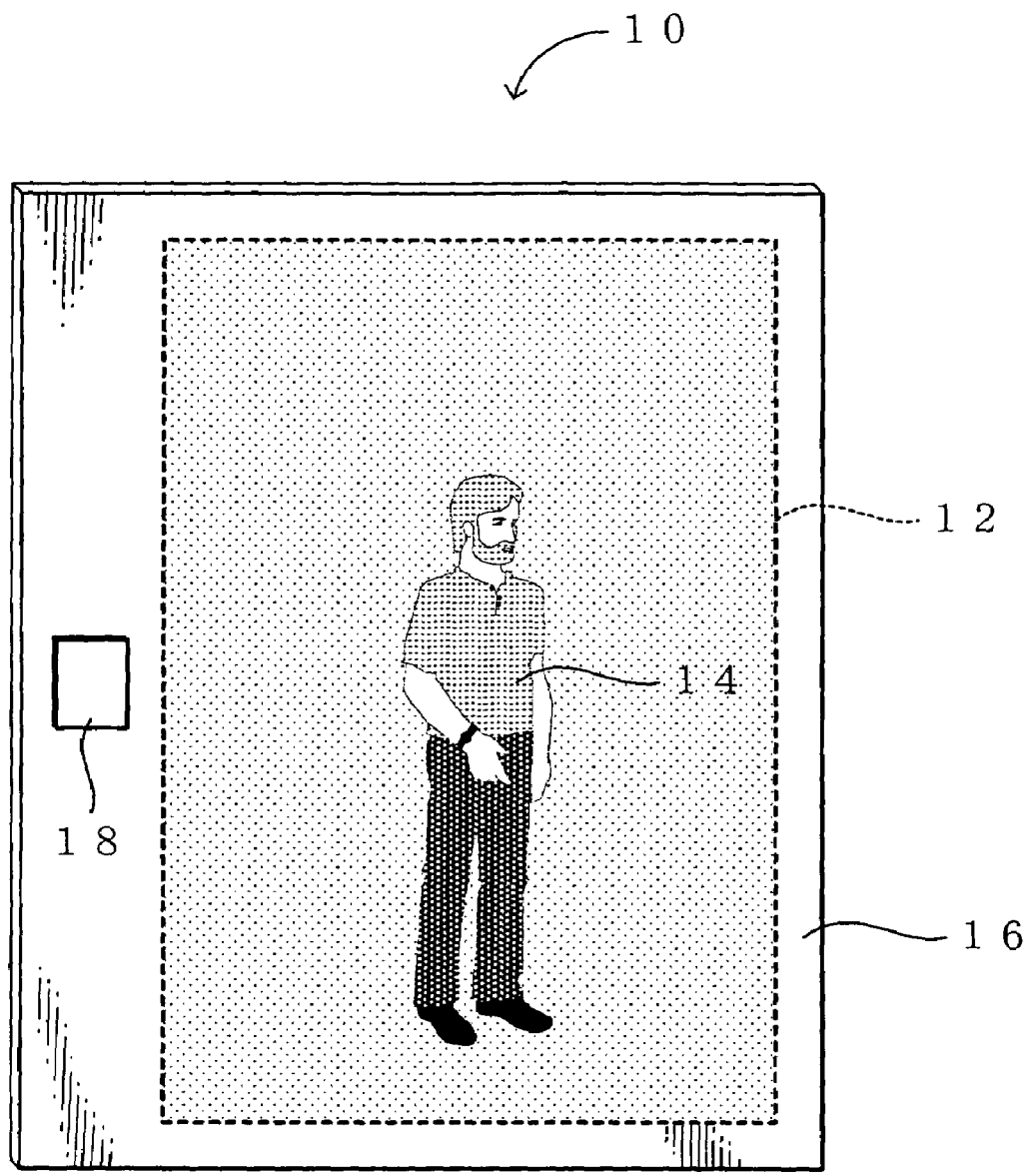
FIG. 13 is a perspective view showing the appearance of electronic paper according to the second embodiment of the invention.
Figure 14:
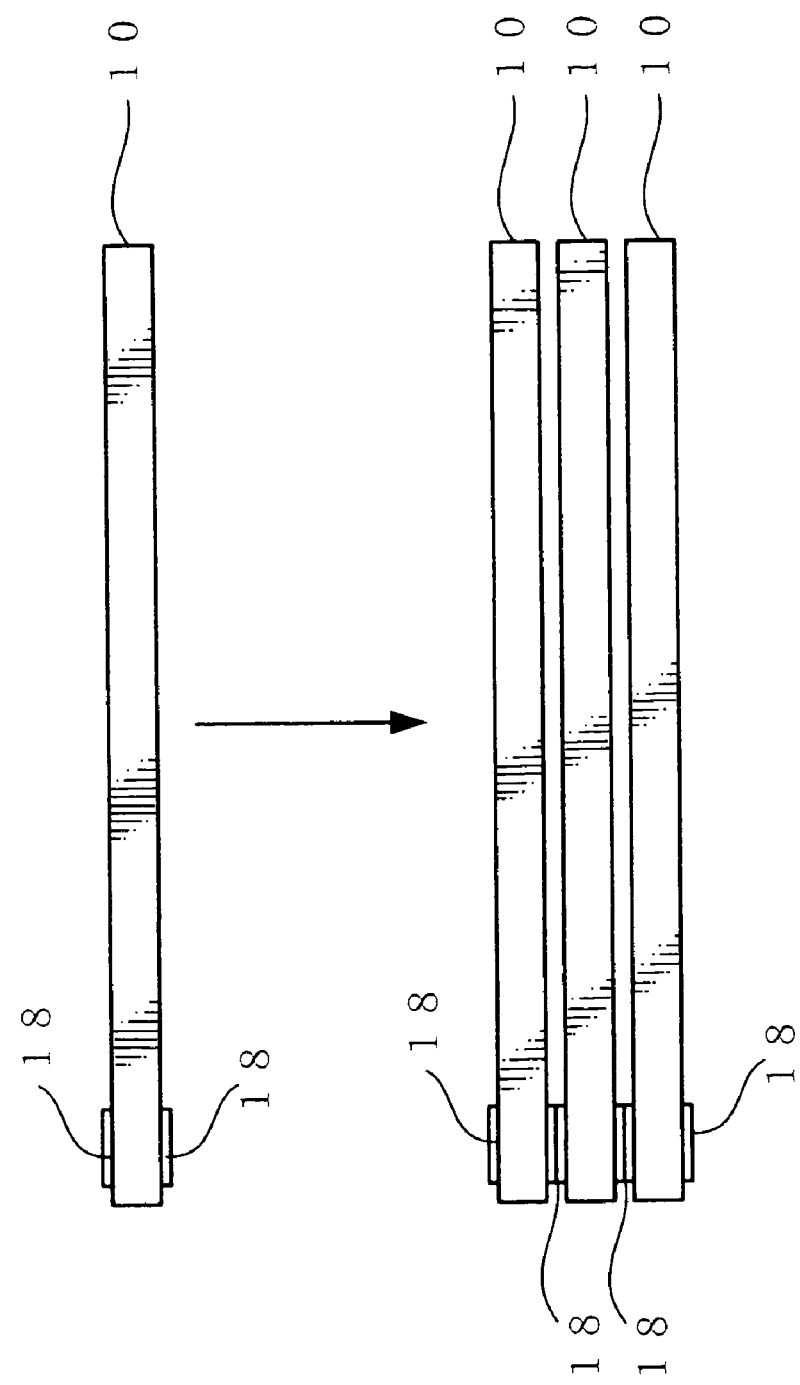
FIG. 14 is a diagram showing a state in which sheets of electronic paper are stacked on each other in the second embodiment.

In FIGS. 13 and 14, electronic paper 10 according to the second embodiment of the invention is shown. The electronic paper 10 in the second embodiment and the electronic paper 10 in the first embodiment are different from each other in only arrangements of the connection sections 18. Therefore, the same reference numerals as the electronic paper 10 in the first embodiment denote the same parts in the electronic paper 10 in the second embodiment, and a description thereof will be omitted.

Figure 15:
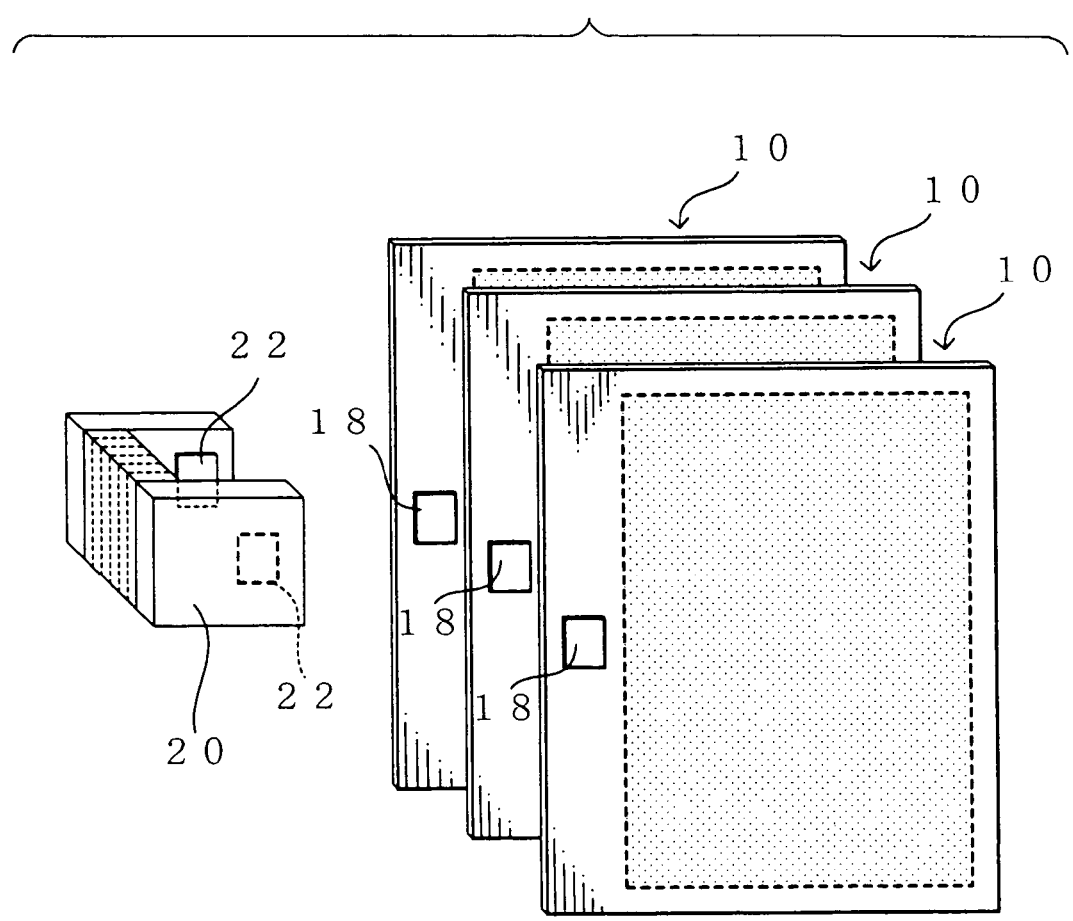
FIG. 15 is a perspective view showing sheets of electronic paper and a host device for holding the sheets of electronic paper in the second embodiment.

The sheets of electronic paper 10 in the second embodiment, as shown in FIG. 15, are held by a host device 21 like a binder. The host device 21 comprises a pair of connection sections 23 to be connected to connection sections 18 of the sheets of electronic paper 10. The pair of connection sections 23 are arranged at positions corresponding to the connection sections 18 of the electronic paper 10. Image data accumulated in the host device 21 is transmitted to the sheets of electronic paper 10, and the image data can be received from the sheets of electronic paper 10.

Figure 16:
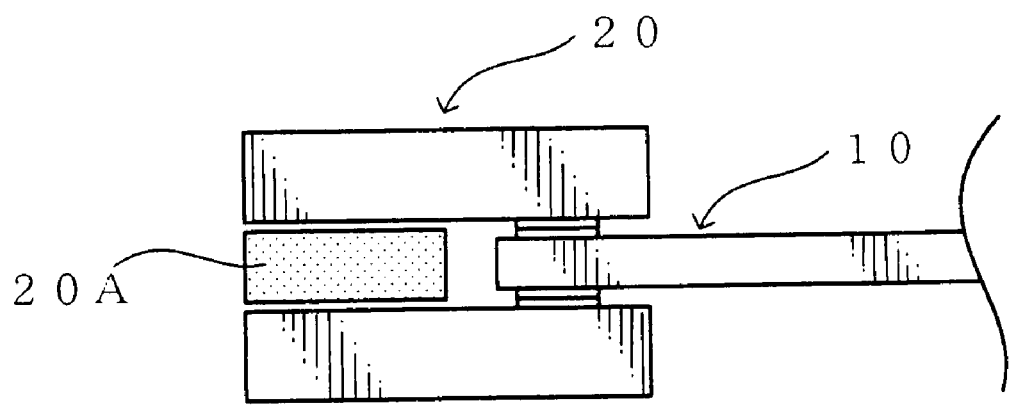
FIG. 16 is a sectional view showing a holding state of the host device for holding one sheet of electronic paper in the second embodiment.
Figure 17:
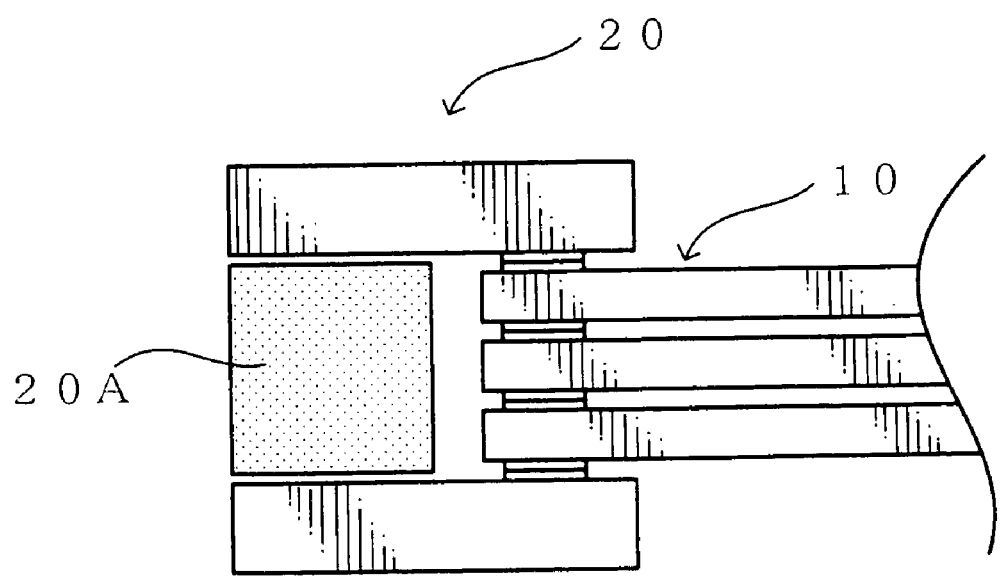
FIG. 17 is a sectional view showing a holding state of the host device for holding three sheets of electronic paper in the second embodiment.

The host device 21, as shown in FIGS. 16 and 15, comprises an extendable section 21A which can be extended depending on the number of sheets of electronic paper 10 to be held. Each time the number of sheets of electronic paper 10 to be held increases, the extendable section 21A is extended. FIG. 16 shows an example in which one sheet of electronic paper 10 is held by the host device 21. FIG. 17 shows an example in which three sheets of electronic paper 10 are held in the host device 21.

The host device 21 corresponds to the holding stand 20 in the first embodiment, and the other configuration is the same as that of the first embodiment (see FIG. 1).

Since the electric configuration of the electronic paper 10 and the host device 21 is the same as the electric configuration of the electronic paper 10 and the holding stand 20 in the first embodiment, and a description thereof will be omitted.

Since the constitution of image data transmitted from the host device 21 to the electronic paper 10 and the communication of the image data are the same as those of the image data transmitted from the holding stand 20 to the electronic paper 10 in the first embodiment, descriptions thereof will be omitted.

Since processes in the above communication performed by the host device 21 constituted as described above are the same as the processes performed by the holding stand 20 in the first embodiment, descriptions thereof will be omitted.

In addition, since the processes in the communication performed by the sheets of electronic paper 10 are the same as those in the first embodiment, descriptions thereof will be omitted.

Third Embodiment

Electronic paper and a host device according to the third embodiment of the invention will be described below.

In the electronic paper 10 according to the second embodiment, the display region 12 is formed on one side. However, in the electronic paper according to the third embodiment, display regions are formed on both sides. The other configuration is the same as that in the second embodiment. The host device in the third embodiment is the same as that in the second embodiment.

Figure 18:
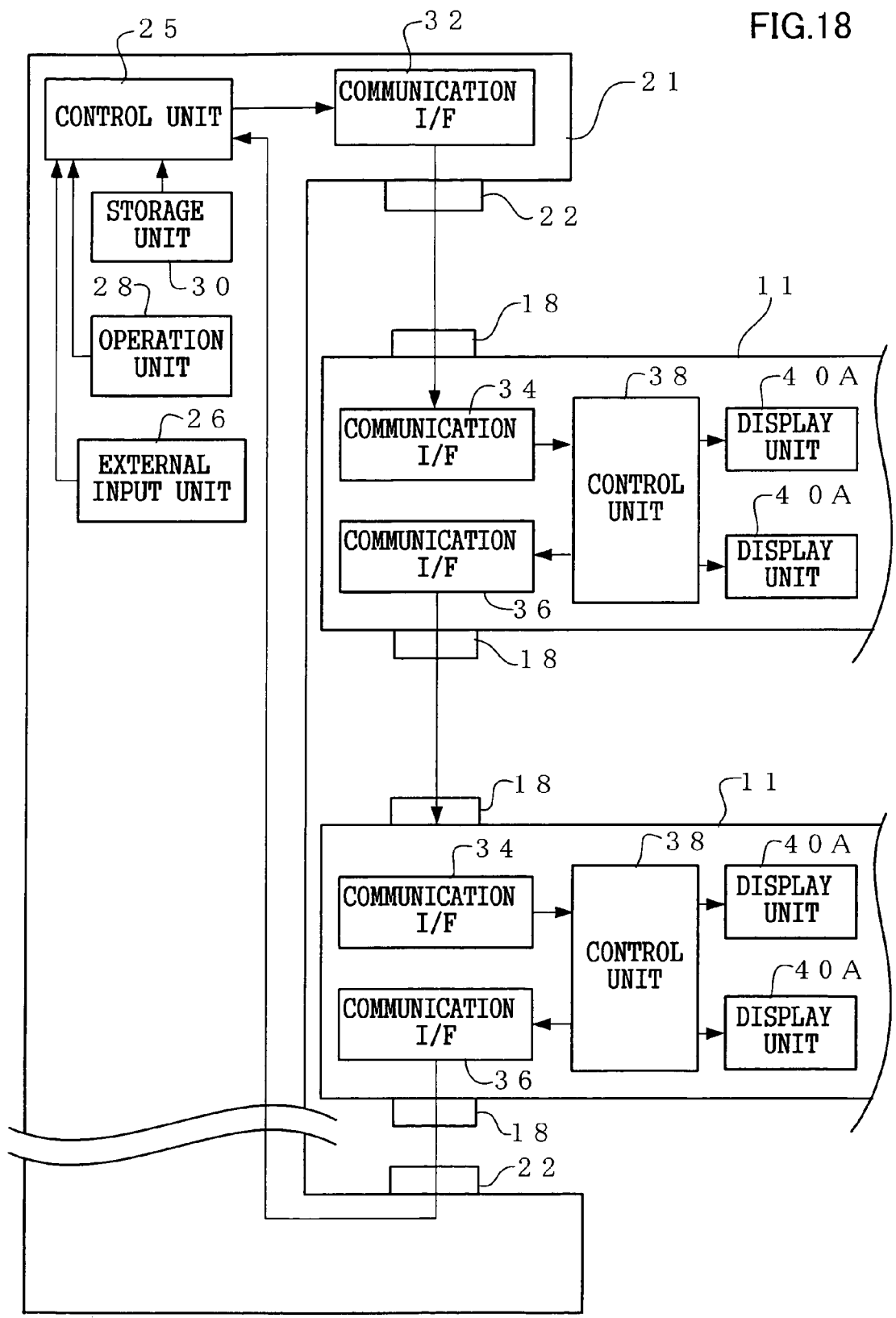
FIG. 18 is a block diagram showing an electric configuration of electronic paper and a host device according to the third embodiment.

As an electric configuration, as shown in FIG. 18, the host device 21 is the same as that in the second embodiment except for control of a control unit. Electronic paper 11 has two display units, i.e., a front display unit 40A and a rear display unit 40B. Since the other configuration of the electronic paper 11 is the same as that in the second embodiment, descriptions thereof will be omitted. The same reference numerals as in the second embodiment denote the same parts in FIG. 18.

The configuration of image data transmitted from the host device 21 according to the third embodiment to the electronic paper 11 and communication of the image data will be described below.

Figure 19:
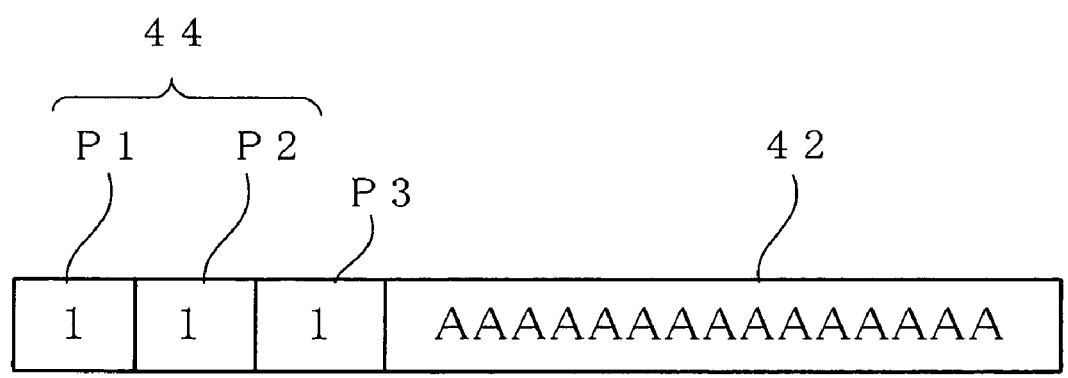
FIG. 19 is a pattern diagram showing the configuration of image data transmitted from the host device according to the third embodiment to the electronic paper.

In a control unit 25 of the host device 21, image data input from an external device through an external input unit 28 and accumulated in a storage unit 30 is, as shown in FIG. 19, added with additional information and output. As the additional information, in the third embodiment, two page fields (display page field P1 and position page field P2) 44 are added to page data serving as image data, and a front/rear field P3 for expressing a front or rear surface for displaying an image is added. The resultant image data is output to the electronic paper 11.

The display page field P1 expresses the number of pages of electronic paper 11 to be displayed, and the position page field P2 expresses a current page position of the electronic paper 11 and is designed to be incremented on each sheet of electronic paper 11. In the front/rear field P3, reference numerals 1 and 2 denote front and rear surfaces, respectively. However, the front/rear field P3 is not limited to the above front/rear field.

The control unit 38 of the electronic paper 11, as in the second embodiment, compares the two page fields 44 of the image data added with the page field P1 as described above with each other. When the two page fields 44 coincide with each other, the image data is displayed in the display region 12 by the display units 40A and 40B. At this time, in the third embodiment, an image is designed to be displayed on any one of the front and rear surfaces of the electronic paper 11 based on the value of the front/rear field P3. More specifically, when the value of the front/rear field P3 is 1, the image is displayed in the front display region by the display unit 40A. When the value of the front/rear field P3 is 2, the image is displayed in the rear display region by the display unit 40B. In decision of the front or rear surface of electronic paper 11, for example, the control unit 38 of the electronic paper 11 can decide a communication I/F 34 (connection section 18) to which image data is input as a front surface.

Each of the sheets of electronic paper 11, as described above, repeats comparison between the two page fields 44, incrementation of the position page field P2, and checking of the front/rear field P3, so that a desired image can be displayed on the front or rear surface of the electronic paper 11 at a corresponding page position.

Figure 20:
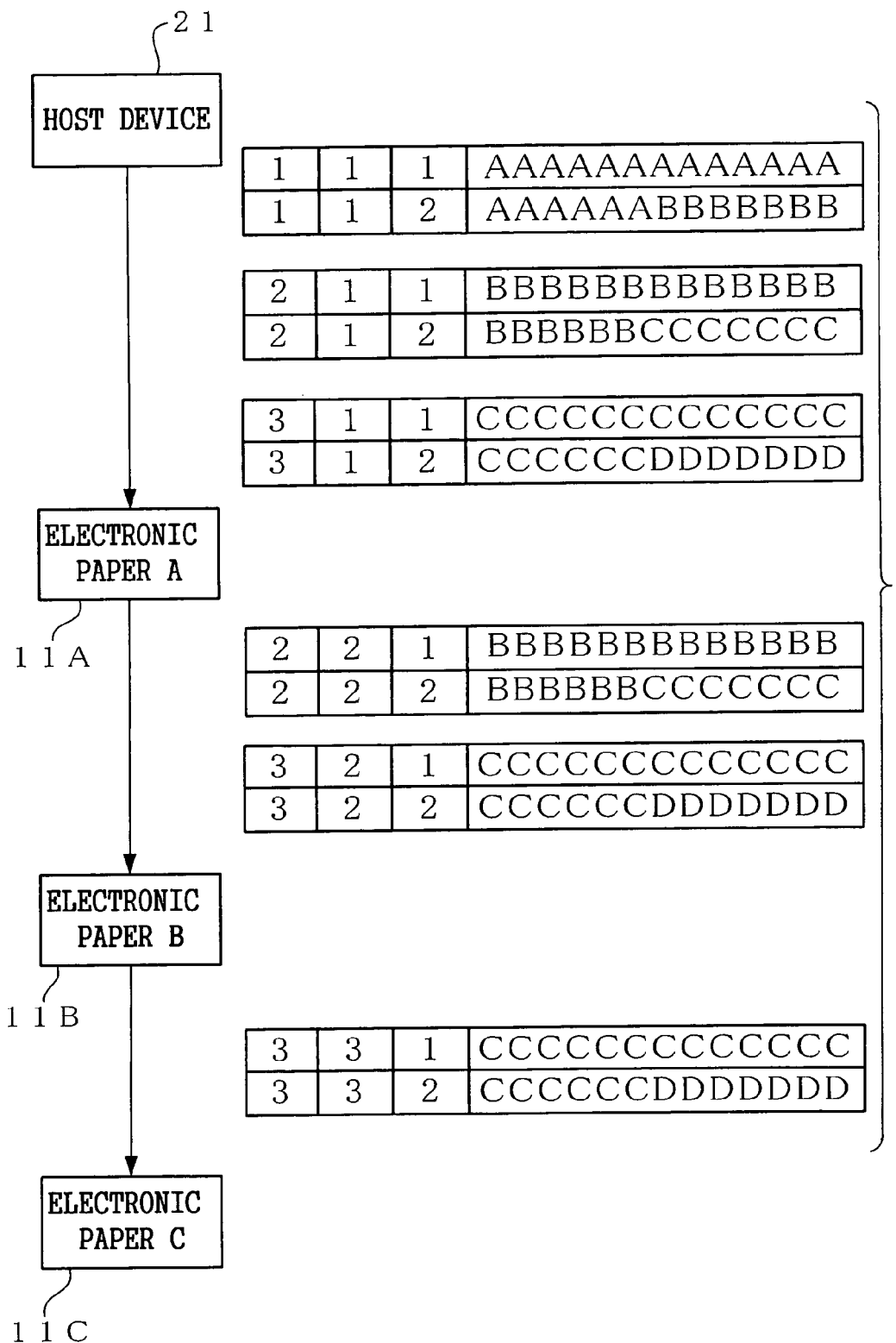
FIG. 20 is a diagram for explaining communication of image data transmitted from the host device according to the third embodiment to the electronic paper.

For example, as shown in FIG. 20, it is assumed that image data of the front and rear surfaces of three pages is output from the host device 21. In this case, when image data is output from the host device 21, (1, 1, 1) is recorded in the page fields 44 and the front/rear field P3 of image data to be displayed on the front surface of electronic paper 11A of the first page, (1, 1, 2) is recorded in the page fields 44 and the front/rear field P3 of the image data to be displayed on the rear surface of the electronic paper 11A of the first page, and (2, 1, 1) is recorded on the front surface of the second page, (2, 1, 2) is recorded on the rear surface of the second page, (3, 1, 1) is recorded on the front surface of the third page, and (3, 1, 2) is recorded on the rear surface of the third page. Note that (display page field P1, position page field P2, front/rear field P3) is defined image data.

In the electronic paper 11A of the first page, as in the second embodiment, with respect to image data of the first page in which the two page fields 44 coincide with each other, image data having 1 as the front/rear field P3 is displayed on the front surface, and image data having 2 as the front/rear field P3 is displayed on the rear surface. With respect to the remaining image data, the position page field P2 is incremented by one, image data having (2, 2, 1) and (2, 2, 2) as the page fields 44 and the front/rear field P3 and image data having (3, 2, 1) and (3, 2, 2) as the page fields 44 and the front/rear field P3 are output to electronic paper 11B of the second page.

In the electronic paper 11B of the second page, as described above, with respect to image data of the second page in which the two page fields 44 coincide with each other, image data having 1 as the front/rear field P3 is displayed on the front surface, and image data having 2 as the front/rear field P3 is displayed on the rear surface. With respect to the remaining image data, the position page field P2 is incremented by one, image data having (3, 3, 1) and (3, 3, 2) as the page fields 44 and the front/rear field P3 are output to electronic paper 11C of the third page.

In the electronic paper 11C of the third page, as described above, with respect to image data of the third page in which the two page fields 44 coincide with each other, image data having 1 as the front/rear field P3 is displayed on the front surface, and image data having 2 as the front/rear field P3 is displayed on the rear surface.

The communication performed as described above can make it possible to display a desired image on the front or rear surface of the electronic paper 11 at a desired page position.

Figure 21:
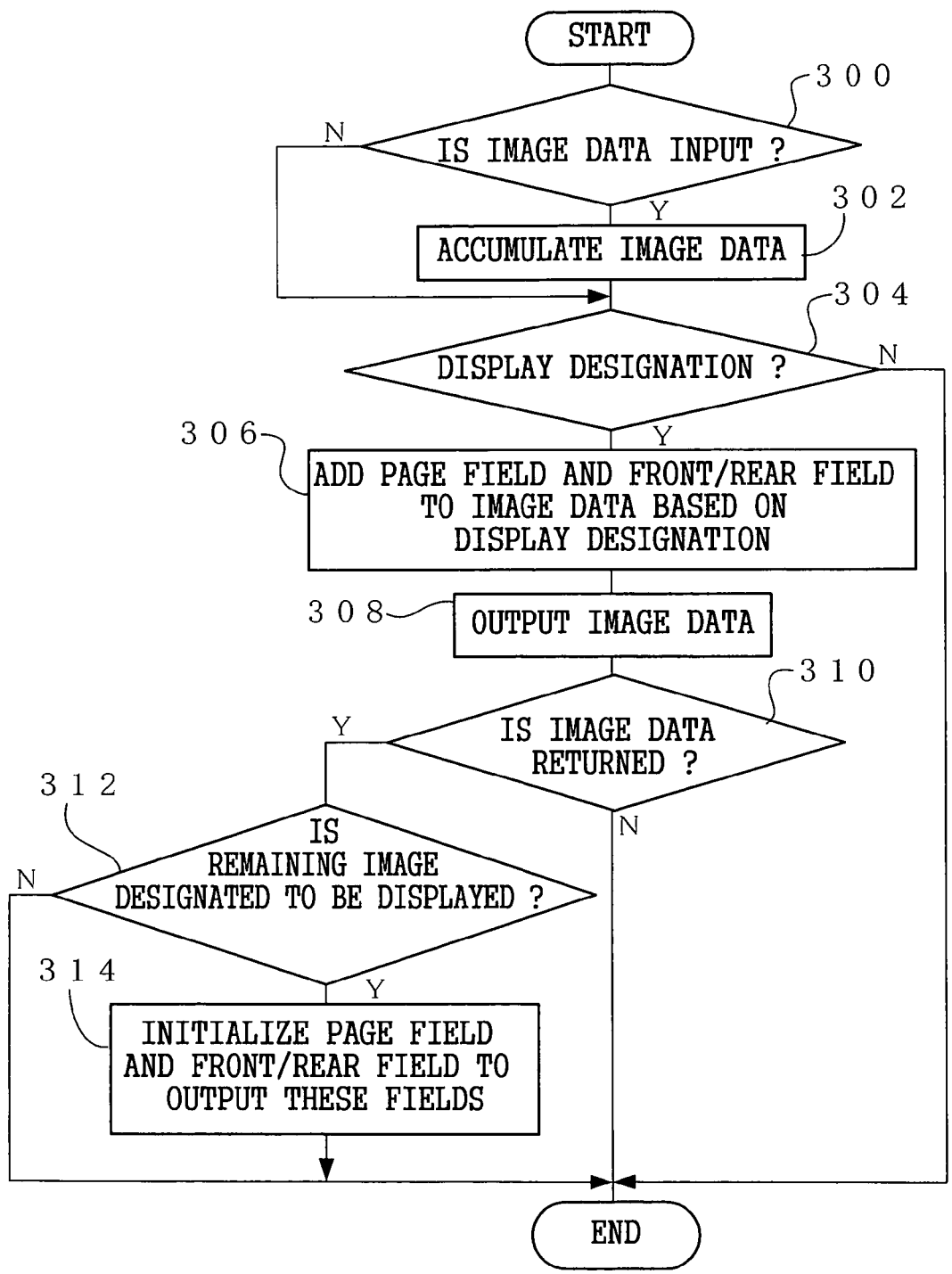
FIG. 21 is a flow chart showing processes in communication performed in the host device according to the third embodiment.

Processes in the communication performed in the host device 21 constituted as described above will be described below with reference to the flow chart in FIG. 21.

In the host device 21, in step 300, it is decided whether or not image data to be displayed on the electronic paper 11 is input. When NO is determined in step 300, the host device 21 waits until YES is determined in step 300 to shift to step 302, the image data is accumulated in the storage unit 30, and the host device 21 shifts to step 304. The processes in step 300 and step 302 are omitted when the image data which has been accumulated in the storage unit 30 is displayed on the electronic paper 11.

In step 304, it is decided whether or not display designation is performed. This decision is performed by deciding whether or not designation of display of the image data accumulated in the storage unit 30 on the electronic paper 11 is performed through the operation unit 28. The display designation performed through the operation unit 28, for example, includes selection, a display order, and the like of image data to be displayed of the image data accumulated in the storage unit 30.

When NO is determined in step 304., the processes are ended. When YES is determined in step 304, the host device 21 shifts to step 306, and the page fields 44 and the front/rear field P3 are added to the image data based on the display designation. More specifically, the display page field P1 described above, the position page field P2, and the front/rear field P3 are added to the image data to be displayed.

In step 308, the image data is output to the electronic paper 11, and later-described processes on the electronic paper 11 side are performed.

In step 310, it is decided whether or not the image data is returned from the electronic paper 11. More specifically, when image data corresponding to the sheets of electronic paper 11 whose number is larger than the number of sheets of electronic paper 11 held on the host device 21 is output from the host device 21, the image data cannot be completely displayed on the electronic paper 11, and the remaining image data is returned.

When NO is determined in step 310, a series of processes is ended. When YES is determined in step 310, the host device 21 shifts to step 312.

In step 312, it is decided whether or not display designation of the remaining images is performed to the operation unit 28. When NO is determined, a series of processes is immediately ended. When YES is determined, the host device 21 shifts to step 314.

In step 314, to the remaining images, i.e., image data which cannot be completely displayed and is returned from the electronic paper 11, the page fields 44 and the front/rear field P3 are initialized and output, and a series of processes is ended. More specifically, to the image data which cannot be completely displayed, the display page field P1, the position page field P2, and the front/rear field P3 are output from the electronic paper 11 of the first page as values to be displayed. In this manner, the remaining images can be sequentially displayed from the electronic paper 11 of the first page.

Figure 22:
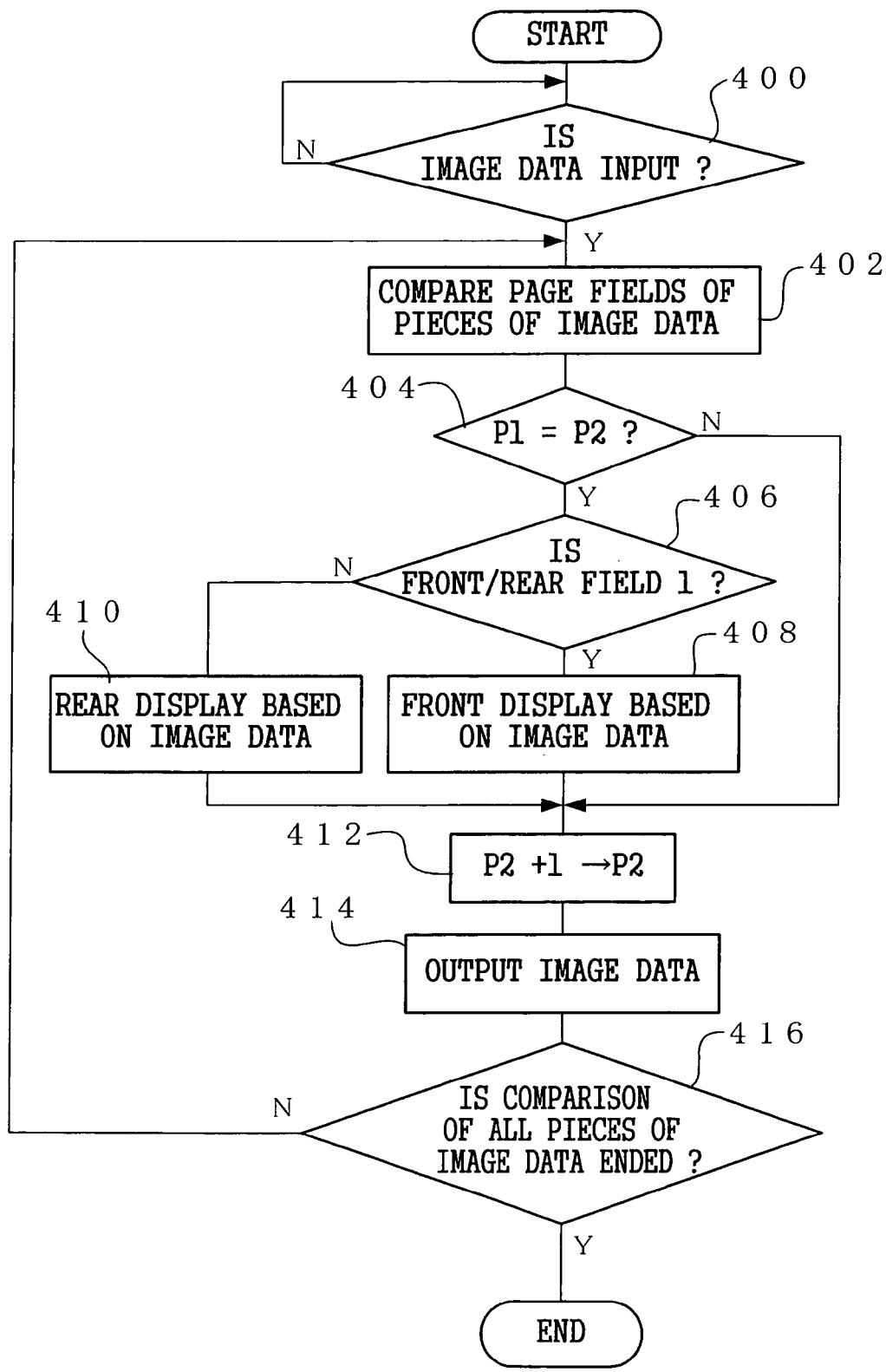
FIG. 22 is a flow chart showing processes in communication performed with the electronic paper according to the third embodiment.

Subsequently, processes in the communication performed by the electronic paper 11 according to the third embodiment will be described below with reference to the flow chart in FIG. 22.

In the electronic paper 11 according to the third embodiment, in step 400, it is decided whether or not image data is input. More specifically, it is decided whether or not image data to be displayed on the electronic paper 11 is input from the host device 21. When NO is determined, the electronic paper 11 waits until YES is determined in step 400 to shift to step 402.

In step 402, the page fields 44 of each image data are compared with each other. More specifically, the values of the display page field P1 and the position page field P2 are compared with each other.

In step 404, it is decided whether or not a comparison result between the two compared page fields of the image data satisfies a condition: display page field P1=position page field P2. When YES is determined, the electronic paper 11 shifts to step 406.

In step 406, it is decided whether or not the front/rear field P3 is 1. More specifically, it is decided whether or not image data is to be displayed on the front surface of the electronic paper 11. When YES is determined in step 406, the electronic paper 11 shifts to step 408, the image is displayed on the front surface of the electronic paper 11 based on the image data, i.e., an image is displayed in the display region by the display unit 40A, and the electronic paper 11 shifts to step 412.

When NO is determined in step 406, i.e., when the image is to be displayed on the rear surface of the electronic paper 11, the electronic paper 11 shifts to step 410 to display the image on the rear surface of the electronic paper 11 based on the image data, i.e., to display the image in the display region by the display unit 40B, and the electronic paper 11 shifts to step 412.

On the other hand, when NO is determined in step 404, the image data is not image data to be displayed on the electronic paper 11, therefore the electronic paper 11 immediately shifts to step 412.

In step 412, the position page field P2 is incremented by one, and the electronic paper 11 shifts to step 414 to output the image data to the next electronic paper 11 (to the host device 21 if there is no electronic paper 11).

In step 416, it is decided whether or not comparison between the page fields 44 of all the image data input from the host device 21 is completed. When NO is determined, the electronic paper 11 returns to step 402 to repeat the above processes. When YES is determined in step 416, a series of processes of the electronic paper 11 is ended.

As described above, with respect to the electronic paper 11 having front and rear surfaces on which images can be displayed, the two page fields 44 and the front/rear field P3 are added to image data. On the electronic paper 11 side, a desired image can be easily displayed on the front or rear surface of the electronic paper 11 corresponding to each page by only comparing the two page fields 44 with each other to check the front/rear field P3 and by only incrementing the position page field P2.

When the communication between the host device 21 and the electronic paper 11 is performed as described above, display control can be easily performed without detecting the number of sheets of electronic paper 11 held on the host device 21 in advance, and the number of displays can be easily recognized by the host device 21 without arranging a complex connection mechanism.

In addition, the control unit 38 of the electronic paper 11 can be simplified and increased in speed, and the costs of the electronic paper 11 can be reduced.

In addition, in the third embodiment, by performing the communication between the host device 21 and the electronic paper 11 as described above, when the electronic paper 11 is held by the host device 21, appropriate display can be performed without being conscious of the front and rear surfaces of the electronic paper 11.

In the embodiment, image data corresponding to the page positions, at which images are to be displayed, of the sheets of electronic paper 10 and 11 are held on the sheets of electronic paper 10 and 11. Only remaining image data which does not correspond to the page positions of the sheets of electronic paper is output to the sheets of electronic paper 10 and 11 of the next pages or the host device 21. However, the embodiment is not limited to the above configuration. Image data corresponding to the page position, at which an image is to be displayed, of the electronic paper 10 maybe output to the sheets of electronic paper 10 and 11 of the next page or the host device 21. In this case, the value of the position page field P2 is checked to decide the image data which cannot be completely displayed and which is returned to the host device 21, so that the image data which cannot be completely displayed and which is returned to the host device 21 can be decided. In a re-display state of image data, the image data which cannot be completely displayed and which is returned to the host device 21 can be displayed.

In the embodiment, additional information (page fields 44 or front/rear field P3) added to image data is preferably added as a header of the image data. When the additional information is added as the header, before all the image data are received, it can be decided whether or not transferring should be performed, and the memory of the control unit 38 arranged in the sheets of electronic paper 10 and 11 to store page contents can be reduced.

In the above embodiment, the display page field P1 and the position page field P2, or the display page field P1, the position page field P2, and the front/rear field P3 are added to image data. However, page settings (page positions of the sheets of electronic paper 10 which are held in the host device 21) are set and stored in the control units 38 of the sheets of electronic paper 10 in advance depending on arrangements of serial connections of the sheets of electronic paper 10 held in the host device 21, so that the position page field P2 may not be added to the image data.

More specifically, in the embodiment, in place of comparison between the position page field P2 and the display page field P1 (step 206 in FIG. 10 or step 404 in FIG. 22), the display page field P1 is compared with the page settings which are set in the sheets of electronic paper 10 in advance, so that an image based on image data corresponding to the display page field P1 is displayed on the electronic paper 10, the page setting of which coincides with the display page field P1. When the sheets of electronic paper 10 are removed from the host device 21, if the sheets of electronic paper 10 are not returned to the original page position, the pages of the sheets of electronic paper 10 are arranged at random with the sheets of electronic paper 10 held in the host device 21. However, as in the above embodiments, display on the sheets of electronic paper 10 can be controlled.

Fourth Embodiment

The fourth embodiment of the invention will be described below with reference to the drawings.

The image display apparatuses according to the first to third embodiments have configurations in which sheets of electronic paper are stacked on each other. However, the image display system according to the fourth embodiment has a configuration in which sheets of electronic paper are caused to abut on each other to realize a larger image display screen.

Figure 23:
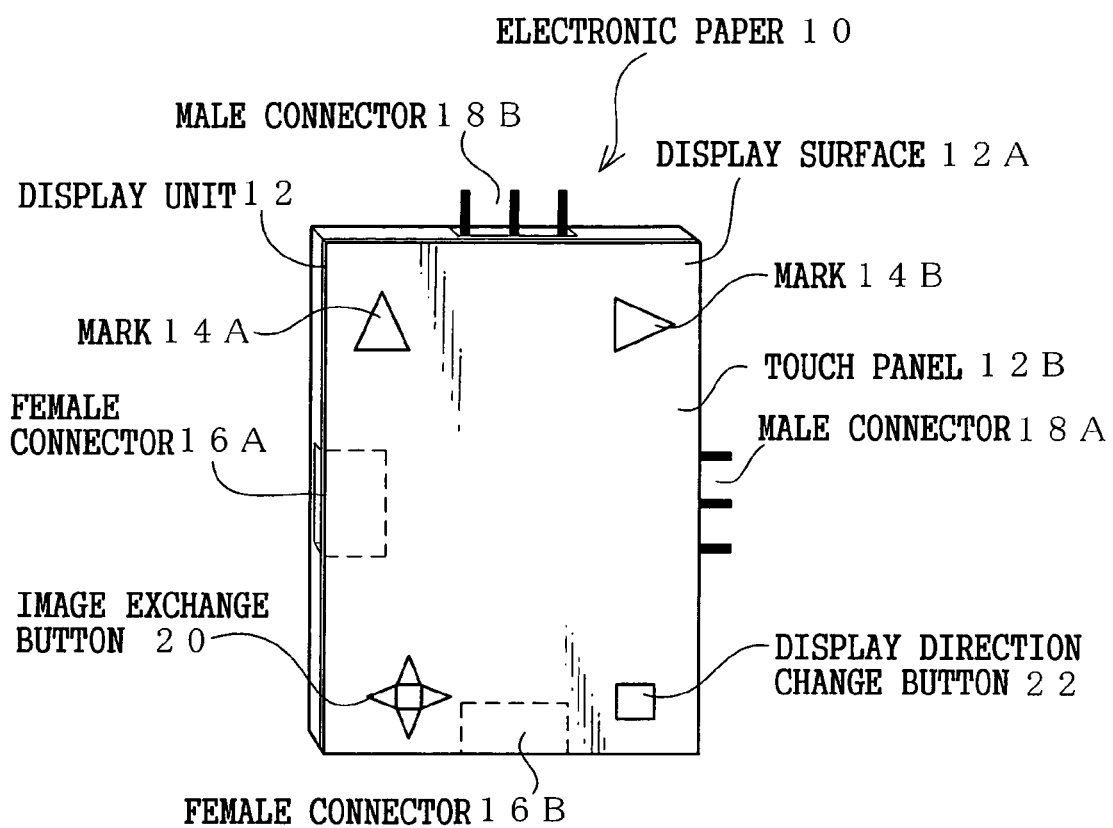
FIG. 23 is a perspective view showing the configuration of electronic paper 510 according to the fourth embodiment.

The configuration of electronic paper 510 according to the embodiment will be described below with reference to FIG. 23. As shown in FIG. 23, the electronic paper 510 according to the embodiment has an approximately rectangular shape having a small thickness. The electronic paper 510 comprises a plate-like display unit 512 having one entire surface on which a display surface 512A for displaying an image is formed, a female connector 516A used for coupling to an external device including another electronic paper 510, a female connector 516B, a male connector 5518A, and a male connector 518B.

The display surface 512A of the display unit 512 according to the embodiment has a rectangular shape having A-4 size, and is constituted by an electrophoretic display device. On the upper surface of the display surface 512A of the display unit 512, a pressure-sensitive touch panel 512B is mounted. In this case, the pressure-sensitive touch panel 512B is approximately transparent. An image displayed on the display surface 512A can be seen without specific trouble.

On the surface of the pressure-sensitive touch panel 512B, near the upper end in FIG. 23, a mark 514A and a mark 514B indicating display directions of an image obtained by the display unit 512 are printed. More specifically, as described above, the display surface 512A of the electronic paper 510 according to the embodiment has A-4 size. A mode (to be referred to as a "first display mode" hereinafter), in which an image is displayed such that the short-side direction of the display surface 512A is set as the horizontal direction, and a mode (to be referred to as a "second display mode" hereinafter), in which an image is displayed such that the long-side direction is set as the horizontal direction, can be employed.

In this case, display directions of an image in the first display mode are two directions, i.e., a direction in which the vertical direction of the image is normal when the electronic paper 510 is referred to in the state shown in FIG. 23 and an opposite direction. In the electronic paper 510 according to this embodiment, the display direction in the first display mode is limited to one direction, and the mark 514A indicates this display direction. Similarly, display directions of an image in the second display mode are two directions. However, in the electronic paper 510 according to this embodiment, the display directions in the second display mode are limited to only one direction in advance, the mark 514B indicates the display direction.

On the other hand, the female connector 516A and the female connector 516B have the same specifications, and the male connector 5518A and the male connector 518B have the same specifications. The female connectors 516A and 516B are generically named as female connectors 516, and the male connectors 5518A and 518B are generically named as male connectors 518.

In this case, each of the female connectors 516 can be coupled to the male connector 518. Although not shown in FIG. 23, electrodes which are electrically coupled to electrodes (three electrodes including a power supply electrode in this embodiment) arranged on the male connector 518 are arranged on the female connector 516, and a frame portion which can be fitted in the recessed portion of the female connector 516 is formed on the male connector 518. Therefore, the female connector 516 can be electrically and mechanically coupled to the male connector 518 or a connector having the same specifications as those of the male connector 518.

The female connector 516A and the male connector 518A are arranged at corresponding positions in the vertical direction in FIG. 23 on two planes which are parallel to the direction of thickness of the electronic paper 510 and which are opposite to each other. Therefore, when the electronic paper 510 and another electronic paper 510 are coupled to each other through the female connector 516A and the male connector 518A, the upper and lower end positions of the sheets of electronic paper 510 can be caused to coincide with each other, and the display surface 512A of the electronic paper 510 according to this embodiment has A-4 size. Therefore, for example, when two sheets of electronic paper 510 are coupled to each other, depending on the combinations between the display surfaces 512A of the sheets of electronic paper 510, an A-3 size (horizontal type) display region can be constituted.

Similarly, the female connector 516B and the male connector 518B are arranged at corresponding positions in the horizontal direction in FIG. 23 on two planes which are parallel to the direction of thickness of the electronic paper 510 and which are opposite to each other. Therefore, when the electronic paper 510 and another electronic paper 510 are coupled to each other through the female connector 516B and the male connector 518B, the left and right end positions of the sheets of electronic paper 510 can be caused to coincide with each other. For example, when two sheets of electronic paper 510 are coupled to each other, depending on the combinations between the display surfaces 512A of the sheets of electronic paper 510, an A-3 size (vertical type) display region can be constituted.

Furthermore, for example, two sets each obtained by coupling two sheets of electronic paper 510 through the female connector 516A and the male connector 518A are prepared, and the two sets of electronic paper 510 are coupled to each other through the female connector 516B and the male connector 518B. In this case, an A-2 size display region can be obtained. In this manner, when the sheets of electronic paper 510 according to this embodiment are combined to each other, display regions having various sizes which use A-4 size as a unit size can be obtained.

In the electronic paper 510 according to this embodiment, the display directions are limited to the directions indicated by the marks 514A and 514B as described above. Therefore, when the sheets of electronic paper 510 are to be coupled to each other, a user couples the sheets of electronic paper 510 to each other such that the directions indicated by the marks 514A of the sheets of electronic paper 510 coincide with each other or such that the directions indicated by the marks 514B of the sheets of electronic paper 510 coincide with each other.

Figure 24A:
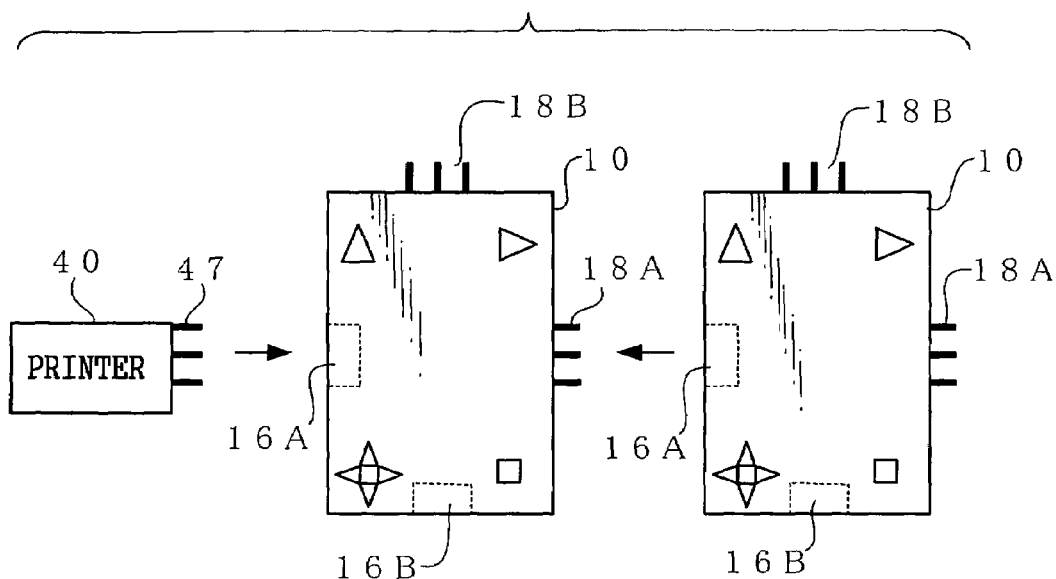
FIG. 24A is a plan view showing the configuration of an image display system 550 according to the fourth embodiment.
Figure 24B:
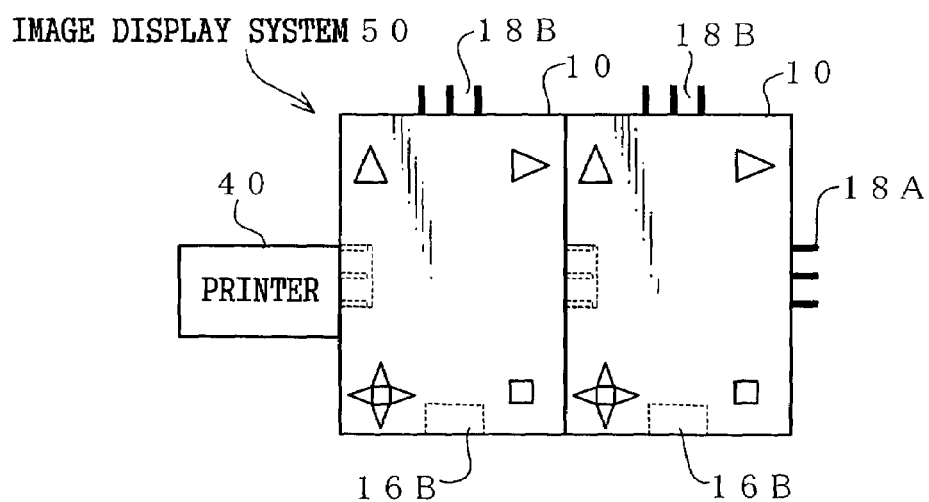
FIG. 24B is a plan view showing the configuration of the image display system 550 according to the fourth embodiment.

The configuration of an image display system 550 according to this embodiment will be described below with reference to FIGS. 24A and 24B. As shown in FIGS. 24A and 24B, the image display system 550 according to this embodiment comprises sheets (two in FIGS. 24A and 24B) of electronic paper 510 and a printer 540 for supplying display data including image data expressing images to be displayed on the sheets of electronic paper 510. In this case, the sheets of electronic paper 510 are used to resemble sheets of paper, and an information processing device having a function of supplying data to be printed on the sheets of paper is called the printer 540. However, the printer 540 according to this embodiment is actually constituted by a PDA (Personal Digital Assistant (portable terminal)).

As shown in FIG. 24A, in the printer 540, a male connector 547 having the same specifications as that of the male connector 518 is provided. The male connector 547 is coupled to the female connector 516 of one of sheets of electronic paper 510, and the sheets of electronic paper 510 are coupled to each other through the male connectors 518 and female connectors 516, so that the image display system 550 can be constituted as shown in FIG. 24B.

In FIGS. 24A and 24B, two sheets of electronic paper 510 are horizontally coupled to each other through the male connectors 518A and the female connectors 516A, and the printer 540 is coupled to the female connector 516A of the electronic paper 510 on the left sides in FIGS. 24A and 24B to constitute the image display system 550 having A-3 size (horizontal type). However, the configuration of the image display system 550 is not limited to the above configuration as a matter of course.

For example, in the image display system 550 shown in FIG. 25A, three sheets of electronic paper 510 are coupled to each other in an L-shape on a plane, and the printers 540 are coupled to the female connectors 516B of the sheets of electronic paper 510 located at the lower right in FIGS. 25A and 25B. When the image display system 550 obtained by rotating the image display system 550 shown in FIG. 24A by 90° as shown in FIG. 25B is seen, a display having A-3 size (vertical type) can be realized as a matter of course.

Figure 26:
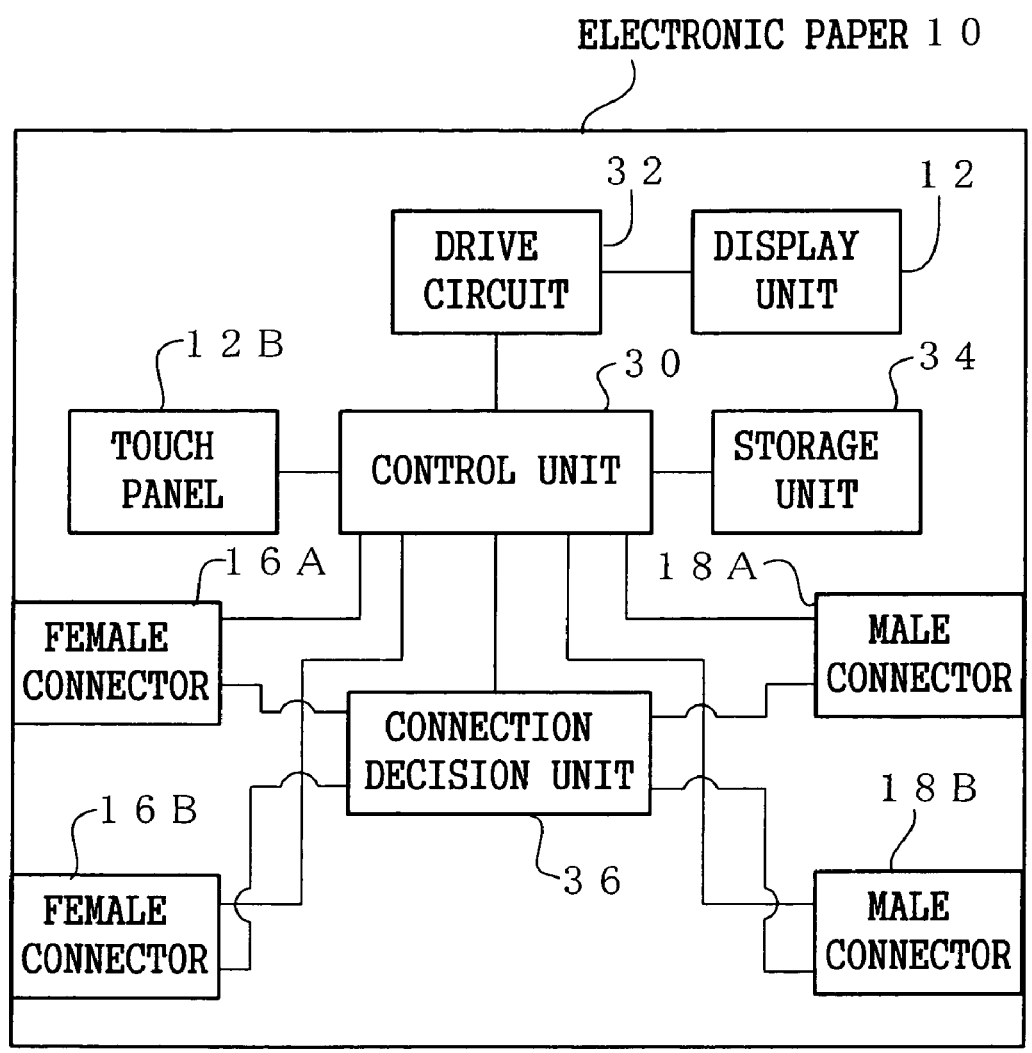
FIG. 26 is a block diagram showing the electric configuration of the electronic paper 510 according to the fourth embodiment.

The electric configuration of electronic paper 510 according to this embodiment will be described below with reference to FIG. 26. As shown in FIG. 26, the electronic paper 510 comprises a control unit 530 for controlling an overall operation of the electronic paper 510, a drive circuit 532 for generating various signals for driving the display unit 512 to supply the various signals to the display unit 512, a storage unit 534 serving as a nonvolatile memory for storing various pieces of information, and a connection decision unit 536 for deciding whether or not the corresponding device is electrically connected to the connectors by coupling to another device through the female connectors 516 and the male connectors 518.

To the control unit 530, a touch panel 512B, the drive circuit 532, the storage unit 534, the connection decision unit 536, the female connector 516, and the male connector 518 are connected. Therefore, the control unit 530 can perform detection of a depression position for the touch panel 512B by a user, display of various images on the display unit 512 through drive circuit 532, access to the storage unit 534, recognition of connection states of an external device to the connectors in units of connectors, and transmission/reception of various pieces of information between the electronic paper and the external device through the connectors.

Figure 27:
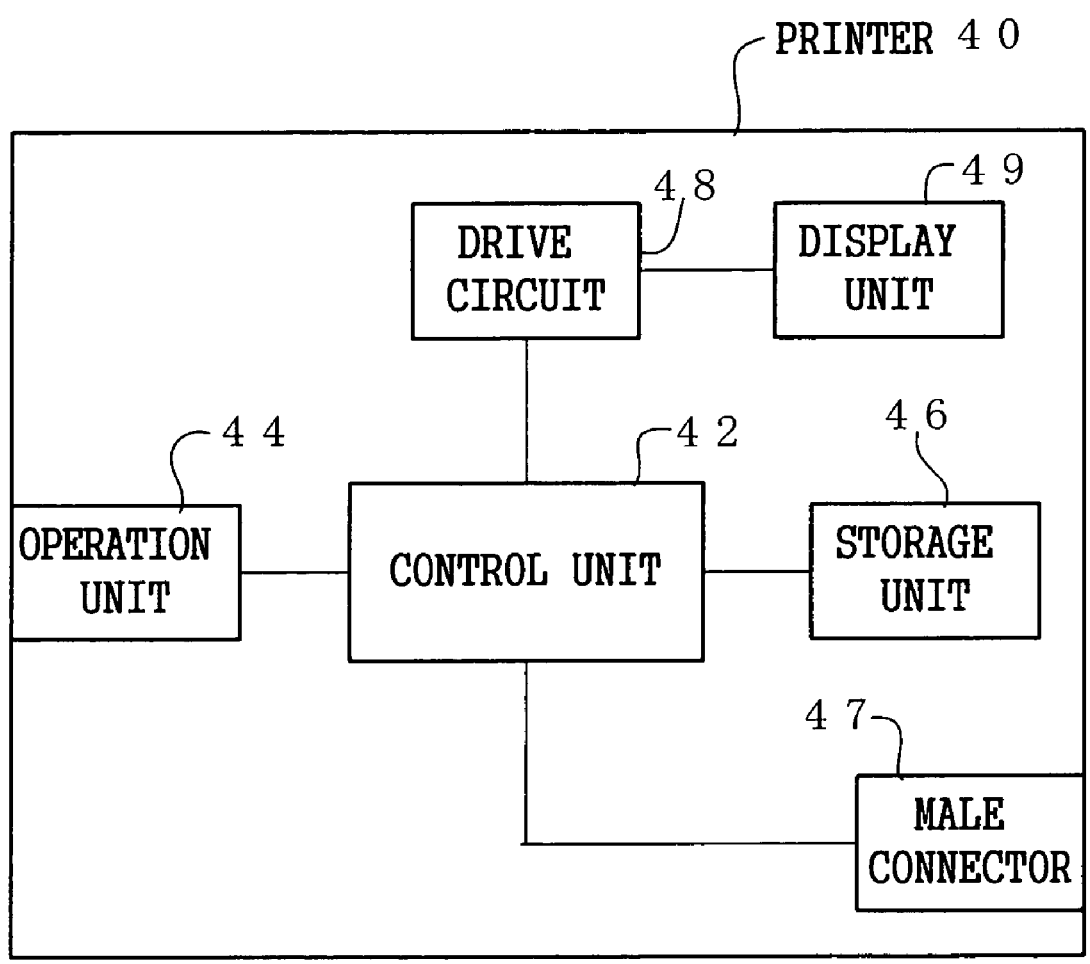
FIG. 27 is a block diagram showing the electric configuration of a printer 540 according to the fourth embodiment.

The electric configuration of the printer 540 according to this embodiment will be described below with reference to FIG. 27. As shown in FIG. 27, the printer 540 comprises a control unit 542 for controlling an overall operation of the printer 540, an operation unit 544 constituted by a keyboard, a display unit 549 constituted by a liquid crystal display, a drive circuit 548 for generating various signals for driving the display unit 549 to supply the various signals to the display unit 549, a storage unit 546 serving as a nonvolatile memory for storing various pieces of information, and a male connector 547 having the same specifications as that of the male connector 518.

To the control unit 542, the operation unit 544, the drive circuit 548, the storage unit 546, and the male connector 547 are connected. Therefore, the control unit 542 can perform detection of an operation state for the operation unit 544 by a user, display of various images on the display unit 549 through the drive circuit 548, access to the storage unit 546, and transmission/reception of various pieces of information between the printer and the external device through the male connectors 547.

The display unit 512 of the electronic paper 510 corresponds to the display unit of the invention, the female connector 516 corresponds to the first coupling section of the invention, the male connector 518 corresponds to the second coupling section of the invention, the control unit 530 corresponds to the display control unit and the information deleting unit of the invention, the mark 514A and the mark 514B correspond to specifying units of the invention, and the touch panel 512B corresponds to the change designation input unit and the exchange designation input unit of the invention.

The male connector 547 of the printer 540 corresponds to the coupling section of the invention, the control unit 542 corresponds to the information forming unit and the information output unit of the invention, and the operation unit 544 corresponds to the size information input unit of the invention.

Figure 28:
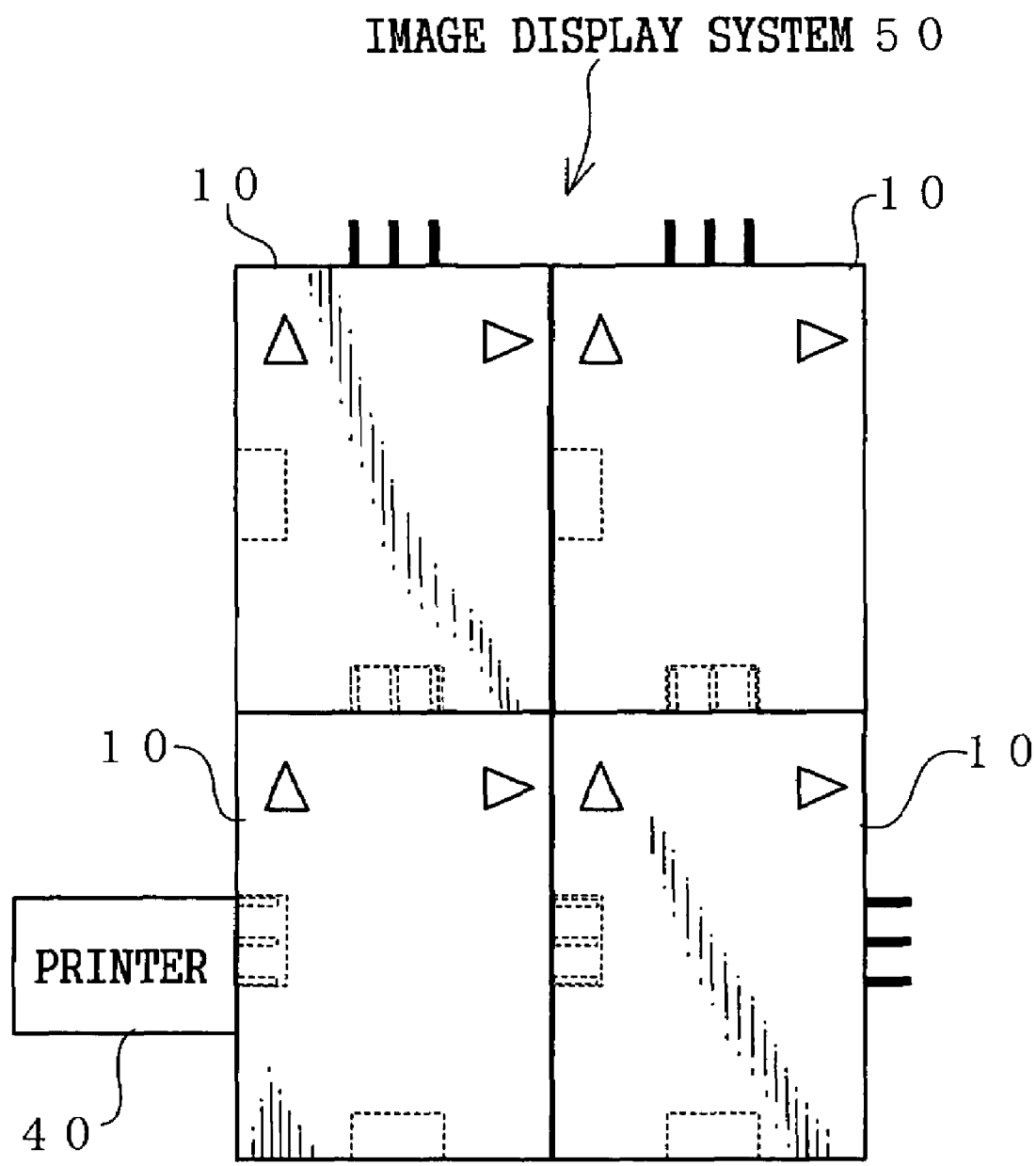
FIG. 28 is a plan view showing the configuration of the image display system 550 according to the fourth embodiment.

An operation of the image display system 550 according to this embodiment will be described below. A case in which the image display system 550 is structured as shown in FIG. 28, i.e., when four sheets of electronic paper 510 constitute an A-2 size (vertical type) display region and in which the printer 540 is connected to the female connector 516A of the electronic paper 510 at the lower left in FIG. 28 will be described below.

In the printer 540 according to this embodiment, when one image is to be displayed in a display region constituted by a combination of display surfaces 512A in the sheets of electronic paper 510, an image dividing process for supplying image data expressing the image to the sheets of electronic paper 510 such that the image data is divided in units of display regions of the sheets of electronic paper 510 is performed.

Figure 29:
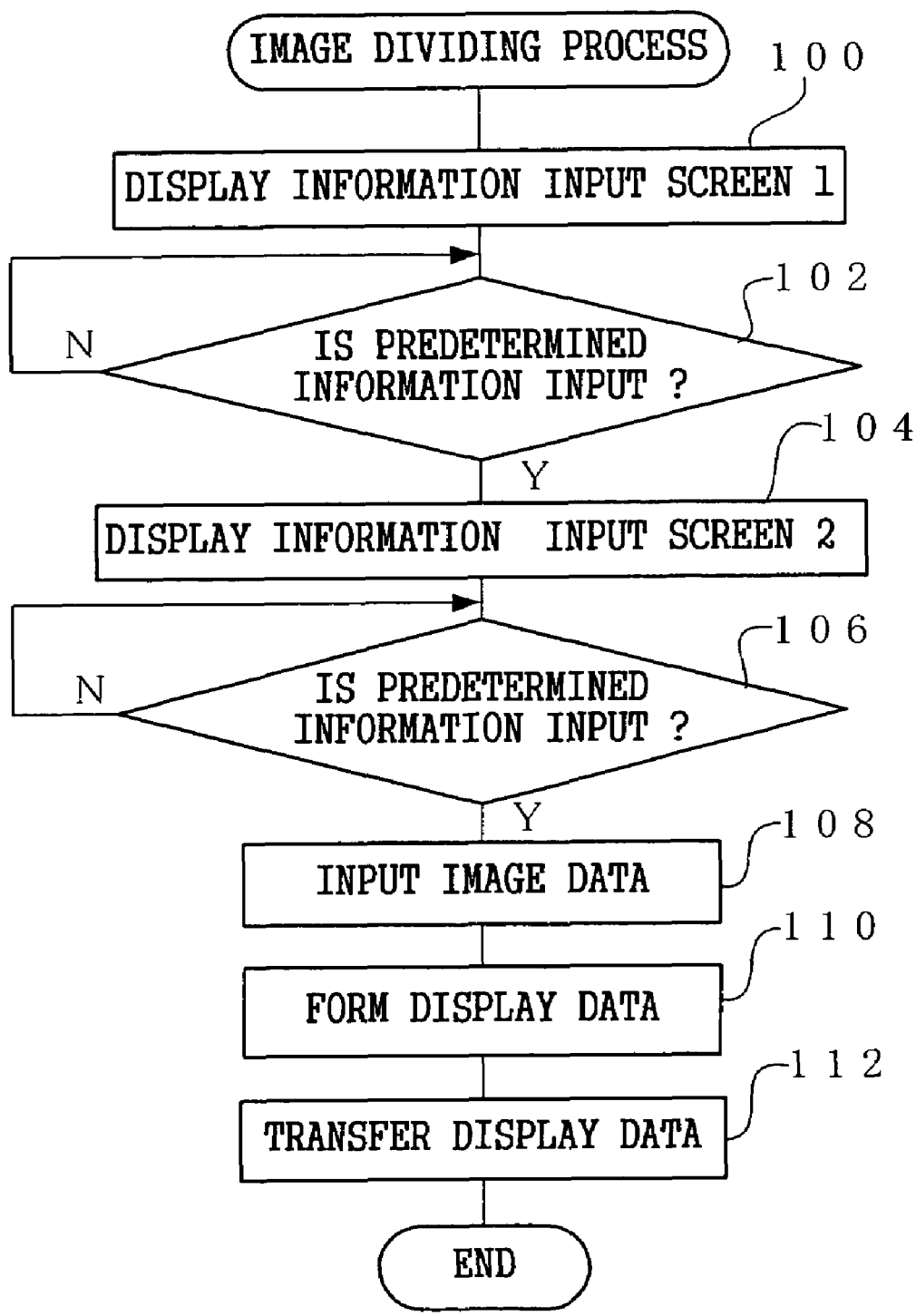
FIG. 29 is a flow chart showing a flow of processes of an image dividing process program executed in the printer 540 according to the fourth embodiment.

An image dividing process executed by the printer 540 will be described below with reference to FIG. 29. FIG. 29 is a flow chart showing a flow of processes of an image dividing process program executed in the control unit 542 of the printer 540 when the image dividing process is executed. The program is stored in a predetermined region of the storage unit 546 in advance. A case in which a horizontal A-2 size image is displayed by the image display system 550 will be described below.

In step 600 in FIG. 29, a predetermined information input screen 1 is displayed on the display surface of the display unit 549 through the drive circuit 548. In the next step 602, the control unit 542 waits for an input of predetermined information. In FIG. 30A, the information input screen 1 displayed on the display unit 549 by the process in step 600 is shown. As shown in FIG. 30A, in the information input screen 1 according to this embodiment, a message representing that a user is urged to input various pieces of information is displayed, and, as the names of pieces of information to be input, "specifications of a display image", "display size of electronic paper", and "the number of sheets of electronic paper" are displayed together with a rectangular frame for inputting these items.

When the information input screen 1 as shown in FIG. 30A is displayed on the display unit 549, a user operates the operation unit 544 to input the specification of an image to be displayed on the image display system 550, the size of the display surface 512A of the electronic paper 510 in use, and the number of sheets of electronic paper 510 in the corresponding rectangular frames, respectively and then designates an "end" button displayed on the lowest part of the screen. In this embodiment, as shown in FIG. 30A, "A-2 horizontal", "A-4", and "4" are input as "specification of display image", and "the number of sheets of electronic paper", respectively. In this manner, the control unit 542 receives the information input by the user to determine YES in step 602, and shifts to step 604.

In step 604, an information input screen 2 based on information input in step 602 is displayed on the display surface of the display unit 549 through the drive circuit 548. In the next step 606, the control unit 542 waits for an input of predetermined information. In FIG. 30B, the information input screen 2 displayed on the display unit 549 by the process in step 604 is shown. As shown in FIG. 30B, in the information input screen 2 according to this embodiment, a message representing that a user is urged to select a transfer direction of display data is displayed, and a coupling state (in FIG. 30B, the state shown in FIG. 28) of the electronic paper 510 depending on the information input in step 602 and arrows expressing transfer directions of the display data in the coupling state are typically displayed in units of assumable transfer directions.

In this embodiment, since the display region is constituted by four sheets of electronic paper 510 each having a display size of A-4 size, in addition to the coupling state shown in FIG. 30B, various coupling states such as a state in which all the sheets of electronic paper 510 are horizontally or vertically coupled and a state in which only three sheets of electronic paper 510 are horizontally coupled to each other and the remaining sheet of electronic paper 510 is vertically coupled to any one of the sheets of electronic paper 510 can be employed. However, in this embodiment, in order to avoid complexity, a case in which it is assumed that display regions having standard sizes such as A-3 size and A-2 size are constituted by combinations of the sheets of electronic paper 510 will be described below.

When the information input screen 2 as shown in FIG. 30B is displayed on the display unit 549, a user operates the operation unit 544 to select a display region in which a transfer direction depending on the configuration of the image display system 550 is indicated. In the image display system 550 according to this embodiment, as shown in FIG. 28, since the printer 540 is coupled to the female connector 516A located at the left end of the electronic paper 510 located at the lower left in FIG. 30B, a transfer direction located at the upper left in FIG. 30B is selected by the user. In this manner, the control unit 542 receives information expressing the selection result of the user to determine YES in step 606, and the control unit 542 shifts to step 608.

In step 608, image data (in this case, image data expressing a horizontal A-2 size image) which is designated by a user in advance and which is stored in a predetermined region of the storage unit 546 in advance is read from the storage unit 546. In the next step 610, based on information indicating the transfer direction input in step 606 and image data input in step 608, display data is formed as described below.

The image data input in step 608 is divided depending on the coupling state of the sheets of electronic paper 510. In the image display system 550 according to this embodiment, four sheets of electronic paper 510 each having a display size of A-4 size are coupled to each other in the shape of a grid to constitute an A-2 size display region, and the size of an image, which is to be displayed, expressed by the image data input in step 608 is horizontal A-2 size. Therefore, the image data is divided in units of four divided regions obtained by equally dividing the image expressed by the image data by two in the horizontal and vertical directions.

The image data in units of divided regions are sorted in a transfer order of display data based on information expressing transfer directions of the display data input in step 606.

Indexes indicating a page order (transfer order of display data) are allocated to the sorted image data from the start image data.

Finally, to each image data, '1' is related as a default value of an index indicating a page of a transfer destination of the display data, and an index indicating the direction of the longitudinal direction of the display image is related.

In FIG. 31A, the configuration of the display data 560 formed by the above processes is typically shown. As shown in FIG. 31A, in the display data 560 according to this embodiment, image data is divided into four image data DT, and indexes P1 (1, 2, 3, 4) indicating a page order are allocated to the image data DT. '1' is related to each image data DT as a default value of the index P2 expressing a page of a transfer destination of the display data, and 'Y' indicating a horizontal direction is related as an index P3 indicating the direction of the longitudinal direction of the display image. The index P3 obtained when the display image is a vertical image is set to be 'T' indicating the vertical direction.

In this case, the plurality of indexes P2 related to the respective image data DT, as will be described below, always indicate equal values. Therefore, as shown in FIG. 31A, the indexes P2 are not set in the divided image data DT, respectively, and only one index P2 is set in the image data DT. Since the plurality of indexes P3 related to the respective image data DT are always equal to each other, the indexes are not set in the divided image data DT as shown in FIG. 31A, respectively, and only one index can be set in the image data DT.

When the display data 560 is formed, in the next step 612, the formed display data 560 is transferred to the coupled electronic paper 510 through the male connector 547. Thereafter, the image dividing process program is ended.

Figure 32:
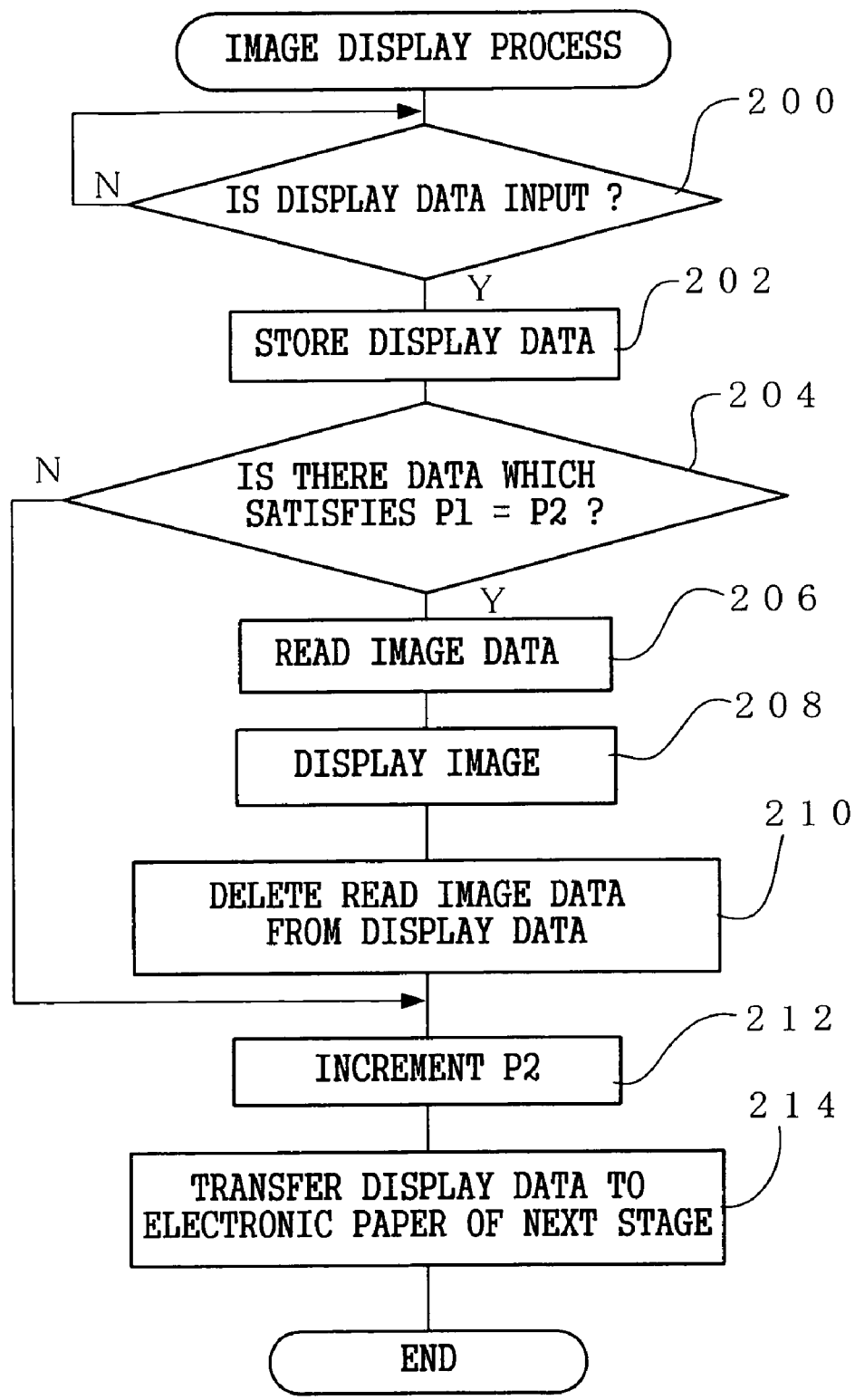
FIG. 32 is a flow chart showing a flow of processes of an image display process program executed in the electronic paper 510 according to the fourth embodiment.

An image display process executed in each of the sheets of electronic paper 510 will be described below with reference to FIG. 32. FIG. 32 is a flow chart showing a flow of processes of an image display process program which is always executed by the control unit 530 of the electronic paper 510. The program is stored in a predetermined region of the storage unit 534 in advance.

In step 700 in FIG. 32, the control unit 542 waits for an input of the display data 560 from the printer 540 or the electronic paper 510 on the previous stage. In the next step 702, the control unit 542 stores the input display data 560 in a predetermined region of the storage unit 534.

In the next step 704, it is decided whether or not the display data 560 stored in the storage unit 534 includes image data in which the value of the index P1 and the value of the index P2 are equal to each other. When YES is determined in step 704, the control unit 542 shifts to step 706.

In step 706, image data DT in which the value of the index P1 and the value of the index P2 are equal to each other in step 704 is read from the storage unit 534. In the next step 708, the image expressed by the read image data DT is displayed on the display surface 512A of the display unit 512 through the drive circuit 532. In addition, in the next step 710, the read image data and the indexes P1, P2, and P3 attached to the read image data DT are deleted from the display data 560. Thereafter the control unit 542 shifts to step 712. In step 708, the information of the index P3 related to the image data DT read in step 706 is read, and the image expressed by the read image data DT is displayed on the display surface 512A such that the longitudinal direction of the display image expressed by the information is equal to the longitudinal direction of the display surface 512A. In step 710, the image data DT deleted from the display data 560 in step 710 is stored in a region different from the region in which the display data 560 of the storage unit 534 is stored.

On the other hand, when NO is determined in step 704, i.e., when there is no image data DT in which the value of the index P1 and the value of the index P2 are equal to each other, the control unit 542 shifts to step 712 without executing the processes in step 706 to step 710.

In step 712, all the indexes P2 of the display data 560 stored in the storage unit 534 are incremented by '1'. In the next step 714, the display data 560 is read from the storage unit 534 and transferred to the electronic paper 510 of the next stage. Thereafter, this image display process program is ended.

When another electronic paper 510 is connected to a plurality of connectors of the electronic paper 510 except for the connectors to which the display data 560 is input, a plurality of transfer destinations of the display data 560 in step 714 exist. However, in this embodiment, as described with reference to FIG. 30B, since the transfer destination of the display data 560 is determined in advance, the display data 560 is transferred to only the transfer destination. For example, in the electronic paper 510 at the lower left in FIG. 28, the electronic paper 510 is coupled to both the male connectors 518A and 518B in addition to the female connector 516A to which the display data 560 is input. However, in this embodiment, since a transfer direction (counterclockwise direction beginning at the electronic paper 510 at the lower left in FIG. 28) located at the upper left in FIG. 30B is selected as the transfer direction of the display data 560, the display data 560 is transferred to only the electronic paper 510 coupled to the male connector 518A.

At this time, recognition of a transfer destination of the display data 560 in each of the sheets of electronic paper 510 may be realized by presetting the transfer destination of the display data 560 in the corresponding electronic paper 510 by inputting an operation by a user through the touch panel 512B arranged on the electronic paper 510 or the following method. That is, information expressing connectors to which electronic paper 510 of the next stage is coupled in the electronic paper 510 which displays an image expressed by the image data DT is included in the image data DT obtained by dividing the display data 560 formed by the printer 540 such that the information and the image data DT are related to each other, and the information is referred by the sheets of electronic paper 510.

When the electronic paper 510 always execute the image display process program, in the image display system 550 according to this embodiment, the display data 560 shown in FIG. 31A is input from the printer 540 in the electronic paper 510 at the lower left in FIG. 28, and an image expressed by 'AAA . . . ', which is the image data DT in which the values of the index P1 and the index P2 are equal to each other, is displayed on the display surface 512A of the electronic paper 510. The image data DT and the indexes P1, P2, and P3 corresponding to the image data DT are deleted from the display data 560, and the values of the remaining indexes P2 are incremented by '1'. Thereafter, the display data 560 (display data 560 in a state shown in FIG. 31B) is transferred to the electronic paper 510, which is the electronic paper 510 of the next stage, at the lower right in FIG. 28.

In the electronic paper 510 at the lower right in FIG. 28, when the display data 560 is transferred, YES is determined in step 700 in the image display process program (also see FIG. 32), and the same operation as that of the electronic paper 510 at the lower left in FIG. 28 is performed. As a result, an image expressed by the image data DT, i.e., 'BBB . . .' is displayed on the display surface 512A of the electronic paper 510. Thereafter, the image data DT and the indexes P1 to P3 corresponding to the image data DT are deleted, and the display data 560 in a state in which all the values of the indexes P2 are incremented by '1' and which is shown in FIG. 31C is transferred to the electronic paper 510, which is the electronic paper 510 of the next stage, at the upper right in FIG. 28.

Subsequently, the same processes as described above are sequentially executed in the electronic paper 510 at the upper right and upper left in FIG. 28, so that images expressed by all the image data DT transferred from the printer 540 are displayed by the sheets of electronic paper 510 included in the image display system 550.

Figure 33:
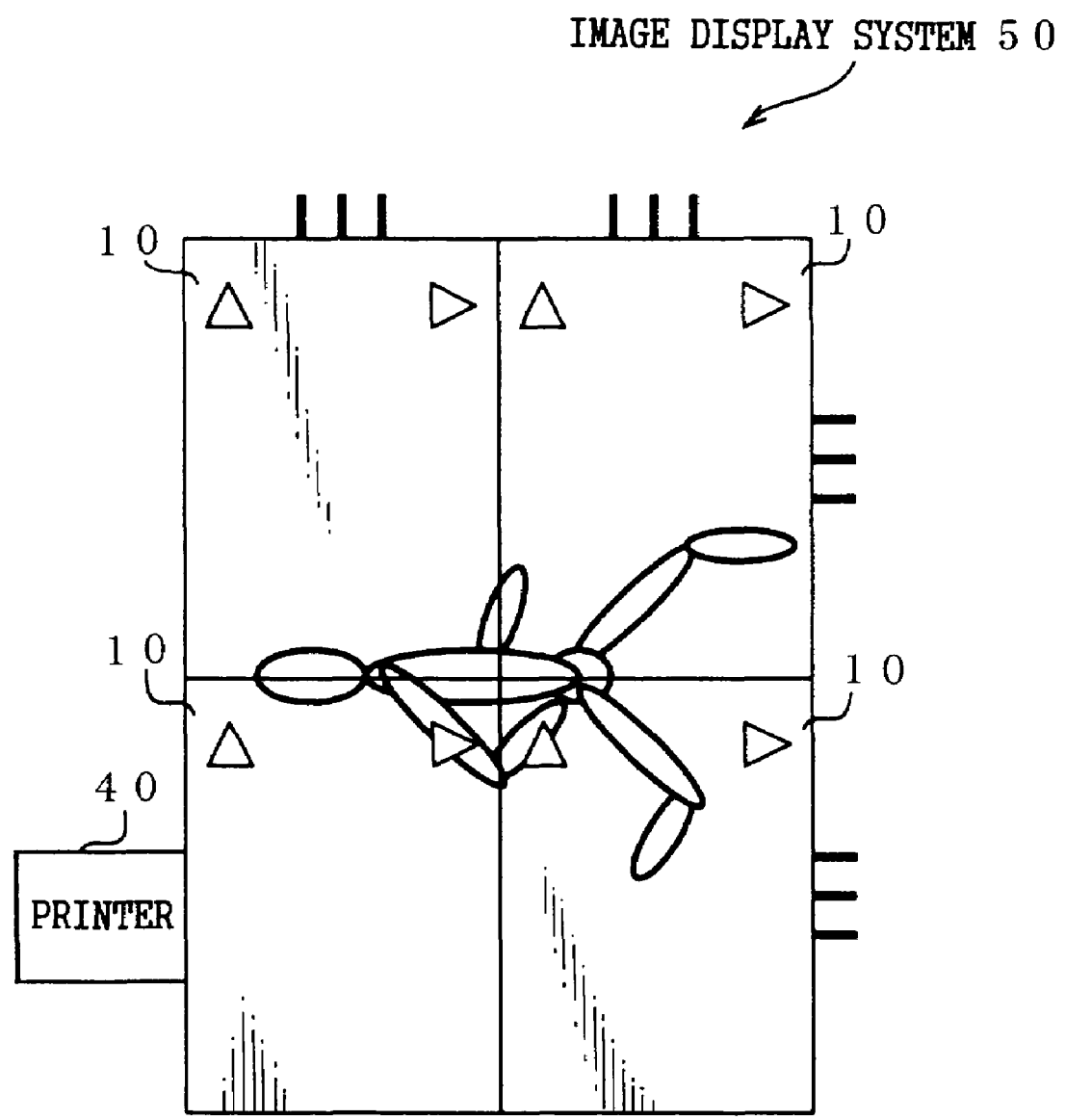
FIG. 33 is a plan view showing an example of a final image display of the image display system 550 according to the fourth embodiment.

In FIG. 33, an example of a display state of an image in the display region of the image display system 550 obtained by the image display process program is shown. In the embodiment, the specifications of the display image are A-2 size and a horizontal type. In contrast, the display region of the image display system 550 is an A-2 size and vertical type. In this case, as shown in FIG. 33, the display image is horizontally displayed. However, when the display image is seen from the right side of the image display system 550, specific troubles do not occur.

In the image display system 550 according to this embodiment, the sheets of electronic paper 510 are arbitrarily coupled to each other to constitute an overall display region. Therefore, depending on a method of forming the display data 560, the display images on the sheets of electronic paper 510 may be upside down, the direction of the display images may be shifted by 90°, and a display image may be inverted with respect to the display images of the sheets of electronic paper 510 vertically and horizontally adjacent to the corresponding image. Therefore, in the electronic paper 510 according to this embodiment, two functions, i.e., an image rotating function for rotating a display image and an image replace function of replacing the display images of sheets of electronic paper 510 horizontally and vertically adjacent to the corresponding electronic paper 510 with the corresponding electronic paper 510 are set.

Figure 34:
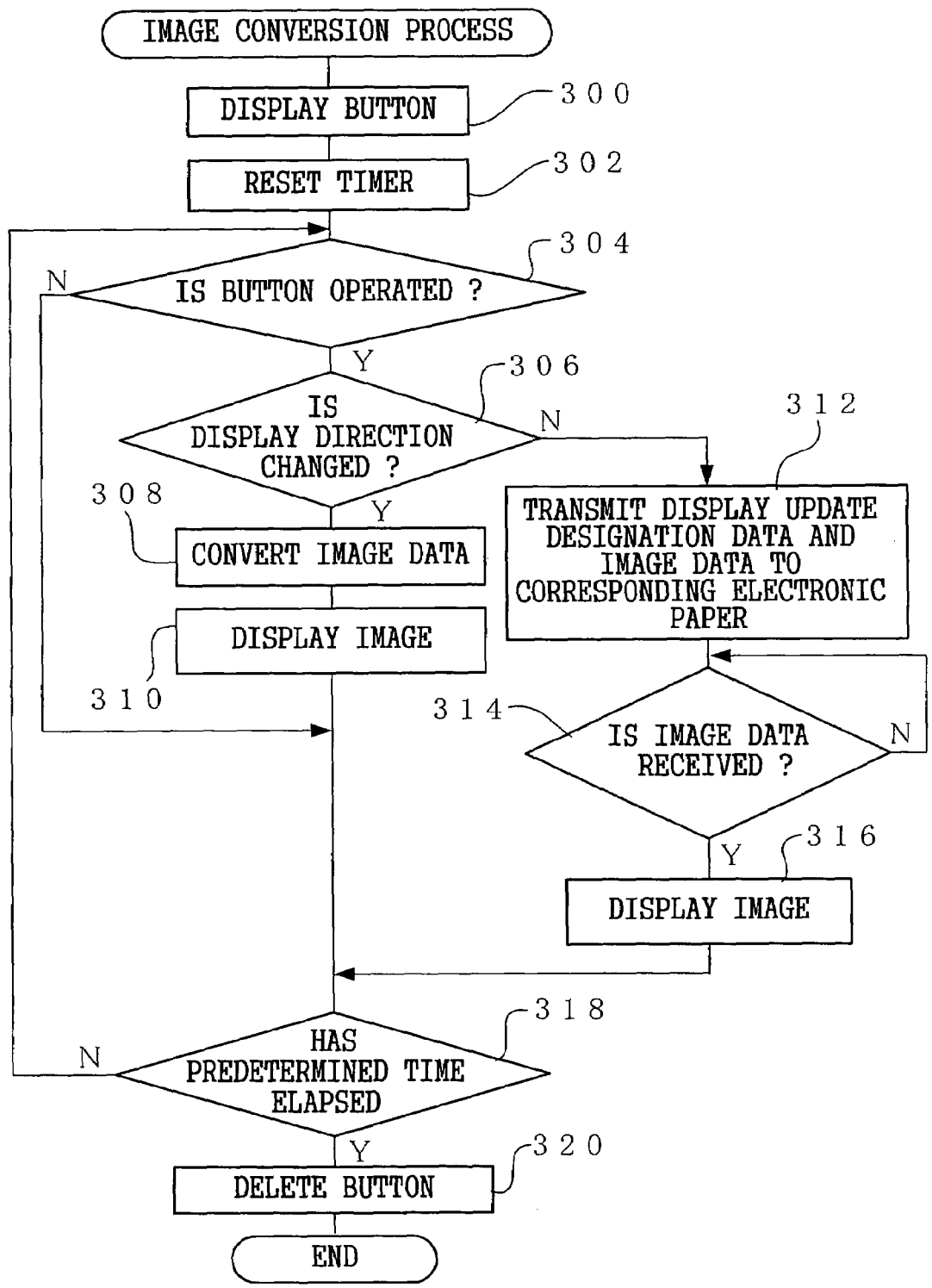
FIG. 34 is a flow chart showing a flow of processes of an image conversion process program executed in the electronic paper 510 according to the fourth embodiment.

An image conversion process executed in each of the sheets of electronic paper 510 when the two functions are operated will be described below with reference to FIG. 34. FIG. 34 is a flow chart showing a flow of processes of an image conversion process program executed by an interruption process in the control unit 530 of each of the sheets of electronic paper 510 when a designation that execution of the image conversion process by a user through the touch panel 512B is designated is input. This program is also stored in a predetermined region of the storage unit 534 in advance.

In step 800 in FIG. 34, an image exchange button 520 operated (designated) by a user when the image replacing function is operated and a display direction change button 522 operated (designated) by a user when the image rotating function is operated are displayed on the display surface 512A of the display unit 512 as shown in FIG. 23.

As shown in FIG. 23, the image exchange button 520 according to this embodiment is constituted by four buttons indicating the upper, lower, left, and right directions by the positions of the salient ends. The button indicating the upper direction is to designate an exchange of the display image of the electronic paper 510 coupled on the upper side in FIG. 23 for the display image of the electronic paper 510 having the button. Similarly, the buttons indicating the lower direction, the left direction, and the right direction are to designate exchanges of display images of the sheets of electronic paper 510 coupled on the lower, left, and right sides in FIG. 23 for the display image of the electronic paper 510 having these buttons. The display direction change button 522 according to this embodiment functions as a button for rotating a display image by 90° in a predetermined direction (in the clockwise direction in this embodiment) every time a designation is made.

A user depresses a region on the touch panel 512B corresponding to the display region of a button for designating execution of a desired function with her/his finger, so that the execution of the desired function can be designated. At this time, the control unit 530 can recognize the function designated by the user to be executed based on a depression position of the touch panel 512B.

In the next step 802, a timer (not shown) built in the control unit 530 is reset. In the next step 804, it is decided whether or not any one of the image exchange button 520 and the display direction change button 522 is depressed by a user. When YES is determined, the control unit 530 shifts to step 806.

In step 806, it is decided whether or not the button depressed by the user is the display direction change button 522. When YES is determined, the control unit 530 shifts to step 808 to convert the image data DT (image data DT stored in a region different from the region of the display data 560 of the storage unit 534) expressing an image displayed on the display surface 512A so as to rotate the image expressed by the image data DT by 90° to a predetermined direction (clockwise direction). In the next step 810, an image expressed by the converted image data DT is displayed on the display surface 512A to update the display image, and the control unit 530 shifts to step 818. By the process in step 810, the display image is updated into a display image obtained by clockwise rotating the display image by 90°.

On the other hand, when NO is determined in step 806, the button depressed by the user is regarded as the image exchange button 520, and the control unit 530 shifts to step 812.

In step 812, data representing that the electronic paper 510 is designated to update the display image, displayed by the image exchange button 520 depressed by a user and image data DT (image data DT stored in a region different from the region of the display data 560 of the storage unit 534) expressing an image which is being displayed are transmitted.

In the electronic paper 510 which receives the display update designation data, an image exchange process, which will be described later, is executed as an interruption process, and the image data DT expressing the image displayed on the display surface 512A of the corresponding electronic paper 510 is transmitted to electronic paper 510 serving as a transmission source of the display update designation data.

In the next step 814, the control unit 530 waits for reception of the image data DT. In the next step 816, the image expressed by the received image data DT is displayed on the display surface 512A to update the display image. Thereafter, the control unit 530 shifts to step 818. By the process in step 816, the image displayed on the electronic paper 510 and which is designated to be exchanged by a user is updated.

On the other hand, when NO is determined in step 804, the control unit 530 shifts to step 818 without executing the processes in step 806 to step 816.

In step 818, it is decided whether or not time counted by a timer (not shown) built in the control unit 530 is longer than predetermined time (in this embodiment, 30 seconds). When NO is determined in step 818, the control unit 530 returns to step 804. When YES is determined in step 818, the control unit 530 shifts to step 820.

In step 820, the image exchange button 520 and the display direction change button 522 displayed on the display surface 512A are erased. Thereafter, this image conversion process program is ended.

Figure 35:
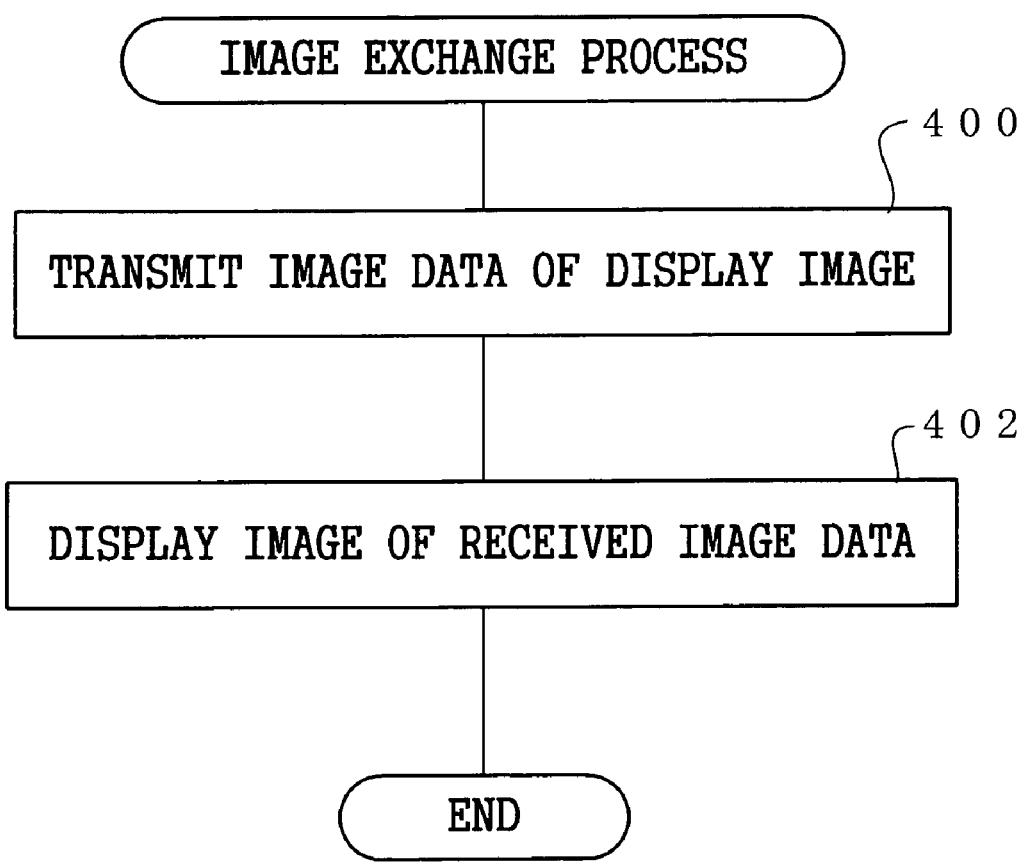
FIG. 35 is a flow chart showing a flow of processes of an image exchange process program executed in the electronic paper 510 according to the fourth embodiment.

An image exchange process executed in each of the sheets of electronic paper 510 when the corresponding electronic paper 510 receives the display update designation data from another electronic paper 510 will be described below with reference to FIG. 35. FIG. 35 is a flow chart showing a flow of processes of an image exchange process program executed as an interruption process by the control unit 530 of each of the sheets of electronic paper 510 when the corresponding electronic paper 510 receives the display update designation data. The program is also stored in a predetermined region of the storage unit 534.

In step 900 in FIG. 35, image data DT (image data DT stored in a region different from the region of the display data 560 of the storage unit 534) expressing an image displayed on the display surface 512A is transmitted to the electronic paper 510 serving as a transmission source of display update designation data. In the next step 902, the image expressed by the image data DT received from the corresponding electronic paper 510 is displayed on the display surface 512A to update the display image. Thereafter, this image exchange process program is ended.

When a user wants to make the display image upside down, the user should depress the display direction change button 522 twice.

As described above in detail, the electronic paper according to this embodiment comprises: the female connector 516 for coupling another electronic paper such that both the display surfaces of the sheets of electronic paper face the same direction and are located on a common plane or for coupling the printer 540 for outputting the display data 560 including the image data DT expressing an image to be displayed on at least a display surface and for making it possible to input the display data 560 from the other electronic paper or the printer 540 coupled by coupling the other electronic paper or the printer 540; and the male connector 518 for coupling another electronic device different from the electronic paper coupled by the female connector 516 such that both the display surfaces of the sheets of electronic paper face the same direction and are located on a common plane or for making it possible to output the display data 560 including image data DT expressing an image displayed by at least the electronic paper to the electronic paper by coupling the electronic paper. Therefore, an image having a large size can be displayed without increasing the costs.

In the electronic paper according to this embodiment, a display direction of an image on the display surface 512A is specified by the mark 514A and the mark 514B. Therefore, when sheets of electronic paper are to be coupled to each other, the sheets of electronic paper are coupled such that the display directions coincide with each other, so that the directions of the images displayed by the sheets of electronic paper can be prevented from being different from each other.

In the electronic paper according to this embodiment, when a designation for changing a display direction of an image displayed on the display surface 512A is input through the display direction change button 522, the display direction of the image is changed depending on the change designation. Therefore, the display direction of the image can be easily corrected.

In addition, in the electronic paper according to this embodiment, when a designation for exchanging an image displayed by another electronic paper coupled by at least one of the female connector 516 and the male connector 518 for an image displayed on the display surface 512A of the electronic paper is input through the image exchange button 520, control for exchanging the image displayed by the other electronic paper for the image displayed on the display surface 512A of the electronic paper is performed depending on the exchange designation. Therefore, when the positions of the display image of the electronic paper and the display image of the other electronic paper are reversed, the positional relationship can be easily corrected.

On the other hand, in the image display system according to this embodiment, the sheets of electronic paper coupled to each other are used, the printer 540 is coupled to any one of the sheets of electronic paper and makes it possible to output the display data 560 to the sheets of electronic paper, and the display data 560 to be output to the electronic paper is formed and output to the electronic paper. Therefore, an image having a large size can be displayed without increasing the costs.

In the image display system according to this embodiment, image data expressing images displayed on the sheets of electronic paper is divided in units of regions to be displayed on the display surfaces 512A of the sheets of electronic paper and is included in the display data 560 based on the sizes of the images and the display sizes in the sheets of electronic paper. Therefore, the images can be easily displayed by the sheets of electronic paper.

In the image display system according to this embodiment, the printer 540 includes pieces of image data DT expressing images displayed by the sheets of electronic paper in the display data 560 such that the pieces of image data DT are related to the indexes P1 indicating the sheets of electronic paper on which the images are displayed, and includes an index P2 serving as information which coincides with an index P1 and which expresses electronic paper serving as an output destination of the display data 560 by updating the display data 560 in the electronic paper in which display data 560 is input. Control is performed such that the image expressed by the image data DT related to the index P1 which coincides with the index P2 included in the input display data 560 is displayed on the display surface 512A, and the index P2 is updated such that the index P2 is information which coincides with the index P1 indicating electronic paper serving as an output destination of the display data 560. Therefore, the display data 560 can be easily formed by the printer 540, and the image data DT expressing the image to be displayed can be easily specified in the electronic paper. As a result, images can be easily displayed by the sheets of electronic paper.

In the image display system according to this embodiment, the image data DT expressing the images displayed on the display surfaces 512A and the indexes related to the image data DT are deleted from the display data 560 by the sheets of electronic paper. Therefore, the display data can be prevented from being infinitely transferred between the sheets of electronic paper by remanence of the image data DT expressing the images displayed on the sheets of electronic paper and the indexes related to the image data DT in the display data 560.

In addition, in the image display system according to this embodiment, the shape of the display surface 512A of the electronic paper is made rectangular, and when, by the printer 540, the image expressed by image data DT included in the display data 560 is rectangular, the display data 560 including an index P3 indicating the longitudinal direction of the image is formed, and control is performed by sheets of electronic paper such that the image expressed by the image data DT included in the display data 560 to cause the longitudinal direction indicated by the index P3 included in the display data 560 to coincide with the longitudinal direction of the display surface 512A, is displayed on the display surface 512A. Therefore, a non-display region of the display image is prevented from being formed on the display surface 512A by in coincidence of the longitudinal direction indicated by the index P3 and the longitudinal direction of the display surface 512A.

Fifth Embodiment

The fourth embodiment describes the embodiment in which an image is displayed by the image display system 550 without giving identification information for specifying electronic paper 510 to the electronic paper 510 in advance. However, the fifth embodiment will describe a case in which the identification information (ID numbers in this embodiment) are given to sheets of electronic paper 510 in advance, and an image is displayed by the image display system 550 using the identification information.

Since the configuration of the printer 540 and the image display system 550 according to the fifth embodiment is the same as that in the fourth embodiment, descriptions thereof will be omitted. Since the configuration of the electronic paper 510 according to the fifth embodiment is the same as that in the fourth embodiment except that a unique ID number which can specify itself is stored in a predetermined region of the storage unit 534 in advance, descriptions thereof will be omitted here. The storage unit 534 of the electronic paper 510 according to the fifth embodiment corresponds to the storage unit of the invention.

The operation of the image display system 550 according to the fifth embodiment will be described below. An operation in a case in which the image display system 550 is structured as shown in FIG. 28, i.e., a case in which four sheets of electronic paper 510 constitute an A-2 size (vertical type) display region and the printer 540 is connected to the female connector 516A of the electronic paper 510 at the lower left in FIG. 28 will be also described below.

Figure 36:
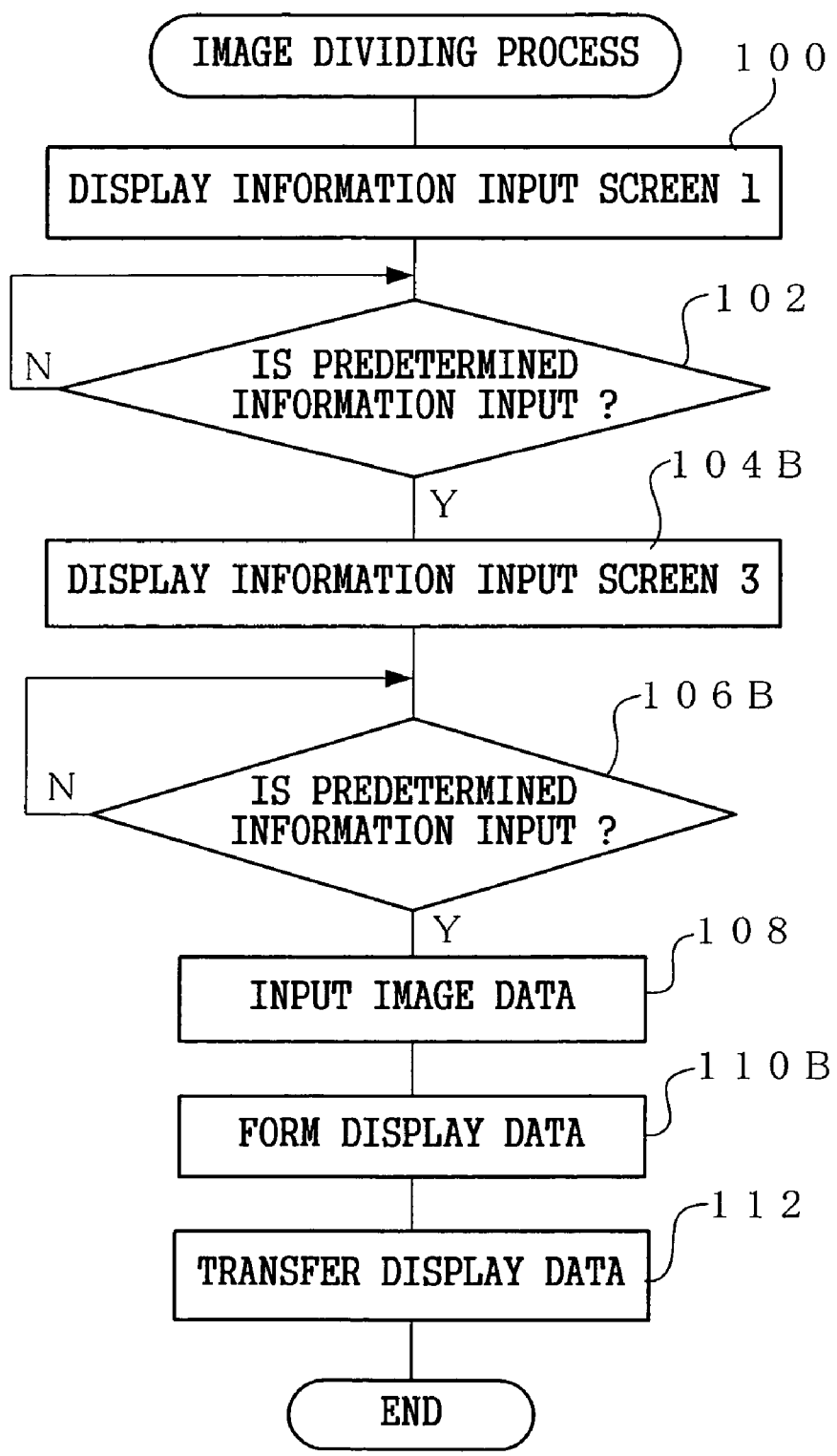
FIG. 36 is a flow chart showing a flow of processes of an image dividing process program executed in a printer 540 according to the fifth embodiment.

An image dividing process executed by the printer 540 according to the fifth embodiment will be described below with reference to FIG. 36. FIG. 36 is a flow chart showing a flow of processes of image dividing process program executed in the control unit 542 of the printer 540 when the image dividing process is executed. The same step numbers as in FIG. 29 denote the same steps in which the same processes as those in the image dividing process program shown in FIG. 29 are executed, and descriptions thereof will be omitted. As in the fourth embodiment, a case in which an A-2 size horizontal image is displayed by the image display system 550 will be described below.

In step 604B in FIG. 36, an information input screen 3 based on information input in step 602 is displayed on the display surface of a display unit 549 through a drive circuit 548. In the next step 606B, the control unit 542 waits for an input of predetermined information.

Figure 37:
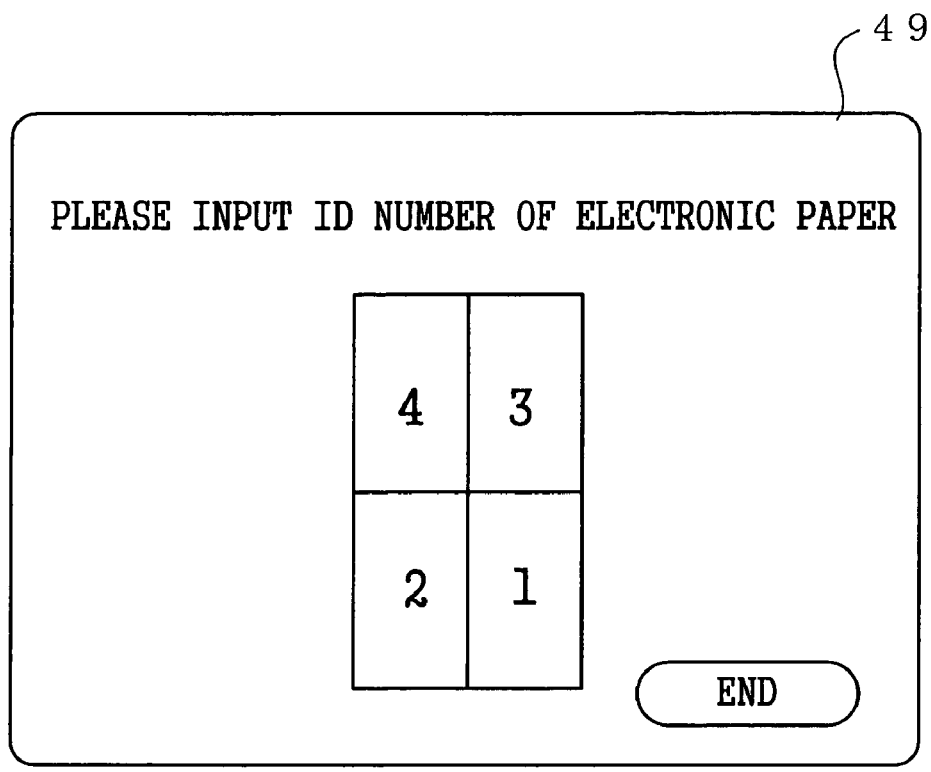
FIG. 37 is a schematic view showing an example of an information input screen 3 according to the fifth embodiment.

In FIG. 37, the information input screen 3 displayed on the display unit 549 by the process in step 604B is shown. As shown in FIG. 37, in the information input screen 3 according to this embodiment, a message representing that a user is urged to input ID numbers of the sheets of electronic paper 510 included in the image display system 550 is displayed, and a rectangular frame for typically showing a coupling state (in FIG. 37, the state shown in FIG. 28) depending on the information input in step 602 and for inputting the ID numbers of the sheets of electronic paper 510 is displayed.

In the fifth embodiment, as in the fourth embodiment, since a display region is constituted by four sheets of electronic paper 510 each having a display size of A-4 size, in addition to the coupling states shown in FIG. 37, various coupling states, such as a state in which all the sheets of electronic paper 510 are horizontally or vertically coupled to each other and a state in which only three sheets of electronic paper 510 are horizontally coupled to each other and the remaining sheet of electronic paper 510 is vertically coupled to any one of the sheets of electronic paper 510, can be employed. However, also in the fifth embodiment, in order to avoid complexity, a case in which it is assumed that display regions having standard sizes such as A-3 size and A-2 size are constituted by combinations of the sheets of electronic paper 510 will be described below.

When the information input screen 3 as shown in FIG. 37 is displayed on the display unit 549, a user operates an operation unit 544 to input the ID numbers of the sheets of electronic paper 510 used in the image display system 550 in a rectangular frame at a position corresponding to a coupling position, and an "end" button displayed at the lowest portion of the screen is designated. In this manner, information representing the ID numbers of the sheets of electronic paper 510 input by the user is input to the control unit 542, and YES is determined in step 606B. The control unit 542 shifts to step 608.

Thereafter, in step 610B, based on the information representing the ID numbers of the sheets of electronic paper 510 input in step 606B and the image data input in step 608, display data is formed as will be described below.

The image data input in step 608 is divided depending on coupling states of the sheets of electronic paper 510. In the image display system 550 according to this embodiment, four sheets of electronic paper 510 each having a display size of A-4 size are coupled to each other in the shape of a grid to constitute an A-2 size display region, and the size of an image, which is to be displayed, expressed by the image data input in step 608 is horizontal A-2 size. Therefore, the image data is divided in units of four divided regions obtained by equally dividing the image expressed by the image data by two in the horizontal and vertical directions.

The ID numbers of the sheets of electronic paper 510 serving as display destinations are related to the image data in the divided regions, respectively.

Figure 38:
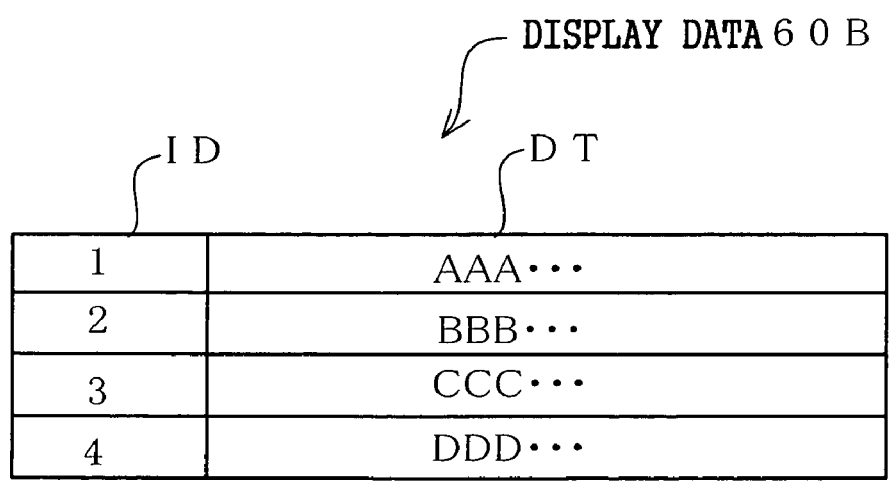
FIG. 38 is a pattern diagram showing the configuration of display data 560B formed by the printer 540 according to the fifth embodiment.

In FIG. 38, the configuration of the display data 560B formed by the above processes is typically shown. As shown in FIG. 38, the display data 560B according to this embodiment is divided into four pieces of image data DT, and the ID numbers ID of the sheets of electronic paper 510 serving as display destinations are related to the pieces of image data DT.

Figure 39:
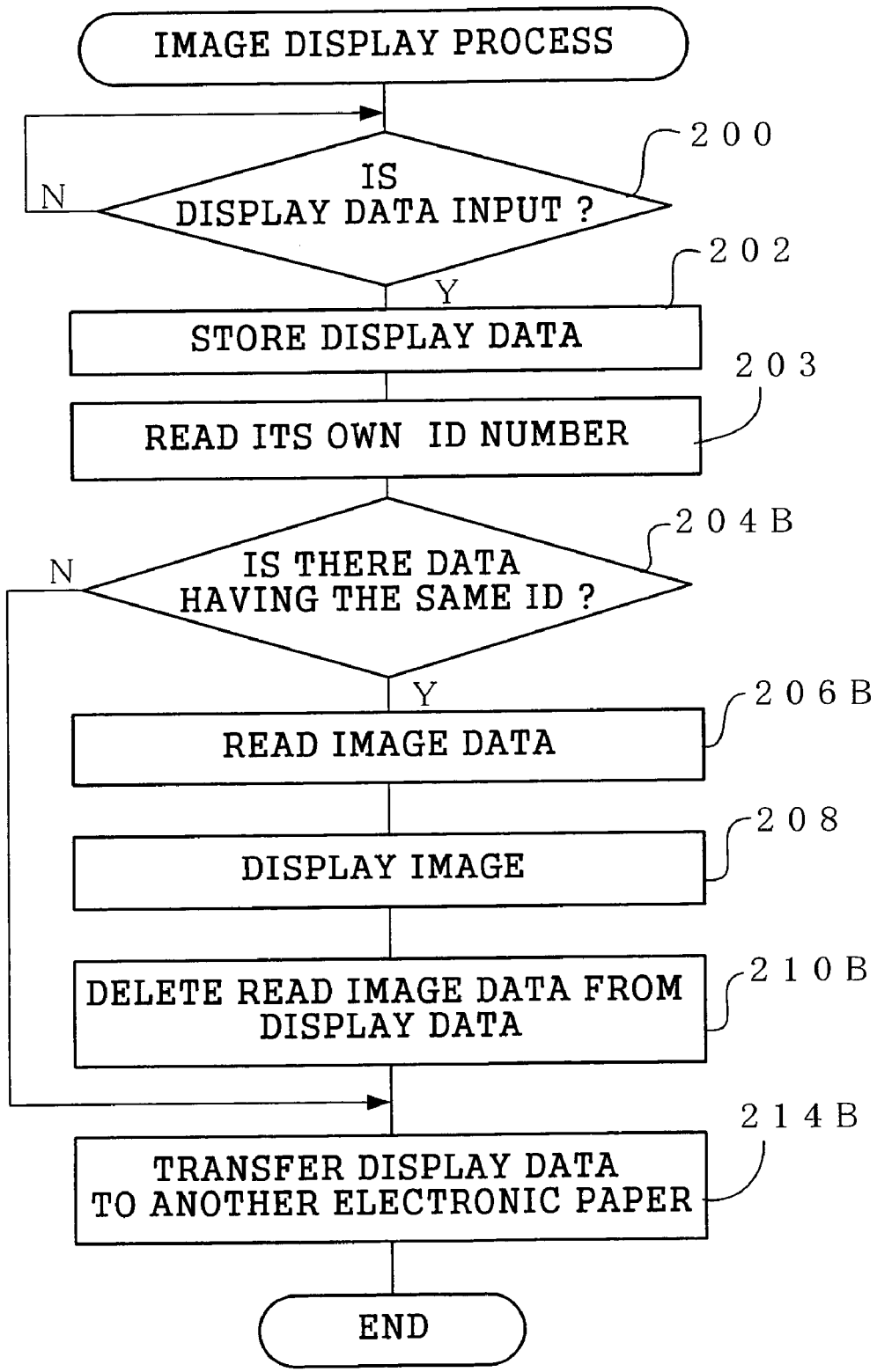
FIG. 39 is a flow chart showing a flow of processes of an image display process program executed in the electronic paper 510 according to the fifth embodiment.

An image display process executed in each of the sheets of electronic paper 510 according to the fifth embodiment will be described below with reference to FIG. 39. FIG. 39 is a flow chart showing a flow of processes of an image display process program always executed by a control unit 530 of the electronic paper 510. The same step numbers as in FIG. 32 denote the same steps in which the same processes as those in the image dividing process program shown in FIG. 32 are executed, and a description thereof will be omitted.

In step 703 in FIG. 39, an ID number stored in the storage unit 534 in advance is read. In the next step 704B, it is decided whether or not the display data 560B stored in the storage unit 534 in step 702 includes image data DT related to an ID number which coincides with the ID number read in step 703. When YES is determined in step 704B, the control unit 530 shifts to step 706B.

In step 706B, the image data DT determined to be included in the display data 560B in step 704B is read from the storage unit 534. In this manner, the image expressed by the image data DT is displayed on the display surface 512A by the process in the next step 708.

In the next step 710B, the read image data DT and the ID number ID attached thereto are deleted from the display data 560B. Thereafter, the control unit 530 shifts to step 714B. In step 710B, the image data DT deleted from the display data 560B in step 710B is stored in a region different from a region in which the display data 560B of the storage unit 534 is stored.

On the other hand, when NO is determined in step 704B, i.e., when the display data 560B does not include the image data DT related to the ID number which coincides with the ID number of the display data 560B, the control unit 530 shifts to step 714B without executing the processes in step 706B to step 710B.

In step 714B, the display data 560B is read from the storage unit 534 and transferred to another electronic paper 510. Thereafter, this image display process program is ended.

In the electronic paper 510 according to the fifth embodiment, when another electronic paper 510 is connected to a plurality of connectors except for the connectors to which the display data 560B is input, it is assumed that transfer destinations of the display data 560B in step 714B are all the sheets of electronic paper 510.

More specifically, in the image display system 550 according to the fourth embodiment, since image data expressing display images on the sheets of electronic paper 510 are specified without setting ID numbers for the sheets of electronic paper 510, transfer directions of the display data must be predetermined. In contrast, in the image display system 550 according to the fifth embodiment, ID numbers are set for the sheets of electronic paper 510 in advance, and display data 560B is formed in a state in which the ID numbers of the sheets of electronic paper 510 to display images are related to the pieces of image data DT in the printer 540. Each of the sheets of electronic paper 510 specifies that image data DT, to which the same ID number as the ID number of the corresponding electronic paper 510 is related, expresses a display image, so that a transfer destination of display data need not be predetermined.

Figure 40A:
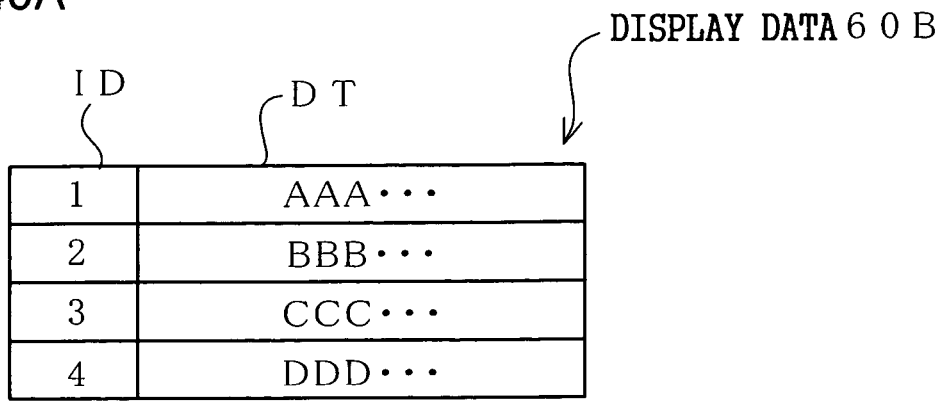
FIG. 40A is a pattern diagram showing a change of the configuration of the display data 560B in the fifth embodiment.

When the image display process program is always executed in each of the sheets of electronic paper 510, in the image display system 550 according to the fifth embodiment, display data 560B shown in FIG. 40A is input from the printer 540 in the electronic paper 510 at the lower left in FIG. 28, and an image expressed by 'BBB . . .' which is image data DT to which the ID number ID which coincides with the ID number ('2') of the electronic paper 510 is related is displayed on the display surface 512A of the electronic paper 510. After the image data DT and the ID number ID corresponding to the image data DT are deleted from the display data 560B, the display data 560B (display data 560B in a state shown in FIG. 40B) is transferred to another electronic paper 510 at the lower right in FIG. 28 and another electronic paper 510 at the upper left in FIG. 28.

When the display data 560B is transferred to the electronic paper 510 at the lower left in FIG. 28, YES is determined in step 700 of the image display process program (also see FIG. 39), and the electronic paper 510 operates in the same way as that of the electronic paper 510 at the lower left in FIG. 28. As a result, after an image expressed by image data DT which is 'AAA . . .' is displayed on the display surface 512A of the electronic paper 510, the display data 560B from which the image data DT and the ID number ID corresponding to the image DT are deleted and which is in a state shown in FIG. 40C is transferred to the electronic paper 510 at the upper right in FIG. 28.

Figure 40B:
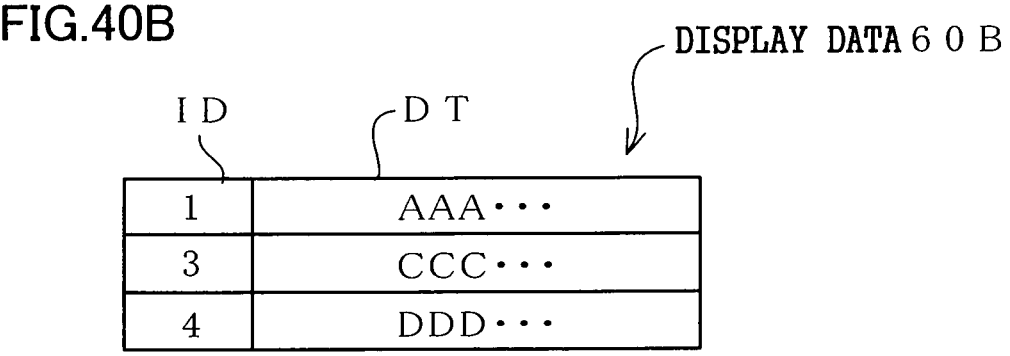
FIG. 40B is a pattern diagram showing a change of the configuration of the display data 560B in the fifth embodiment.

On the other hand, also in the electronic paper 510 at the upper left in FIG. 28, YES is determined in step 700 of the image display process program by transferring the display data 560B shown in FIG. 40B, and the electronic paper 510 operates in the same way as that of the electronic paper 510 at the lower left in FIG. 28. As a result, after an image expressed by image data DT which is 'DDD . . .' is displayed on the display surface 512A of the electronic paper 510, the display data 560B from which the image data DT and the ID number ID corresponding to the image DT are deleted and which is in a state shown in FIG. 40D is transferred to the electronic paper 510 at the upper right in FIG. 28.

Figure 40C:
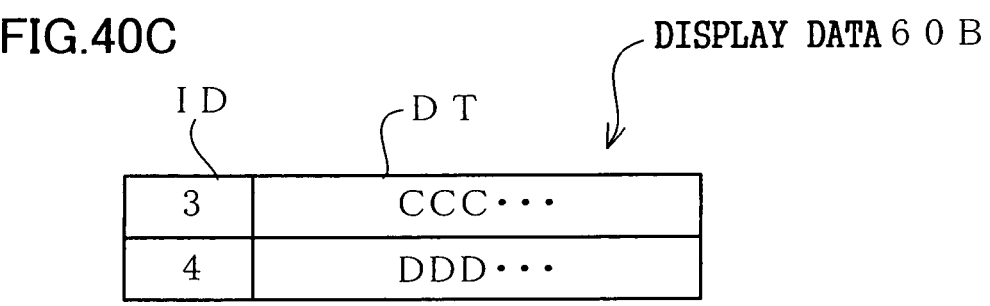
FIG. 40C is a pattern diagram showing a change of the configuration of the display data 560B in the fifth embodiment.
Figure 40D:
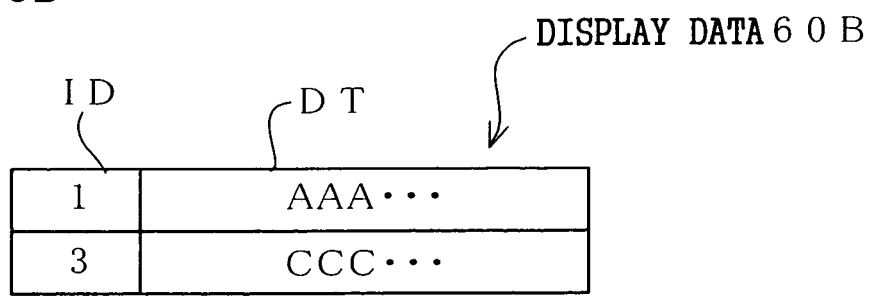
FIG. 40D is a pattern diagram showing a change of the configuration of the display data 560B in the fifth embodiment.

Therefore, in the electronic paper 510 at the upper right in FIG. 28, the display data 560B shown in FIG. 40C is transferred from the electronic paper 510 at the lower right in FIG. 28, and the display data 560B shown in FIG. 40D is transferred from the electronic paper 510 at the upper light in FIG. 28. In this case, after an image expressed by image data DT which is 'CCC . . .' and to which the ID number ID which coincides with the ID number ('3') of the electronic paper 510 included in the previously transferred display data 560B is given is displayed on the display surface 512A, an image expressed by image data DT which is 'CCC . . .' included in the subsequently transferred display data 560B is also displayed on the display surface 512A. However, since these images are the same images, no problem is posed.

Pieces of display data 560B may be infrequently transferred from a plurality of positions at once. However, in this case, by arbitrarily selecting only any one of the pieces of display data 560B, there arises no problem.

As a result, even in the image display system 550 according to the fifth embodiment, as shown in FIG. 33, an image is displayed.

As described above in detail, the image display system according to this embodiment further comprises the storage unit 534 in which an ID number different from that of another electronic paper is stored, the printer 540 includes image data DT expressing an image displayed on at least one of the display surfaces 512A of the sheets of electronic paper and the ID number ID of the electronic paper which displays the image in the display data 560B such that the image data DT and the ID number ID are related to each other, and control is performed such that only the image expressed by the image data DT to which the ID number ID which coincides with the ID number stored in the storage unit 534 is related is displayed on the display surface 512A. Therefore, the printer 540 can easily form the display data 560B, and the electronic paper can easily specify image data DT expressing an image to be displayed. As a result, images can be easily displayed by the sheets of electronic paper.

Each of the above embodiments describes the case in which, in each of the sheets of electronic paper 510, the image data DT displayed on the display unit 512A of the corresponding electronic paper 510 is deleted from the display data to transfer the display data. However, the present invention is not limited to this case. For example, electronic paper 510 which finally receives display data is specified in advance, the display data received by the electronic paper 510 is not transferred to another electronic paper 510, so that the displayed image data DT may not be deleted from the display data. In this case, a load required for deletion of the image data DT in the sheets of electronic paper 510 can be reduced.

Each of the embodiments describes the case in which two female connectors 516 are applied as the first coupling sections of the invention and two male connectors 518 are applied as the second coupling sections of the invention. The present invention is not limited to the case. For example, one connector can be applied as the first and second coupling sections, one connector can be applied as anyone of the coupling sections, and two connectors can be applied to the other coupling sections. In this case, in comparison with each of the embodiments, although variation of coupling configuration of sheets of electronic paper decreases, the costs of the sheets of electronic paper can be reduced.

Figure 41A:
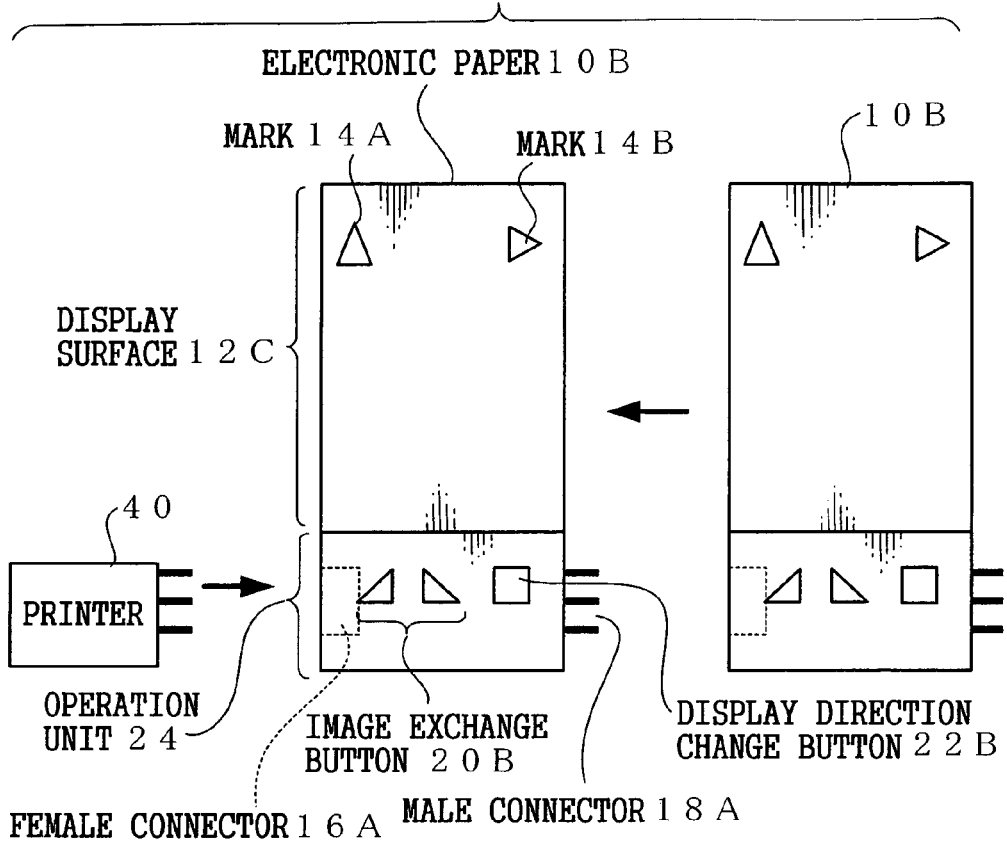
FIG. 41A is a plan view showing another example of configuration of the electronic paper and the image display system in the fifth embodiment.

In the description in each of the embodiments, one entire surface of the sheets of electronic paper 510 is used as the display surfaces 512A, and various operation buttons are displayed on the display surfaces 512A as needed, so that an overall display region formed by the sheets of electronic paper 510 when the sheets of electronic paper 510 are coupled to each other is made seamless. The present invention is not limited to the above description. For example, as shown in FIG. 41A, an operation unit 524 on which an image exchange button 520B and a display direction change button 522B are arranged can also be formed at a part of a surface on which a display surface 512C is formed. In FIG. 41A, the image exchange button 520B and the display direction change button 522B of the electronic paper 510B have the same roles as those of the image exchange button 520 and the display direction change button 522 of the electronic paper 510 according to each of the embodiments.

Figure 41B:
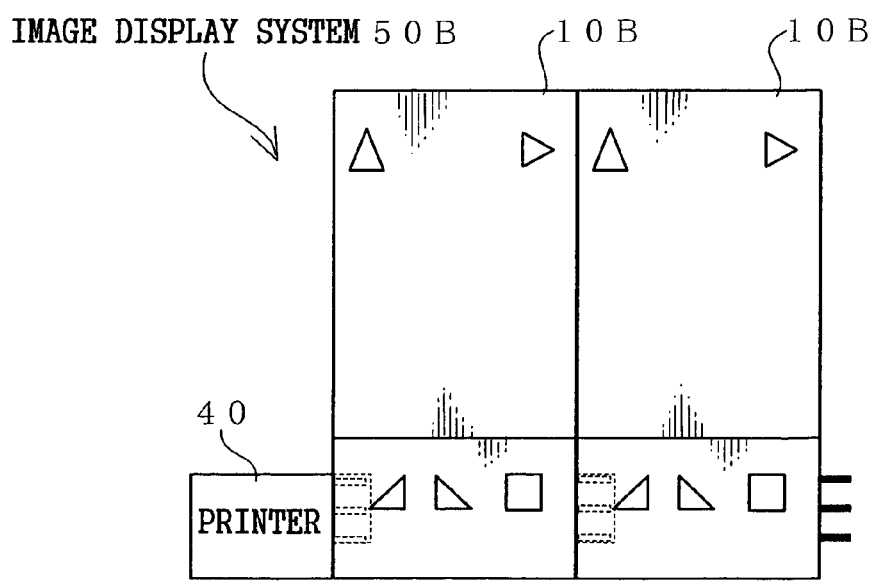
FIG. 41B is a plan view showing still another example of configuration of the electronic paper and the image display system in the fifth embodiment.

In this case, even though other sheets of electronic paper 510B are coupled to the upper and lower positions in FIGS. 41A and 41B, an overall display region after the sheets of electronic paper 510B are coupled to each other cannot be made seamless. As connectors, only the female connector 516A and the male connector 518A are arranged at the left end portions and the right end portions in FIGS. 41A and 41B. In this configuration, the printer 540 and another electronic paper 510B are coupled to the electronic paper 510B as shown in FIG. 41A, so that an image display system 550B can be constituted as shown in FIG. 41B.

Even in such configuration, the same effect as in each of the embodiments can be achieved.

Each of the embodiments describes the case in which the sheets of electronic paper 510 are electrically and mechanically coupled to each other by the female connector 516 and the male connector 518. The invention is not limited to the case, and the following configuration can be employed. That is, for example, as shown in FIG. 42A, a hook-shaped coupling section 528A is formed at one end of electronic paper 510C, a hook-shaped coupling section 528B which is designed to be meshed with the coupling section 528A of another electronic paper 510C is formed at the other end, and electrodes 526A and 526B such as leaf-spring electrodes being in electric contact with the coupling section 528A and the coupling section 528B are arranged to the coupling section 528A and the coupling section 528B, respectively.

Figure 42A:
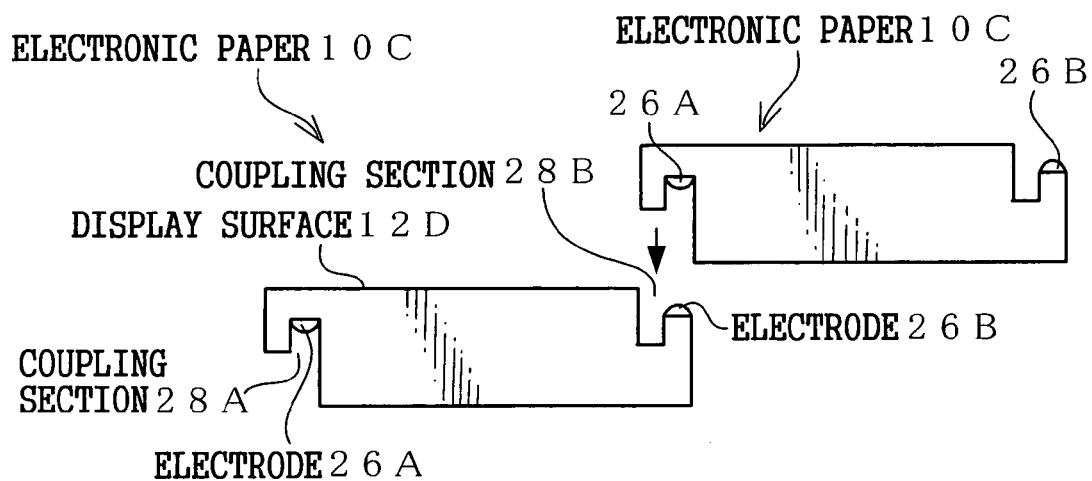
FIG. 42A is a side sectional view showing another example of configuration of coupling sections of sheets of electronic paper in the fifth embodiment.
Figure 42B:
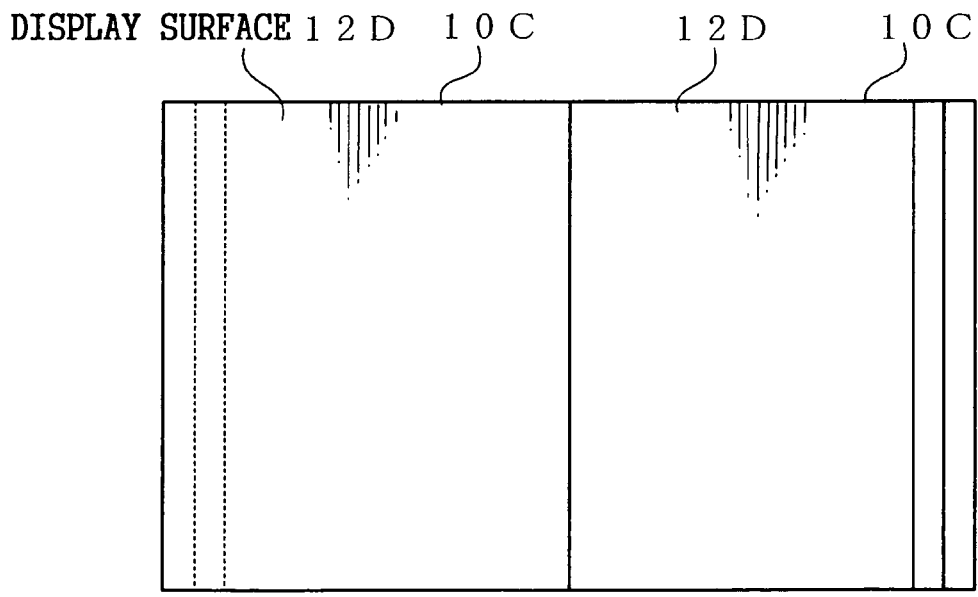
FIG. 42B is a plan view showing another example of configuration of the coupling section of electronic paper in the fifth embodiment.

In this case, as shown in FIG. 42A, the sheets of electronic paper 510C are coupled to each other, so that a seamless display region can also be formed as shown in FIG. 42B. In addition, in comparison with the electronic paper 510 according to each of the embodiments, the coupling force between the sheets of electronic paper can be increased.

For example, a latch mechanism and a latch releasing mechanism are arranged on the coupling section for mechanically coupling the sheets of electronic paper 510, so that coupling force between the sheets of electronic paper can be further increased.

For example, a cap which is automatically opened in coupling to another electronic paper 510 can also be arranged on an electric coupling section such as an electrode in the electronic paper 510, or a projection can also be arranged to prevent the coupling section from being touched with a hand. In this manner, the coupling section can be protected.

Each of the embodiments describes the case in which the sheets of electronic paper 510 are electrically and mechanically coupled to each other by the female connector 516 and the male connector 518. However, the present invention is not limited to the case. For example, electric coupling and mechanical coupling can be performed by independent coupling sections, respectively. In this case, the electric coupling can also be performed through the electrodes of a connector in the same manner as that in the sheets of electronic paper 510, and the sheets of electronic paper can also be coupled by electromagnetic induction or the like such that the sheets of electronic paper are not in contact with each other. In this case, the same effect as that in each of the embodiments can be achieved.

Each of the embodiments describes the case in which information representing the display size of the electronic paper 510 is input by an operation of the operation unit 544 by a user. However, the invention is not limited to the case, and the following configuration can also be employed. That is, for example, in the storage unit 534 of each of the sheets of electronic paper 510, information representing the display size of the corresponding electronic paper 510 is stored in advance, and the information is input by reading the information by the printer 540. In this case, an operation of inputting the information by a user can be omitted.

The flows of processes of various process programs (see FIG. 29, FIG. 32, FIG. 34, FIG. 35, FIG. 36, and FIG. 39) described in the embodiments are only examples. The flows can be appropriately changed without departing from the spirit and scope of the invention, as a matter of course.

In addition, the configurations of the electronic paper 510, the printer 540, and the image display system 550 described in each of the embodiments are only examples. The configurations can be appropriately changed without departing from the spirit and scope of the invention, as a matter of course.

What is claimed is:

1. An image display apparatus comprising:
a plurality of thin display devices, each having a communication unit for transmitting and receiving image data expressing an image and a display unit for displaying an image based on the image data received by the communication unit; and
a holding stand, for substantially vertically holding the plurality of thin display devices, having a transmission unit for transmitting the image data to the thin display devices,
wherein a front surface of the holding stand has a U-shaped section at both each of two side ends and a another U-shaped section at a lower end, wherein
the holding stand further includes an adding unit for adding, to the image data, page information expressing a page to be displayed in the plurality of thin display devices and page position information expressing a current page position of the image data by updating pages, and transmits the image data, to which the page information and the page position information have been added by the adding unit, to the thin display device by the transmission unit;

and the thin display devices further include a decision unit for comparing the page information and the page position information of the image data received by the communication unit with each other to decide whether or not the page information and the page position information coincide with each other, an updating unit for updating the page position information after the decision made by the decision unit, and a sending unit for sending the image data, to which the page information and the page position information updated by the updating unit have been added, to the thin display device of the subsequent page or the holding stand.

2. An image display apparatus according to claim 1, wherein the holding stand further includes a storage unit for storing image data related to images displayed on the plurality of held thin display devices and the page information and the page position information added to the image data.

3. An image display apparatus according to claim 2, wherein when an image has been displayed on a thin display device held by the holding stand, the adding unit adds the page information and the page position to the image data based on the image data which is stored in the storing unit and to which the page information and the page position information have been added, such that the latest image is on a frontmost surface.

4. An image data writing method for writing image data in a plurality of thin display devices in a state in which the plurality of detachable thin display devices are stacked on each other and held, the method comprising the steps of:
when write designation is performed, writing image data expressing an image which has already been written in the plurality of thin display devices in thin display devices respectively located one surface behind thin display devices in which the image data is already written without physically moving the thin display devices; and
writing the latest image data designated to be written in a thin display device located at a frontmost surface of the plurality of thin display devices.

5. An image data writing method according to claim 4, wherein the image data expressing an image which has already been written are sequentially sent to the plurality of thin display devices without removing the plurality of thin display devices from a holding stand.

6. A thin display file including a plurality of thin display devices each having a display unit for displaying an image based on image data expressing an image, and a host device for holding the plurality of thin display devices such that pages of the thin display devices are connected in series with each other and for sequentially transmitting the image data to the plurality of thin display devices, wherein:
the host device includes
an adding unit for adding, to the image data, page information expressing a page to be displayed in the plurality of thin display devices held as a plurality of pages and page position information expressing a current page position of the image data by updating pages, and
a transmission unit for transmitting the image data, to which the page information and the page position information have been added by the adding unit to the thin display devices; and
each of the thin display device includes
a receiving unit for receiving the image data to which the page information and the page position information have been added,
a decision unit for comparing the page information and the page position information of the image data received by the receiving unit with each other to decide whether or not the page information and the page position information coincide with each other,
a control unit for controlling the display of the display unit based on a decision result of the decision unit,
an updating unit for updating the page position information after the decision by the decision unit, and
a sending unit for sending the image data, to which the page information and the page position information updated by the updating unit have been added, to the thin display device of the subsequent page or the host device.

7. A thin display file according to claim 6, wherein the host device includes an accumulation unit for accumulating image data expressing images to be displayed on the thin display devices, and an input unit for selecting the image data accumulated in the accumulation unit and inputting display designations including the page information.

8. A thin display file according to claim 6, wherein the thin display devices have the display units on front and rear surfaces thereof, the adding unit further adds, to the image data, front/rear information expressing the front and rear of a thin display device which is to display an image, and the control unit controls display on the display units on the front and rear surfaces of the thin display device based on the decision result of the decision unit and the front/rear information.

9. A thin display file according to claim 6, wherein in the series connection, connection sections through which the pages are electrically connected when the plurality of pages of the thin display devices are stacked on each other are arranged on the front surfaces and rear surfaces of the thin display devices, and host connection sections are arranged at positions at the host device corresponding to the connection sections and are connected to the connection sections.

10. A data communication method for a thin display file including a plurality of thin display devices each having a display unit for displaying an image based on image data expressing an image and a host device for holding a plurality of pages of the thin display devices such that the pages are connected in series with each other and for sequentially transmitting the image data to the plurality of thin display devices, wherein:
the host device adds, to the image data, page information expressing a page to be displayed in the plurality of thin display devices held in the host device and page position information expressing a current page position of the image data by updating pages and sequentially transmits the image data to the thin display devices held in the host device; and
the thin display devices of the plurality of pages held in the host device receive the image data to which the page information and the page position information have been added, display images on the display units based on the image data in which the page information and the page position information of the image data coincide with each other, update the page position information, and sequentially transmit image data in which the page position information is updated to the thin display devices of the subsequent pages or the host device.

11. A data communication method according to claim 10, wherein, when the thin display devices have the display units on front and rear surfaces thereof, the host device further adds, to the image data, front/rear information expressing the front and rear of a thin display device which is to display an image, in addition to the page information and the page position information, and each thin display device displays images on the display units on the front and rear surfaces based on the image data in which the page information and the page position information coincide with each other and the front/rear information.

* * * * *